US012463948B2

(12) United States Patent
Ollikainen et al.

(10) Patent No.: US 12,463,948 B2
(45) Date of Patent: Nov. 4, 2025

(54) DISTRIBUTED DATA CONTENT PROTECTION

(71) Applicant: Adeia Guides Inc., San Jose, CA (US)

(72) Inventors: Ville Ollikainen, Vihti (FI); Markku Kylanpaa, Helsinki (FI); Anni Karinsalo, Oulu (FI); Pekka Koskela, Oulu (FI)

(73) Assignee: Adeia Guides Inc., San Jose, CA (US)

( * ) Notice: Subject to any disclaimer, the term of this patent is extended or adjusted under 35 U.S.C. 154(b) by 181 days.

(21) Appl. No.: 18/088,295

(22) Filed: Dec. 23, 2022

(65) Prior Publication Data

US 2024/0214361 A1 Jun. 27, 2024

(51) Int. Cl.
*H04L 9/40* (2022.01)
*H04L 67/1097* (2022.01)

(52) U.S. Cl.
CPC ...... *H04L 63/0435* (2013.01); *H04L 67/1097* (2013.01)

(58) Field of Classification Search
CPC ........................ H04L 63/0435; H04L 67/1097
See application file for complete search history.

(56) References Cited

U.S. PATENT DOCUMENTS 7,093,295 B1 8/2006 Saito
11,223,479 B1 * 1/2022 Firestone ................ H04L 9/085
(Continued)

FOREIGN PATENT DOCUMENTS

WO 03053059 A1 6/2003
WO 2008000894 A1 1/2008
WO 2009007508 A1 1/2009

OTHER PUBLICATIONS

U.S. Appl. No. 18/088,305, filed Dec. 23, 2022, Ville Ollikainen.
(Continued)

*Primary Examiner* — Viet D Vu
(74) *Attorney, Agent, or Firm* — HALEY GUILIANO LLP

(57) ABSTRACT

Systems and methods are described for encrypting and decrypting data in a distributed storage environment. Such systems and methods for encryption may divide a data payload into slices, the slices including a first slice and a subsequent slice, employ a content encryption key and an initialization vector, encrypt the first slice using the content encryption key and the initialization vector, generate a subsequent initialization vector for the subsequent slice based upon the initialization vector and the unencrypted content of the first slice, and encrypt the subsequent slice using the subsequent initialization vector and the content encryption key. The systems and methods may then generate a list of the encrypted slices into which the data payload has been generated, and publish to a secure storage location, the slice list, the content encryption key and the initialization vector for the first slice in the slice list, with the slices outputted to the distributed storage environment. Systems and methods for decryption may receive, from a secure storage location, a slice list, a content encryption key, and an initialization vector, determine the encrypted slices to be received from the distributed storage environment. The systems and methods may receive, from the distributed storage environment, at least encrypted first slice and the encrypted subsequent slice, and decrypt the first slice using the content encryption key and the initialization vector, to generate a decrypted first slice, and generate a subsequent initialization vector for the subsequent slice based upon the initialization vector and the decrypted first slice, decrypt the subsequent slice using the subsequent initialization vector and the content encryption key, and combine the first slice and the subsequent slice into a data payload.

20 Claims, 31 Drawing Sheets

(56) References Cited

U.S. PATENT DOCUMENTS

| | | | |
|---|---|---|---|
| 11,620,393 B1 | 4/2023 | Premaradj | |
| 2004/0091114 A1* | 5/2004 | Carter | G06F 21/606 380/259 |
| 2005/0021986 A1 | 1/2005 | Graunke et al. | |
| 2008/0294913 A1 | 11/2008 | Nakagoe et al. | |
| 2010/0150344 A1 | 6/2010 | Karroumi et al. | |
| 2012/0087490 A1 | 4/2012 | Ollikainen et al. | |
| 2017/0019253 A1* | 1/2017 | Baptist | H04L 67/10 |
| 2017/0353516 A1* | 12/2017 | Gordon | H04L 69/40 |
| 2018/0270045 A1 | 9/2018 | Almuhammadi et al. | |
| 2019/0042359 A1 | 2/2019 | Durham | |
| 2020/0241768 A1 | 7/2020 | Chen et al. | |
| 2022/0164458 A1 | 5/2022 | Petri et al. | |
| 2024/0214362 A1 | 6/2024 | Ollikainen et al. | |

OTHER PUBLICATIONS

Alkwai et al., "Dynamic Quality Adaptive P2P Streaming System," 2016 International Wireless Communications and Mobile Computing Conference (IWCMC), pp. 158-163 (2016) (Abstract Only).
Borse et. al., "A Novel Approach to Preserve DRM for Content Distribution over P2P Networks," Applied Soft Computing and Communication Networks, Lecture Notes in Networks and Systems, vol. 187 (2021) (Abstract Only).
Bugtraq, Getting around non-executable stack (and fix), Buqtraq mailing list, Aug. 10, 1997, https://seclists.org/bugtraq/1997/Aug/63.
Chen et al., "An anonymous DRM scheme for sharing multimedia files in P2P networks," Multimed Tools Appl 69, 1041-1065 (2014).
Conrado et al., "Privacy-Preserving Digital Rights Management." Secure Data Management, Lecture Notes in Computer Science, vol. 3178 (2004) (Abstract Only).
DASH Industry Forum, DASH-IF Implementation Guidelines: Content Protection and Security, Commit Snapshot, Jul. 24, 2020, https://dashif-documents.azurewebsites.net/Guidelines-Security/master/Guidelines-Security.html.
DASH Industry Forum. 2018. DASH Reference Client 2.6.7. https://reference.dashif.org/dash.js/v2.6.7/samples/dash-if-reference-player/index.html. (2018).
Davidson et al. "Content sharing schemes in DRM systems with enhanced performance and privacy preservation," J. Comput. Secur. 24:667-688 (2016) (Abstract Only).
Gazdar et al., Toward a Full Peer to Peer MPEG-DASH Compliant Streaming System. Multimedia Tools and Applications (2018) (Abstract Only).
Iwata et al., "A DRM system suitable for P2P content delivery and the study on its implementation," 2:806-811 (2003).
Javaid et al., "Cache Memory: An Analysis on Replacement Algorithms and Optimization Techniques," Mehran University Research Journal of Engineering and Technology, Mehran University of Engineering and Technology, 36(4):831-840 (2017).
Joshi et al., "Towards practical privacy-preserving digital rights management for cloud computing," 2013 IEEE 10th Consumer Communications and Networking Conference (CCNC), pp. 265-270 (2013) (Abstract Only).
Liben-Nowell et al., "Analysis of the evolution of peer-to-peer systems," 21st Annual Aymposium on Principles of Distributed Computing, p. 233-242 (2002) (Abstract Only).
Microsoft, DASH Content Protection Using Microsoft Playready, Article Mar. 13, 2021, https://docs.microsoft.com/en-us/playready/specifications/mpeg-dash-playready.
Padmavathi et al., "A security framework for Content-Based Publish-Subscribe system," Electronic Commerce Research and Applications, 5(1):78-90 (2006) (Abstract On;y).
Ponciano et al., "BitTorrent traffic from a caching perspective," J Braz Comput Soc, 19:475-491 (2013).
Prasad et al., "Bandwidth estimation: metrics, measurement techniques, and tools," in IEEE Network, vol. 17(6):27-35 (2003).
Ron Garrison, Structure of a MPEG-DASH MPD, Ott Verse Blog, Apr. 1, 2021, https://ottverse.com/structure-of-an-mpeg-dash-mpd/.
Sanjay, How to Play MPEG-DASH Encrypted Protected Content Using Encrypted Media Extensions (EME) in Browser, (2020), https://medium.com/swlh/how-to-play-mpeg-dash-encrypted-protected-content-using-encrypted-media-extensions-eme-in-browser-234f49fdc706.
Seals, "Researchers Compromise Netflix Content in Widevine DRM Hack," Accessed in May 2022 at https://threatpost.com/netflix-compromised-widevine-drm-hack/144220/.
Shukla et al., "Towards software defined low maintenance structured peer-to-peer overlays", Peer-to-Peer Networking and Applications 14:1242-1260 (2021) (Abstract Only).
Sodagar, "The MPEG-DASH Standard for Multimedia Streaming Over the Internet," IEEE Multimedia, 18(4):62-67, (2011) (Abstract Only).
Spiteri et al., "From Theoryto Practice: Improving Bitrate Adaptation in the Dash Reference Player," In MMSYS'18: 9th ACM Multimedia Systems Conference, Jun. 12-15, 2018. ACM, 16 Pages. https://doi.org/10.1145/3204949.3204953 (Abstract Only).
Stolarz, "Peer-to-peer streaming media delivery," Proceedings First International Conference on Peer-to-Peer Computing, pp. 48-52 (2001) (Abstract Only).
Topjohnwu, Magisk Manager, https://magiskmanager.com/.
W3C, Encrypted Media Extensions, W3C Recommendation Sep. 18, 2017, https://www.w3.org/TR/encrypted-media/.
Wikipedia, Block cipher mode of operation, Wikipedia article, https://en.wikipedia.org/wiki/Block_cipher_mode_of_operation.
Wikipedia, Cache replacement policies, Wikipedia article, https://en.wikipedia.org/wiki/Cache_replacement_policies.
Zhang et al., "A Survey on Distributed Hash Table (DHT): Theory, Platforms, and Applications." pp. 1-60 (2013), https://silo.tips/download/a-survey-on-distributed-hash-table-dht-theory-platforms-and-applications-hao-zha.
Deffs et al., "Introduction to Cryptography: Principles and Applications" Springer Berlin Heidelberg https://doi.org/10.1007/978-3-662-47974-2 (3rd Ed.) (2015).
Elbirt, "Symmetric-Key Cryptography: Block Ciphers" Understanding and Applying Cryptography and Data Security, United Kingdom: Auerbach Publishers, Incorporated (2009).
Vaudenay, "A Classical Introduction to Cryptography: Applications for Communications Security" 1st ed. New York, NY: Springer US (2006).

* cited by examiner

Fig. 11

1100

```
<ContentProtection>
        schemeIdUri="urn:uuid:d053534-6345342-66456-853423214-674545"
        value="FirstDRM 2.0">
        <enc:pssh>Y4tdrf5df8t89ryt89b8dukj5riug8od895t6iugdkjhdkj5r98od8iogyh8</enc:pssh>
        <dashif:authzurl>https://thisurl.isatest.com/files/3252424/authorize</dashif:authzurl>
        <dashif:laurl>https://thisurl.isatest.com/AcquireLicense</dashif:laurl>
</ContentProtection>
```

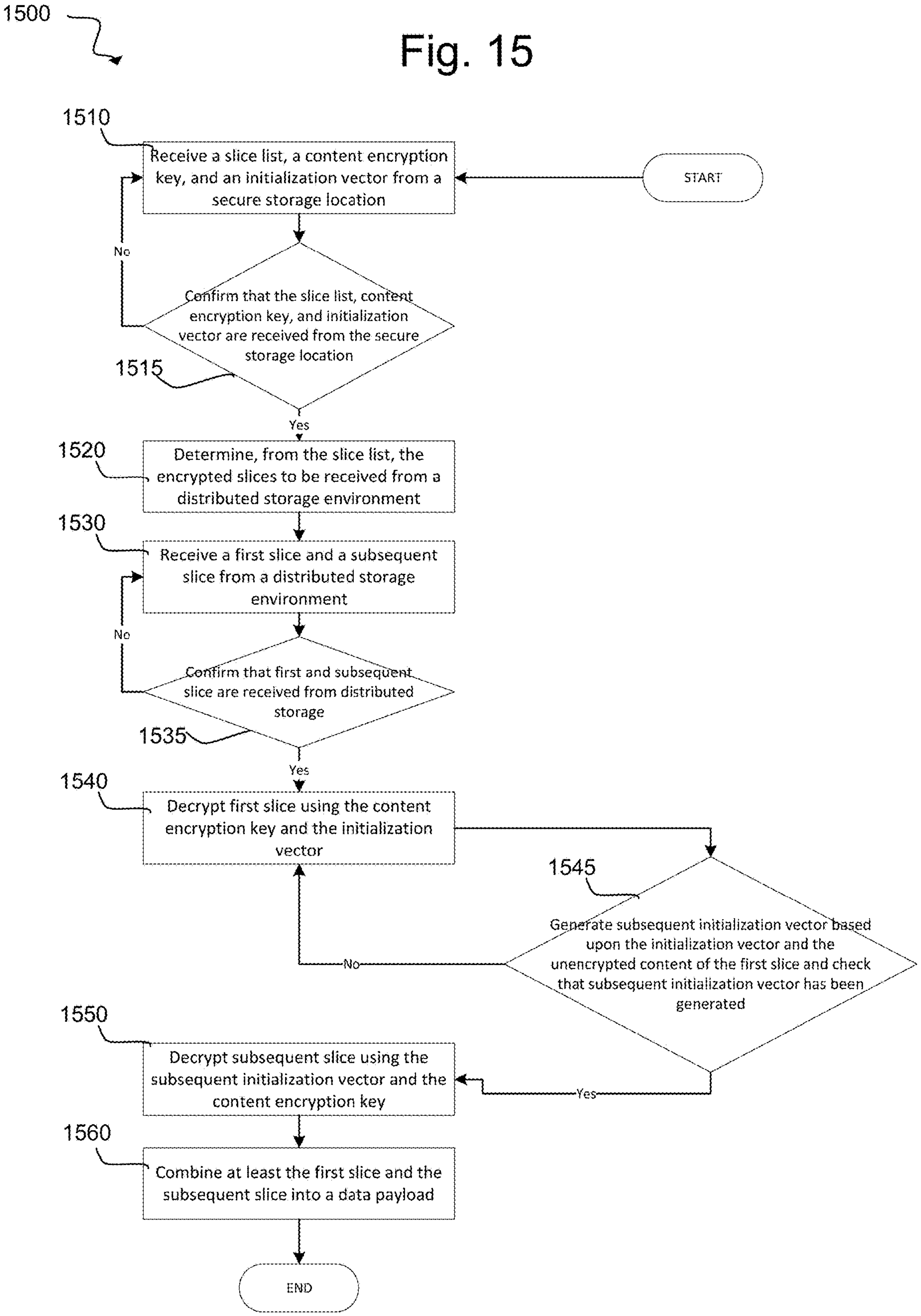
1500
Fig. 15
1510
Receive a slice list, a content encryption key, and an initialization vector from a secure storage location
START
No
Confirm that the slice list, content encryption key, and initialization vector are received from the secure storage location
1515
Yes
1520
Determine, from the slice list, the encrypted slices to be received from a distributed storage environment
1530
Receive a first slice and a subsequent slice from a distributed storage environment
No
Confirm that first and subsequent slice are received from distributed storage
1535
Yes
1540
Decrypt first slice using the content encryption key and the initialization vector
1545
Generate subsequent initialization vector based upon the initialization vector and the unencrypted content of the first slice and check that subsequent initialization vector has been generated
No
1550
Decrypt subsequent slice using the subsequent initialization vector and the content encryption key
Yes
1560
Combine at least the first slice and the subsequent slice into a data payload
END

DISTRIBUTED DATA CONTENT PROTECTION

BACKGROUND

The present disclosure relates to methods and systems for secure distribution of a data payload in a distributed storage environment. More particularly, but not exclusively, the present disclosure relates to distribution of a media item as the payload in a distributed storage environment, with the media item being divided into slices. The slices are then encrypted, with only trusted entities users being issued with the required information to decrypt the slices and view the media item.

SUMMARY

The general concept of file sharing in a distributed storage environment, specifically peer-to-peer file sharing, has been in existence for a number of years. Peer-to-peer file sharing has often been stigmatized as being a file transfer platform which is used for piracy, and thus development of peer-to-peer file sharing has not widely been adopted for distribution of a data payload in a secure fashion.

Peer-to-peer file sharing has been employed in the distribution of open-source operating systems, media, and/or software packages, with the content checked for integrity by way of a value from a cryptographic hash function, such as an SHA value or similar. Peer-to-peer file sharing has been employed in such a context for ease and speed of distribution, and in a scenario with little need for file security or encryption. The provision of such files or data via peer-to-peer file sharing such as BitTorrent or similar may expediate propagation and availability of such files in a decentralized environment.

In addition, distribution of media in a streaming environment may also be achieved by way of a decentralized or peer-to-peer file distribution.

Systems and methods are provided herein for encrypting data in a distributed storage environment. Such systems and methods may enable a content distributor to provide content for consumption quickly and conveniently. Such systems and methods may divide a data payload into slices, the slices including a first slice and a subsequent slice, and generate a content encryption key and an initialization vector, encrypt the first slice, using the content encryption key and the initialization vector, to generate an encrypted first slice, generate a subsequent initialization vector for the subsequent slice based upon the initialization vector and the unencrypted content of the first slice, encrypt the subsequent slice using the subsequent initialization vector and the content encryption key, generate a list of the encrypted slices into which the data payload has been divided, publish to a secure storage location, the slice list, the content encryption key and the initialization vector for the first slice in the slice list, and output to a distributed storage environment, at least the encrypted first slice and the encrypted further slice.

Systems and methods are also provided herein for decrypting data in a distributed storage environment. Such systems and methods may enable a content consumer to receive content for consumption quickly and conveniently. Such systems and methods may receive, from a secure storage location, a slice list, a content encryption key, and an initialization vector, determine, from the slice list, the encrypted slices to be received from a distributed storage environment with the encrypted slices to be received including at least an encrypted first slice and an encrypted subsequent slice, receive, from the distributed storage environment, at least the encrypted first slice and the encrypted subsequent slice, decrypt the first slice, using the content encryption key and the initialization vector, to generate a decrypted first slice, generate a subsequent initialization vector for the subsequent slice based upon the initialization vector and the decrypted first slice, decrypt the subsequent slice using the subsequent initialization vector and the content encryption key, and combine at least the first slice and the subsequent slice into a data payload.

According to some examples of the systems and methods provided herein, the subsequent initialization vector for the subsequent slice is generated with a combination of the received initialization vector and an XOR operation of the unencrypted content of the first slice.

According to some examples of the systems and methods provided herein, dividing the data payload further includes dividing the data payload into a further subsequent slice. Such systems and methods may further generate a further subsequent initialization vector for the further subsequent slice based upon the subsequent initialization vector and the unencrypted content of the subsequent slice, and encrypt the further subsequent slice using the further subsequent initialization vector and the content encryption key.

In some examples, the step of dividing the data payload includes dividing the data payload into a final slice, and such systems and methods may further determine the size of the final slice, and on a determination that the final slice is smaller than the size of the first and subsequent slices, pad the size of the final slice such that when encrypted, the final slice is the same size as the unencrypted final slice.

According to some examples, the step of receiving, from the secure storage location, a slice list, a content encryption key, and an initialization vector further includes an authentication step, such that the slice list, content encryption key, and initialization vector may not be received without successful authentication.

In some examples, the initialization vector is generated from a seed value.

According to some examples of the systems and methods provided herein, a trusted execution environment is used to carry out various processes, such as: decrypting, using the content encryption key and the initialization vector, to generate a decrypted first slice; generating a subsequent initialization vector for the subsequent slice based upon the initialization vector and the decrypted first slice; and decrypting, the subsequent slice using the subsequent initialization vector and the content encryption key.

According to some examples, the disclosed systems and methods may: generate a replacement initialization vector to replace the initialization vector; select a slice to be re-encrypted; encrypt the selected slice, using the content encryption key and the replacement initialization vector, to generate an encrypted selected slice; generate a renewed slice list which includes the encrypted selected slice; publish, to the secure storage location, the renewed slice list, the content encryption key and the replacement initialization vector; and output, to the distributed storage environment, the encrypted selected slice.

According to some examples, the disclosed systems and methods may: receive, from the secure storage location, a renewed slice list and a replacement initialization vector to replace the initialization vector; determine, from the renewed slice list, the encrypted selected slice to be received from the distributed storage environment, receive, from the distributed storage environment, the encrypted selected slice; decrypt the selected encrypted slice, using the content encryption key and the replacement initialization vector, to generate a decrypted selected slice; and combine at least the previously-decrypted slice and the decrypted selected slice into a replacement data payload.

Systems and methods are also provided for encrypting data in a distributed storage environment, comprising dividing a media item into segments, the segments including a first segment and a subsequent segment, encoding the at least first and subsequent segments as at least a first representation and a second representation, wherein the first representation and the second representation are encoded at different bitrates, generating a content encryption key, a raw initialization value, and a first continuity reference, generating from the first continuity reference and the raw initialization value, a first master initialization vector for the first segment and a first segment continuity reference, generating a first representation-specific initialization vector for the first representation of the first segment, and a second representation-specific initialization vector for the second representation of the first segment, each based upon the first master initialization vector, encrypting the first representation of the first segment with the first representation-specific initialization vector and the content encryption key, and the second representation of the first segment with the second representation-specific initialization vector and the content encryption key, to generate an encrypted first segment, generating from the first segment continuity reference a second master initialization vector for the subsequent segment and a subsequent segment continuity reference;

The systems and methods may generate a third representation-specific initialization vector for the first representation of the subsequent segment and a fourth representation-specific initialization vector for the second representation of the subsequent segment, each based upon the second master initialization vector, encrypting at least the first representation of the subsequent segment with the third representation-specific initialization vector and the content encryption key, and the second representation of the subsequent segment with the fourth representation-specific initialization vector and the content encryption key, to generate an encrypted subsequent segment, generating a segment reference list of the encrypted segments into which the media item has been divided and information about the representations into which each segment has been encoded;

The systems and methods may publish, to a secure storage location, the segment reference list, the content encryption key, the raw initialization value, and the continuity reference, and outputting, to a distributed storage environment at least the encrypted first segment and the encrypted subsequent segment.

In some examples, the disclosed systems and methods may generate a zeroth representation-specific initialization vector for the first representation of the first segment based upon the master initialization vector for the first segment.

In some examples, the disclosed systems and methods may generate a zeroth representation-specific continuity reference for the first segment.

In some examples, the disclosed systems and methods may further generate a zeroth representation for the subsequent segment, wherein the zeroth representation does not include a portion of the media item, and generate a zeroth representation-specific continuity reference for the subsequent segment.

In some examples, the zeroth representation-specific initialization vector is used as the first segment continuity reference.

In some examples, the first continuity reference is generated from an identifier associated with the media item.

In some examples, the first continuity reference is a fixed value.

In some examples, dividing the media item further includes dividing the media item into a further subsequent segment, and the disclosed systems and methods may further include encoding the further subsequent segments as at least a first representation and a second representation, wherein the first representation and the second representation are encoded at different bitrates, generating from the subsequent segment continuity reference a third master initialization vector for the further subsequent segment and a further subsequent segment continuity reference, generating a fifth representation-specific initialization vector for the first representation of the first segment and a sixth representation-specific initialization vector for the second representation of the first segment, each based upon the third master initialization vector, encrypting at least the first representation of the further subsequent segment with the fifth representation-specific initialization vector and the content encryption key, and the second representation of the further subsequent segment with the sixth representation-specific initialization vector and the content encryption key, to generate an encrypted further subsequent segment.

In some examples, the first representation-specific initialization vector is generated from the first master initialization vector using an HMAC key.

In some examples, the slice reference list includes one alternative representation for each of the segments.

In some examples, the slice reference list includes all possible initialization values for each representation of each segment.

In some examples, the master initialization vector is generated from a seed value.

According to some examples, the disclosed systems and methods may generate a replacement raw initialization vector to replace the raw initialization vector, select a segment to be re-encrypted, generate, from the relevant continuity reference and the replacement raw initialization value, a replacement master initialization vector for the selected segment and a selected segment continuity reference, generate a replacement representation-specific initialization vector for the first representation of the selected segment and a replacement second representation-specific initialization vector for the second representation of the selected segment, each based upon the replacement master initialization vector, encrypt at least the first representation of the selected segment with the replacement representation-specific first initialization vector and the content encryption key, and the second representation of the first segment with the replacement representation-specific second initialization vector and the content encryption key, to generate a replacement encrypted segment, generate a renewed segment reference list of the encrypted segments into which the media item has been divided and information about the representations into which each segment has been encoded and which includes the replacement encrypted selected segment, publish to the secure storage location, the renewed segment list and the replacement raw initialization vector, and output, to the distributed storage environment, the replacement encrypted selected segment.

Systems and methods are also provided herein for decrypting data in a distributed storage environment, the method including the steps of receiving, from a secure storage location, a segment reference list, a content encryption key, a continuity reference, and a raw initialization value, determining, from the segment reference list, the encrypted segments to be received from a distributed storage environment, wherein the encrypted segments to be received include at least an encrypted first segment and an encrypted subsequent segment, and the encrypted first segment and encrypted second segment each include at least a first and second representation, determining the representation for each segment which is to be retrieved, generating, using control circuitry, from the continuity reference, a first master initialization vector for the first segment and a first segment continuity reference, generating a first representation-specific initialization vector for the required representation of the first segment from the first master initialization vector, receiving, from the distributed storage environment, the required representation for at least the first segment, decrypting the received representation of the first segment with the first representation-specific initialization vector and the content encryption key to generate a decrypted first segment, generating, for display, the decrypted first segment, generating from the first segment continuity reference, a second master initialization vector for the subsequent segment and a subsequent segment continuity reference.

The systems and methods may generate a second representation-specific initialization vector for the required representation of the second segment from the second master initialization vector, receiving, from the distributed storage environment, the required representation for at least the second segment.

The systems and methods may decrypt the received representation of the second segment with the second representation-specific initialization vector and the content encryption key to generate a decrypted subsequent segment, and generating, for display, the decrypted second segment.

In some examples, the systems and methods may require successful authentication prior to the step of receiving, from the secure storage location, a segment reference list, a content encryption key, and a continuation reference further includes an authentication step, such that the slice list, content encryption key, and initialization vector.

In some examples, the master initialization vector is generated from a seed value.

In some examples, the steps of generating, from the continuity reference, a first master initialization vector for the first segment and a first segment continuity reference, generating a first representation-specific initialization vector for the required representation of the first segment from the first master initialization vector, decrypting the received representation of the first segment with the first representation-specific initialization vector and the content encryption key to generate a decrypted first segment, generating from the first segment continuity reference, a second master initialization vector for the subsequent segment and a subsequent segment continuity reference, generating a second representation-specific initialization vector for the required representation of the second segment from the second master initialization vector.

The systems and methods may decrypt the received representation of the second segment with the second representation-specific initialization vector and the content encryption key to generate a decrypted subsequent segment, are carried out in a trusted execution environment.

In some examples, the systems and methods may further include receiving, from the secure storage location, a renewed segment list and a replacement raw initialization vector to replace the raw initialization vector, determining from the renewed slice list, the replacement encrypted segment to be received from the distributed storage environment, receiving, from the distributed storage environment, the replacement encrypted segment.

In some examples, the first representation-specific initialization vector is generated from the first master initialization vector using an HMAC key.

In some examples, the slice reference list includes one alternative representation for each of the segments.

In some examples, the slice reference list includes all possible initialization values for each representation of each segment.

Systems and methods are also provided herein for decrypting data in a distributed storage environment, the method including the steps of receiving, from a secure storage location, a segment reference list, a content encryption key, a continuity reference, and a raw initialization value, determining, from the segment reference list, the encrypted segments to be received from a distributed storage environment, wherein the encrypted segments to be received include at least an encrypted first segment and an encrypted subsequent segment, and the encrypted first segment and encrypted second segment each include at least a first and second representation, determining the representation for each segment which is to be retrieved, generating from the continuity reference, a first master initialization vector for the first segment and a first segment continuity reference, generating a first representation-specific initialization vector for the required representation of the first segment from the first master initialization vector, receiving, from the distributed storage environment, the required representation for at least the first segment;

Systems and methods are also provided herein for decrypting the received representation of the first segment with the first representation-specific initialization vector and the content encryption key to generate a decrypted first segment, generating, for display, the decrypted first segment, receiving a zeroth representation-specific continuity reference for the first segment, generating from the zeroth representation-specific continuity reference, a second master initialization vector for the subsequent segment and a subsequent segment continuity reference, generating a second representation-specific initialization vector for the required representation of the second segment from the second master initialization vector, receiving, from the distributed storage environment, the required representation for at least the second segment, decrypting the received representation of the second segment with the second representation-specific initialization vector and the content encryption key to generate a decrypted subsequent segment, and generating, for display, the decrypted second segment.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 11 illustrates exemplary pseudo-code for a multi-bitrate stream which includes content protection, in accordance with some embodiments of the disclosure.

FIG. 15 illustrates a flowchart representing a process for receiving and decrypting a data payload in a distributed storage environment in accordance with some examples of the disclosure;

DETAILED DESCRIPTION

Figure 1:
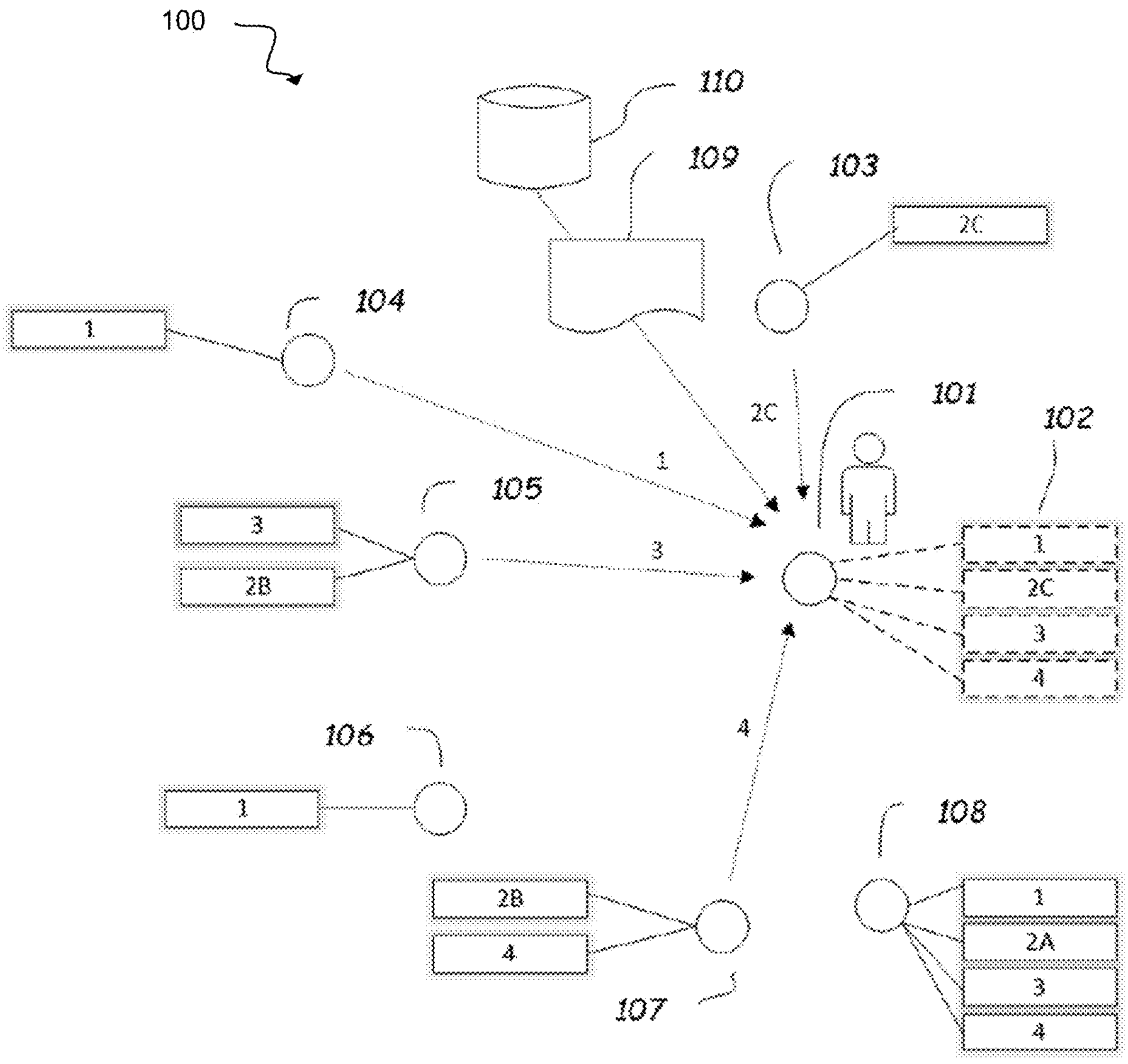
FIG. 1 illustrates an overview of a user collecting a complete set of slices of a data payload in a distributed storage environment in accordance with some examples of the disclosure.

FIG. 1 illustrates a setup, in which a user at a node 101 may collect a complete set of Slices 102 from other nodes 103, 104, 105, 106, 107, 108. In order to do this, the user's node 101 may retrieve a slice reference list 109 from an authorized reference service 110, which contains references to slices that form part of the complete set of slices of requested data payload. In some examples, the slice reference list is a .torrent file, which may be employed in BitTorrent technology known in the art.

Traditionally, mainstream content distribution architectures are based on centralized paradigms, using servers as shared resources, which serve streams or data files to clients. It therefore may be said that centralized distribution represents control in terms of both distributing pre-defined content and controlling who is served and who is not.

Peer-to-peer ('P2P') offers techniques that may improve the content delivery, such as pushing the content ahead of time, pushing the content off-hours, mirroring the content across the nodes, and using the nodes as caches.

Generally, DRM frameworks bind content usage licenses to an ability to decrypt the Content Encryption Key (CEK) that can be used to decrypt encrypted content material that can even be freely available in encrypted form by utilizing the so-called 'superdistribution principle'. The use of P2P networks (e.g., BitTorrent) allows content providers to utilize distributed storage network provided by P2P clients without investing in distributed storage systems. However, using P2P storage also distributes control of the encrypted media data. Reliance on the secrecy of a Content Encryption Key ('CEK') may not be enough and additional protection mechanisms may be desired.

In spite of such benefits, some bottlenecks and problems related to P2P have affected its utilization, especially for larger-scale use in the area of Digital Rights Management ('DRM'). In particular, piracy, which may be taken as spreading content without content owner/provider consent, is one of the known problems associated with P2P implementations. In part, this provides a stigma to P2P file distribution.

There are also other issues which may contribute to reasoning why the P2P paradigm has less commonly been used, which include that networks are optimized for mainstream centralized distribution, download speed typically exceeds upload speed, and establishing peer-to-peer traffic is depending on firewall and Network Address Translation ('NAT') configurations. Additionally, P2P distribution is relatively uncontrolled, both from content owners' and end users' perspectives, because content is stored in an environment that may look anarchistic; users serve other users that they do not know. Also, there is a fair chance that usage of content or storing portions of the content exposes user's consumption habits, which may raise privacy issues.

In an uncontrolled storage environment with DRM, if content access gets compromised, the content will be disclosed for undefined number of users during an undefined period of time. As a result, content right owners have not been willing to invest in P2P distribution, despite of cost-efficient superdistribution opportunities it may provide.

BitTorrent P2P network splits a media item (e.g., a movie) to slices that can be stored in the nodes of the P2P network. A cryptographic hash of each slice is recorded and stored into a descriptor file called a torrent file, and the hash value is used as a search key for the slice. BitTorrent versions may also use a magnet link, which is a cryptographic hash calculated from the hash list of the media slices, as a key to load the slice hashes from the P2P network.

Individual nodes in a P2P network can store a number of media item slices. As the size of this storage is limited, the node typically must drop some storage objects in order to make room for a new one. Different cache replacement policies (e.g., least-recently used) can be used. Content protection may be based on symmetric key cryptography and secrecy of media item specific Content Encryption Key ('CEK') that is only exposed to DRM users having a valid license to the media item. In some examples, the CEK is only exposed to isolated (trusted) execution environment with direct access to a decoding hardware, so that the CEK is never visible in user's normal execution environment (neither kernel nor userspace). If the CEK is exposed, there is a threat that it will leak, and the media item is then available to unauthorized viewers.

In an example, a Trusted Execution Environment ('TEE') is able to decrypt the CEK and is able to pass the decrypted CEK directly to the decrypting hardware without exposing the key to the operating system (e.g., 'NormalWorld' in Arm processors). In practice, as devices have different capabilities and manufacturers, there may be lack of support for this feature or even device-specific implementation flaws.

It should be noted that quite sophisticated methods, such as side-channel attacks can be used by devoted pirates. Concluding previous considerations, it is fair to assume that such weakness in legacy DRM links may exist that can be broken, while P2P—with its advantages otherwise—adds on an uncontrolled distribution environment.

Consequently, DRM should be addressed in a uniform way in the system, not relying on implementation of individual devices or operating systems.

A notable observation behind the content of the present disclosure is that the P2P distribution, such as BitTorrent, typically represents a cache-like storage, also described as a distributed storage environment, in which the most often used content gets refreshed and stays available, whereas less frequently used content gets obsoleted and is cleared from the storage. Thus, if there is a large group of legitimate users and only a small number of users of the pirated content, it may be assumed that less frequently-accessed content will eventually disappear from the storage.

Another issue is that legacy systems are vulnerable to leaking of Content Encryption Keys ('CEK') as there is no other content protection mechanism than the secrecy of the CEK.

In known P2P file distribution systems, the media item is split into pieces called Slices (BitTorrent protocol employs slice sizes that are power of two and between 16 kB and 1 MB). The systems and methods described herein contemplate the use of slices as is understood, and the use of segments also, which may be used for distribution of streamed media, for example. The use of a slice-specific Initialization Vector (IV), and in some cases, a segment-specific IV, is used as an additional content protection mechanism in addition to the CEK, making the systems and methods described herein operate as a two-layer content protection solution. AES key change is a computationally expensive operation compared to a slice-specific IV situation in which an IV is employed.

In an example, all slices of a data payload, which may be a media item (e.g., a movie), i.e., the complete set of slices, is encrypted as a whole using symmetric key encryption (e.g., AES). However, each slice is encrypted with such a cascaded encryption block mode, that failing to decrypt the first block makes all subsequent blocks fail in decryption.

Additionally, decrypting each slice requires that at least a portion of the previous slice has been properly decrypted. In this kind of an arrangement, failing to decrypt one slice prevents viewing the content any further. User experience may either depend on the media player behavior when it is receiving incorrect input data or there may be format and integrity checks that can stop media playing when incorrect input data is detected.

Therefore, the systems and methods described herein may enable a content rights owner to obsolete a set of slices, by renewing with a different IV only one slice in the set, advantageously on a regular basis. In addition, this operation may also be performed when there are signs of content protection having been compromised. For example, protected content freely available in well-known pirated media sites. If leaked material is detected it is also important to be able to detect how or at least in which platform the content is leaked. Providing different (optimized) versions to different platforms and adding fingerprinting or watermarking (hereinafter referred for clarity as 'fingerprinting') information to content could help to narrow alternatives for the leak platform. The renewed version of said slice becomes a part of the official complete set of slices, frequently accessed by legitimate users, thus obsoleting the compromised set by changing only one slice.

Returning to FIG. 1, as an overview FIG. 1 illustrates a setup, in which a user at a node 101 collects a complete set of slices 102 from other nodes 103, 104, 105, 106, 107, 108. In order to do this, the user's node 101 retrieves a slice reference list 109 from an authorized reference service 110, which contains references to slices that comprise the complete set of slices of the requested data payload. An example slice reference list is a .torrent file, used in well-understood BitTorrent technology.

After receiving the slice reference list 109, the user's node 101 retrieves the complete set of slices 102 from the nodes found by the slice references in the list. Slice references may be, e.g., cryptographic hash values of each slice, used to search them in the P2P network, or a Uniform Resource Locator ('URL'), familiar to a person skilled in the art. In FIG. 1, nodes 104, 103, 105, and 107 contain the necessary slices that comprise the complete set of slices: slices 1, 2C, 3 and 4, respectively.

In FIG. 1, slice 2 represents the slice that has been renewed with a new IV: 2A illustrating the first version, 2B the second and 2C the most recent version that is now in official distribution. When several authorized users like that at node 101 request only the most recent version 2C, the oldest version gets only minuscule demand, if any, and becomes obsolete in the P2P network.

The Authorized Reference Service 110 may be based on a single server, a cloud server, or it may be a distributed service, e.g., in InterPlanetary File System ('IPFS'). It can be foreseen that future development of that which is described herein may include methods for distribution.

Furthermore, it may be advantageous for simplicity, that said Authorized Reference Service 110 also distributes CEKs and IVs, although these can be part of separate services, depending on, e.g., business logic of the whole system.

The present disclosure contemplates uses cases, in which a publisher uses the Authorized Reference Service as its trustworthy repository with access control, which may also be described as a secure storage location.

The cache-like storage, also described as a distributed storage environment, may be conceptually a torrent net, referring to a distribution method of the slice hash lists. In BitTorrent's case, a hash list can be either a Torrent file or a magnet link or any suitable type of slice hash list.

The following is an example publishing case to create DRM-protected content with additional IV-protection. The example is using a movie media item as an example and includes the following four steps, illustrated in FIG. 3.

A movie is split into around thirty unencrypted or plaintext slices 301. All plaintext slices are encrypted with the same CEK 303. In this example, encryption takes place using a block cipher, such as AES256 302 and Propagating Cipher Block Chaining ('PCBC'). The decryption key is memorized by the publisher; in AES256 it is the same as Content Encryption Key 303, and encryption of each slice S has a unique initialization vector, IV's, 304.

Figure 2:
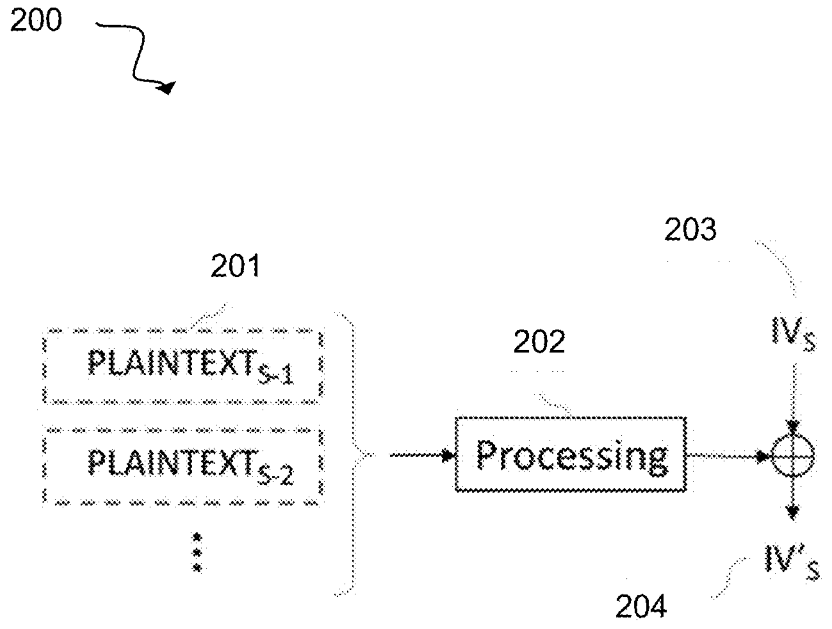
FIG. 2 illustrates an overview of initialization values may be computed in accordance with some examples of the disclosure.

Each IVs 304 (subscript S noting IV of slice S) is computed using at least a portion of plaintext of a previous Slice (S−1), a set of secret raw IVRs (IVR being a raw, source IV, and subscript S again noting the IVR of slice S) 301 shown in FIG. 2, memorized by the publisher, and encrypted slices, also described as ciphertext slices 305 are published in a cache-like storage.

FIG. 2 illustrates how IVs 204 of slice S may be computed from received IVRs 203 and previous plaintext slice(s) 201. Processing 202 the plaintext 201 may be performed by selecting the first plaintext block of the previous slice S−1 ($PLAINTEXT_{S-1}$, 1), which in turn would need successful decoding of the slice before it ($PLAINTEXT_{S-2}$, 1).

Effectively, first blocks of all previous slices should be decoded, all preceding IV's 204 computed in the sequence of slices. However, as FIG. 2 suggests, also portions of each previous slice's plaintexts 201 can be taken into computation. In general, any secret computed from previous slices would serve the purpose for creating dependencies to subsequent slices in presentation order.

Returning to FIG. 3, the mode of the encryption may be Propagating Cipher Block Chaining ('PCBC') with ciphertext stealing. Other alternatives do exist as well, and will be understood by those skilled in the art.

Figure 3:
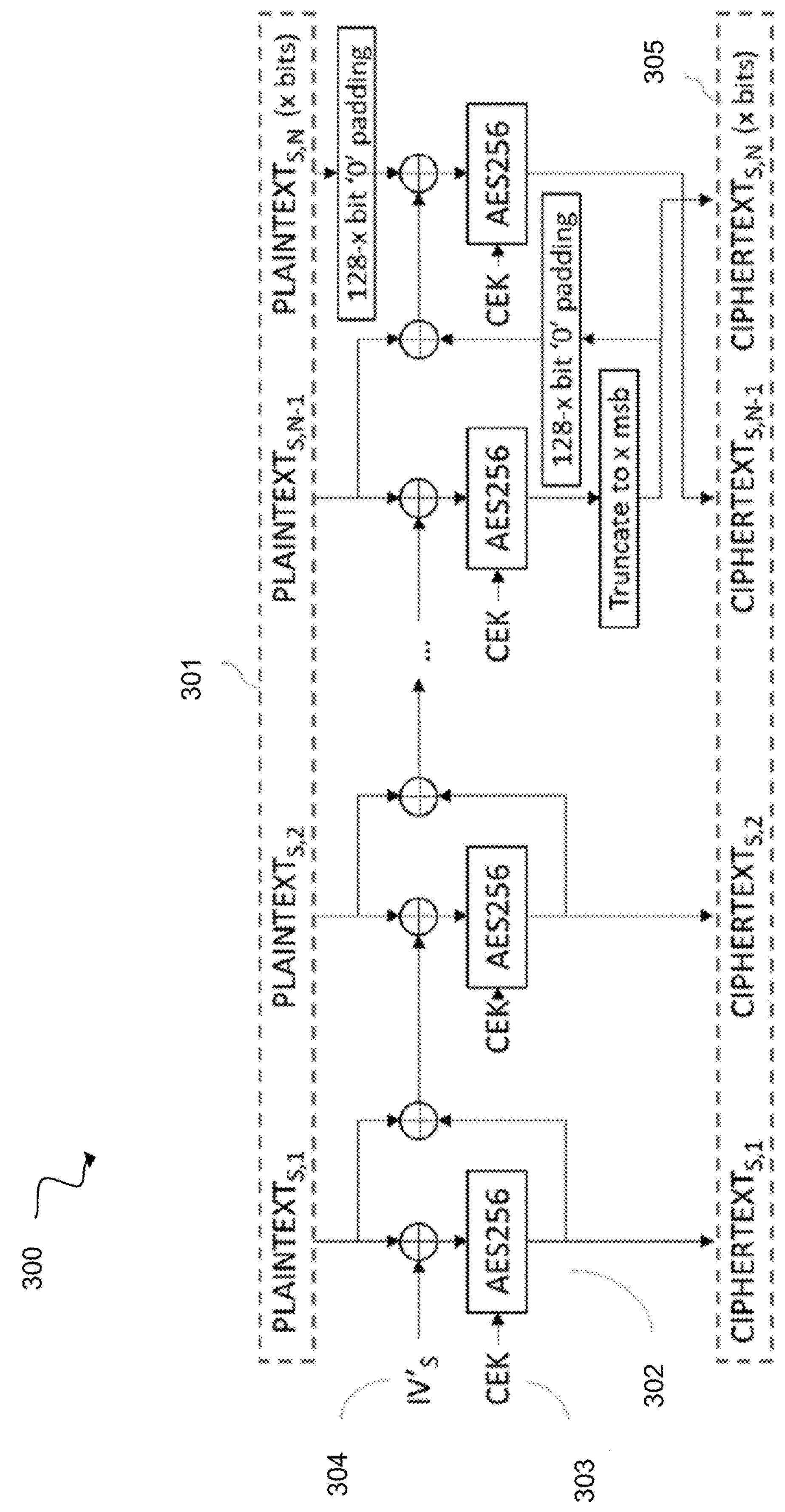
FIG. 3 illustrates an overview of the encryption of a data payload in a distributed storage environment in accordance with some examples of the disclosure.

It is noted that PCBC and ciphertext stealing are not commonly used together: In FIG. 3, plaintext and ciphertext are divided into N blocks of the same size as AES encryption (16 bytes, 128 bits). Since the size of the slice, and in particular if it is the last slice of the data payload, may not be divisible by block size, in which case there will not be enough bits in the plaintext to fill the last block completely. Ciphertext stealing helps to address this issue. In the terminology in FIG. 3, 'Truncate to x msb' means selecting as many (i.e. x) most significant bits as there are bits in the last block N, while '128-x bit '0' padding' means using the input bits as most significant bits and filling the remaining of the block (i.e. 128-x least significant bits) with zero bits. '128' is the cipher block size in bits, and if other than AES cipher is used, '128' should be changed accordingly.

Figure 4:
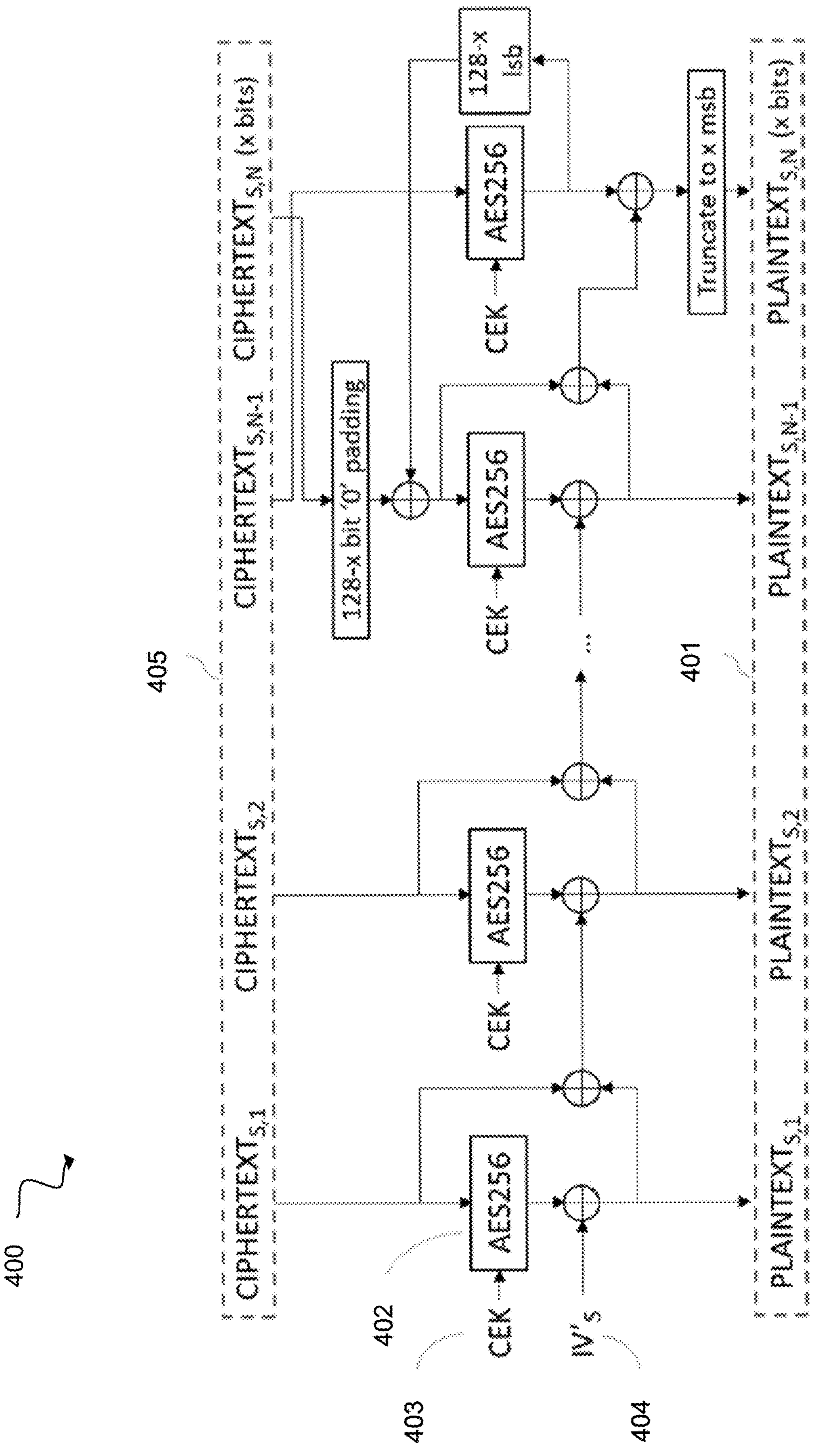
FIG. 4 illustrates an overview of the decryption of a data payload in a distributed storage environment in accordance with some examples of the disclosure.

Turning now to a process for media consumption, and with reference to FIG. 4, the end device requests key 403, the complete set of IVs and, with reference to FIG. 1, the slice reference list 109 from the authorized reference service 110. The end device receives the key and the slice reference list and the end device requests the slices from the cache-like storage, and receives the slices. The device decrypts the data payload using the key and the complete set of IVs, and the decoding or decryption of the slice is substantially the reverse of the encoding or encryption process.

As with FIG. 3, in FIG. 4, '128-x' lsb means extracting 128-x least significant bits, i.e. zeroing x most significant bits. It should be noted that even if the complete set of IVs gets compromised, the content in the cache-like storage becomes obsoleted after renewing even one slice, as the consumption of the older version goes down or reduces. However, if the content gets copied to somewhere else, then the proposed countermeasure is to fingerprint random slices, to disclose the pirate who has breached the content.

Media content slices are stored in the P2P storage cache. There should be a periodical activity that is publishing new versions of the content. New content will get the majority of media accesses and will eventually push the old content out from the P2P storage cache. If both the CEK 203 and the complete set of IVs have been leaked, this republishing will remove the content.

Republishing may re-encrypt at least one of the plaintext slices. In some cases the said slice(s) S may be selected at random, or may be selected by a predetermined criteria. Using new IVs, memorized by the publisher, the new IVs replaces the IVs to form a replacement initialization value. The new encrypted slice is published in the cache-like storage 110.

As a result, authorized use of the movie causes old, cached slices to gradually vanish from the cache-like storage. The procedure requires only a minimal amount of data to be updated to the cache-like storage.

In some examples, a Trusted Execution Environment ('TEE') may be used, with key processing taking place in a trusted computing environment. Trusted Execution Environment (e.g., TrustZone in ARM processors for mobile device platforms and either Intel's Software Guard extensions (SGX) or AMD's Secure Encrypted Virtualization (SEV) for Personal Computer (PC) platforms). TEE is a hardware-protected isolated computing environment, typically capable of memorize encryption/decryption keys and executing software code for processing given data by using the keys. The Keys cannot be accessed from the TEE, and neither cannot be the software code read unless the whole TEE is initialized. TEE also has a device identity based on hardware-based secret, e.g., eFuse or Physically Unclonable Function ('PUF') that can be used to derive device-specific keys. Trusted Platform Module ('TPM') can also be utilized as a key storage but as TPM only provides a fixed API, it is more limited than TEE environments that also allow isolated code to run.

In practice, a decryption key, also known as Content Encryption Key ('CEK') may be installed to the TEE in the first step of the media consumption, and the systems and methods implementing FIG. 4 may operate completely in the TEE: IV and ciphertext given as input, plaintext returned as output and directed advantageously to hardware accelerated rendering.

The first step of the media consumption may also be interpreted as a DRM license acquisition since the CEK may be embedded into a license. The whole license can be encrypted and signed by the DRM provider or only the CEK part is encrypted and the whole license is signed by the DRM provider. The DRM provider may use asymmetric encryption and encrypt the whole license or the CEK part using the user's device identity public key or using a dedicated key linked to the device identity. Alternatively, the TEE and the DRM provider can setup a secure channel between each other, for example Transport Layer Security ('TLS') connection or using just Diffie-Hellman key exchange (with certified keys) to setup a secure channel.

The complete set of IVs should also be included to the license data of the media item in addition to the CEK. All IV values could be stored in encrypted form and an individual IV is only decrypted just before the use and zeroized right after the use. This could add additional protection for attackers who are able to dump protected TEE memory. If an attacker is able to get the CEK of the media item, it is not yet enough to decrypt the stream as also IVs are needed. However, as IVs are slice specific that requires more work for the attacker. The attacker must repeat the dump attack for all slices.

In a further example, an IV generator may be utilized. If a TEE is utilized in DRM license processing and CEK+IV handling, it is possible to deploy code into user's device to generate IV values instead of embedding encrypted IV values to the license. For example, pseudo random number generator (PRNG) could be used to generate IV values to Slices. In this example, an encrypted seed value of the PRNG is included in the license.

TEE platforms that allow deployment of confidential code (e.g., Intel SGX) could be used to deploy an arbitrary IV generator code to TEE and the code can also contain secrets that are used in IV generation. This is also possible for other TEE platforms that could implement an interpreter for encrypted bytecode that is decrypted in device before execution.

It is also possible to use multiple code versions with different mechanisms to provide diversity so that different media items can have slightly different mechanisms to create IVs. Attackers have then more difficulties to repeat their attacks against additional protected media items.

In another example, fingerprinting may be employed. In this example, in encryption of a slice, non-critical bits in plaintext may be randomly varied. In modern video encryption, frames have typically Coding Units ('CU') of different sizes. Changing a DCT value in a small CU does not disturb viewing experience, however, it can be detected if a high-quality copy has been breached. A person skilled in the art of fingerprinting motion images may design and implement the most effective location for bit changes.

If an unauthorized party attempts to analyze which slices have been varied, they would need to be able to decode with correct CEK 203 and be able to compute IVs 204 of all previous slices, as mentioned before. Therefore, present disclosure provides additional protection against detecting fingerprints. It would be advantageous, that if a breach is assumed, different versions of slices are actively launched, each with small differences. Since it is identified in the authorized reference service 110, which one of the users has used slices with modifications, the pool of potential hackers can be narrowed down by means known by a person skilled in the art of big data analytics.

In some examples, there may be a custom-fingerprinted slice that may be provided for only one user, the suspected unauthorized user.

In a further example, a different object replacement policy may be utilized. In such an example, instead of using Least Frequently Used ('LFU') policy for the object replacement (i.e. slice renewal) in a BitTorrent-like distributed content repository, a Least Recently Used ('LRU') policy can be used.

When LFU is used, the slice with the least accesses is removed, whereas in the LRU policy, the slice removed from the cache-like memory is the one, for which the time period that has passed since last accessing a particular slice is the longest. There are indications that LRU will enable the highest traffic reduction in BitTorrent.

The techniques described herein in connection with single-bitrate delivery of media may also be applied to multiple-bitrate streaming and delivery of media. The systems, methods, and techniques to deliver IV-protected slices described above may also be developed to deliver IV-protected segments of video delivery.

As described above, a data payload, which may be a media item, may be divided into slices and made available through a distributed, or P2P, file distribution system. The term 'slice' and the term 'segment' may be used interchangeably; the term 'segment' is used herein when discussing a media item to be streamed, for example, using DASH, or any other suitable streaming protocol. The term 'slice' may be used interchangeably; the streaming may employ slices or segments. The techniques described for distribution of slices may be used for segments, and vice versa.

Herein the term 'IV-protected Segments' is used for segments at any bitrate, whose successful decoding depends on computing an IV from any previous data. By default, all segments are IV-protected. Secondly, MPEG-DASH allows content providers to have multiple versions of content with different bitrates and MPEG-DASH clients can dynamically adapt to bitrate variations by downgrading or upgrading streamed video by selecting different bitrate version for next chunks of the streamed video. At the heart of the MPEG-DASH specification is an XML-based MPEG-DASH Media Presentation Description ('MPD') format. MPEG-DASH MPD is also standardized by ISO/IEC as ISO/IEC 23009-1 and known as 'DASH'. The structure of the DASH media presentation format is exemplified in FIG. 8.

The DASH MPD divides a media stream to a list of periods that are media clip descriptions specifying a start time of each clip. This makes it possible to easily select a time slot to start viewing a stream. Each period can contain multiple Adaptation Sets. Different Adaptation Sets can specify different stream features, e.g., whether the stream includes stereo or multichannel audio, video format (HEVC vs. AVC), availability of subtitles for different languages. A media player may select an Adaptation Set based on stream decoding capabilities and user preferences. Each Adaptation Set can contain multiple Representations specifying different bitrates. MPEG-DASH monitors stream download speed and is able to switch to lower bitrate if the download speed is slowing down. Each representation contains a list of segments in the MPEG-DASH specification. As is further understood in the art, the MPD format contains a two-level time split. The stream is first split into Periods and each Period is then split into multiple segments.

A device configured to play MPEG-DASH content is expected to implement adaptive bitrate ('ABR') algorithms which are employed to continuously adapt the quality of the video stream based on available network bandwidth that is available to download new segments of the stream. The algorithms use buffering and can, for example, monitor available buffered content, to decide whether to switch to another bitrate. The algorithms also endeavor to avoid oscillation between different bitrates. BOLA, DYNAMIC, and FAST SWITCHING are algorithms which may be implemented in the open source software DASH reference client dash.js. Such algorithms are validated using simulations utilizing network traces of cellular and broadband networks.

MPEG-DASH is also DRM-aware. A DASH stream may include an XML element called 'ContentProtection' which may be used to specify DRM system specific information. The ContentProtection element is to be specified at the Adaptation Set level. An example of the MPEG-DASH which employs content protection and/or DRM is Microsoft PlayReady.

Although MPEG-DASH MPD has been specified for HTTP-based Content Delivery Network ('CDN') streaming usage, MPD may also be used for P2P delivery.

The DASH Industry Forum has proposed examples of MPD ContentProtection element usage. The following is a simple example of ContentProtection element to be embedded to AdaptationSet element. This example only sets an identifier (schemeIdUri), a name (value), and an authorization URL. The player should use the URL to authenticate to Authorized Reference Service to get the first set of IVs to use the stream. Web browsers may use W3C Encrypted Media Extensions ('EME') to play DRM protected MPEG-DASH content.

The MPD format may be used to specify TorrentDRM protected streaming media providing alternative sources for each segment. Another option is to define different TorrentDRM content versions as different MPD Adaptation Sets. MPEG-DASH content protection guidelines are described by the DASH Industry Forum Implementation Guidelines. TorrentDRM specific settings can be included inside an MPD ContentProtection XML element that is expected to contain DRM system specific XML elements. XML parsers that are not TorrentDRM aware could omit these elements as long as the format is XML-based. A TorrentDRM MPD ContentProtection element could contain a URL that is used to initiate a transaction to load a set of next IVs for the stream. Forcing the client to use an online connection to download IVs provides a second level of protection in addition to CEK. The connection may include or utilize additional authentication and also remote attestation-based integrity verification of the connected client.

With reference to FIG. 1, and in an example of the systems and methods described herein, and in relation to MPEG-DASH, an MPD is created by an Authorized Reference Service 110. Segments may be defined in the MPD. In some cases, the segments may need to be refreshed, for example in the case that the content protection employed, such as the Master IV, has been compromised. In the beginning of launching refreshed segments, the MPD contains the refreshed segments in the beginning of the list, but previous version(s) may also be included. When receiving the segments, switching to a previous version of a segment or segments may keep an old version of the segment alive in the network for longer. However, as preferred segments are new segments, these new segments may prevail in the long run.

To support swapping between different bitrates, it is proposed to introduce Master IV ('MIV') values for the segments. IVs of different bitrates may then be computed from the segment specific MIV. The notations of IV' and segment (S) specific IV's, described earlier, will hereinafter be superseded by notation of $IV_{R,S}$, R standing for 'enumerated Representation'. In practice, when a segment is renewed, as described earlier herein in connection with slice renewal, more than one bitrate—and in some cases all—are re-encrypted using new Representation-specific IVs.

A dependency requirement between segments is described herein above, and in order to decode segment S, the computing device also decoded segment S−1, having its Plaintext at hand. This helps to create continuity over the segments. However, in a multiple bitrate environment, such as MPEG-DASH, the segment S−1 may have been any bitrate, not necessarily the same that will be used for segment S. Therefore, it may not be assumed that the computing device has the segment S−1 decoded to Plaintext that can be used for such a dependency requirement.

Figure 7:
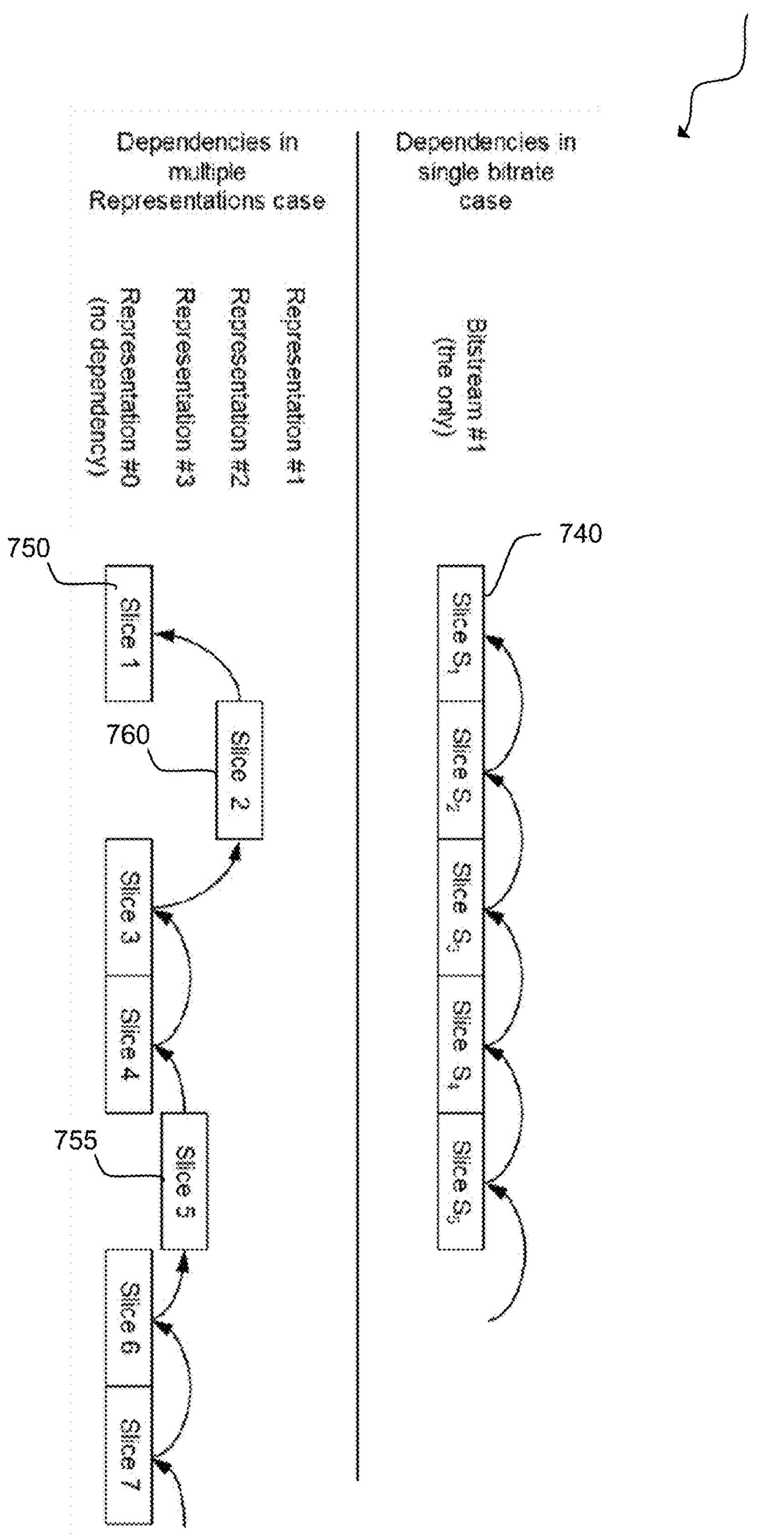
FIG. 7 illustrates the concept of dependencies in both a single bitstream and multiple representation bitstreams in accordance with some examples of the disclosure.

As described herein, with multiple Representations, as compared to the single bitrate environment, dependencies do not always have to be based on real video streams, as it may not be possible to know in advance which bit rate an MPEG-DASH player will eventually choose for each segment. To help prevent unnecessary use of bandwidth and computational effort, for most segments S, the player does not have to decode segment S−1; instead, a value that changes deterministically may be used. As illustrated in FIG. 7, a specific Representation (i.e. certain bitrate stream) will be requested to be decoded, for continuity, only sporadically.

The information from previous segment S−1, which is requested for decoding segment S, will hereinafter be referred to as a Continuation Reference (for segment S), and abbreviated in the figures by 'CR'.

Figure 5:
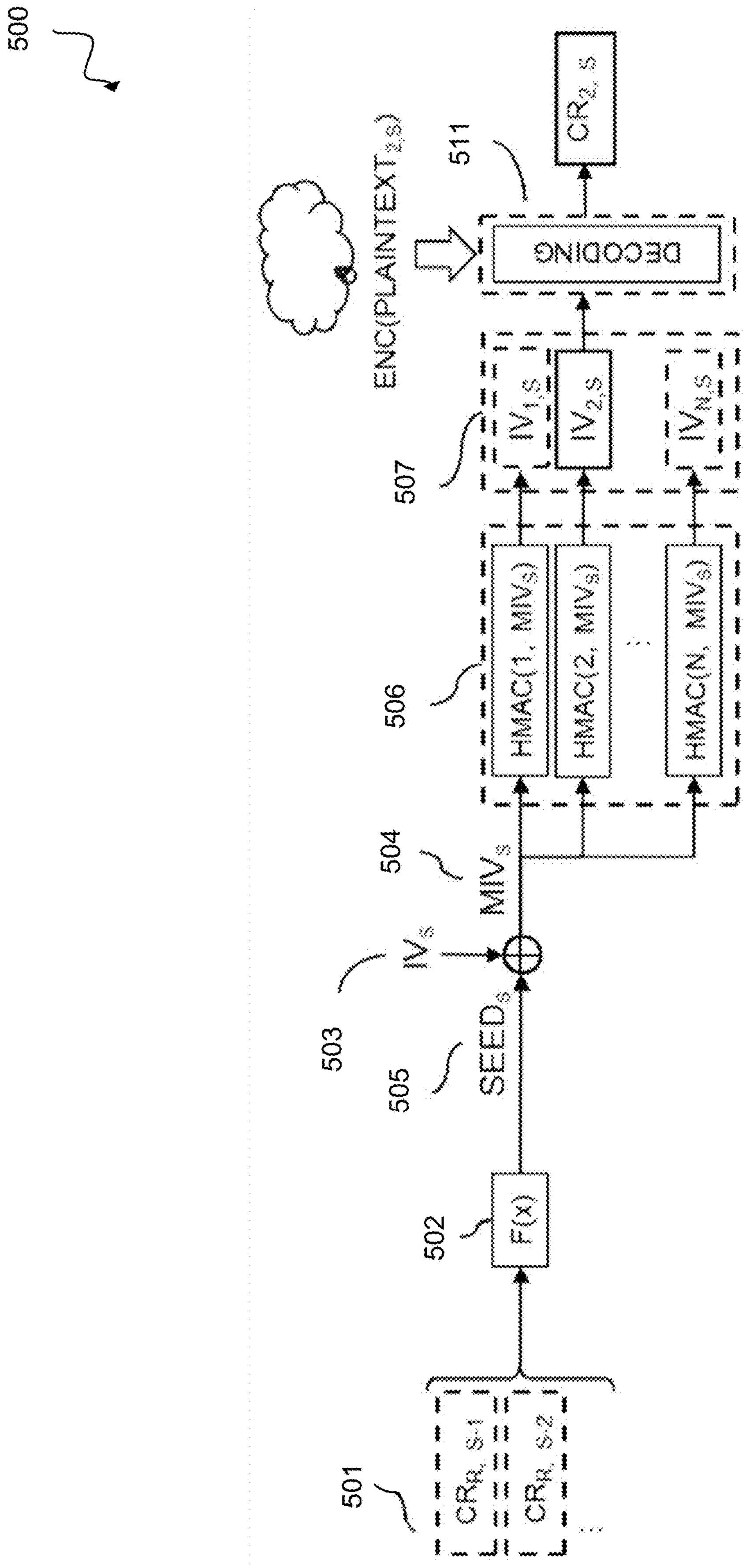
FIG. 5 illustrates an overview of the encryption of a data payload in a distributed storage environment in accordance with some examples of the disclosure.

The Authorized Reference Service provides IVs for each segment, to be used—together with the Continuity Reference—for computing MIV, in turn used to compute Representation specific IVs for decoding. As illustrated in FIG. 5, Continuity References 501 of previous segments' IVs are used for computing subsequent IVs. In this example, instead of a fixed Representation (i.e. certain bitrate video stream), more than one Representation referred to in a MPEG-DASH adaptation set (hereinafter the Continuation Reference for a segment) are sporadically used for the computation.

FIG. 5 illustrates a variation of FIG. 1, which is directed more particularly for single bitrate environments. At least a portion of previous Plaintexts 501 are processed to create a Segment-specific Seed 505, and the Continuation Reference may originate from a decoded 511 stream of any Representation.

$$MIV_S = F(CR_{R,S-1})XORIV_{X,S} \quad \text{[Equation 1]}$$

In Equation 1, which is also represented in FIG. 5, the role of the Function F(x) 502 is to truncate the input data to the same size with the $IV_{R,S}$ 501, which helps to enable a convenient XOR operation between the input data and the $IV_{R,S}$ 501. In an example, the size of said IV is the same as the size of the AES encryption block, 128 bits. The result is $MIV_S$ 504. XOR is illustrated only as an example; a person skilled in the art may choose any function that has at least two parameters affecting the outcome.

To support multiple bitrates, as illustrated in FIG. 5, segment specific IVs 503 for each Representation 1 . . . N are computed from the segment specific MIV, such as by using a cryptographic hash function with a key, such as HMAC. An HMAC Key may be unique to the representation bit rate, it may be a target bit rate, or as in the illustration, an enumerated value ("1", "2", . . . "N").

Therefore, if any obsoleted Representation (i.e. bitrate) interrupts playout at some point, as a re-encrypted single bitrate stream as described earlier herein may do, the remainder of the Representation cannot be decoded properly. Interruption even at one point would encourage legitimate use and consequently get the obsoleted segment removed from the Cache-Like Storage.

Figure 6:
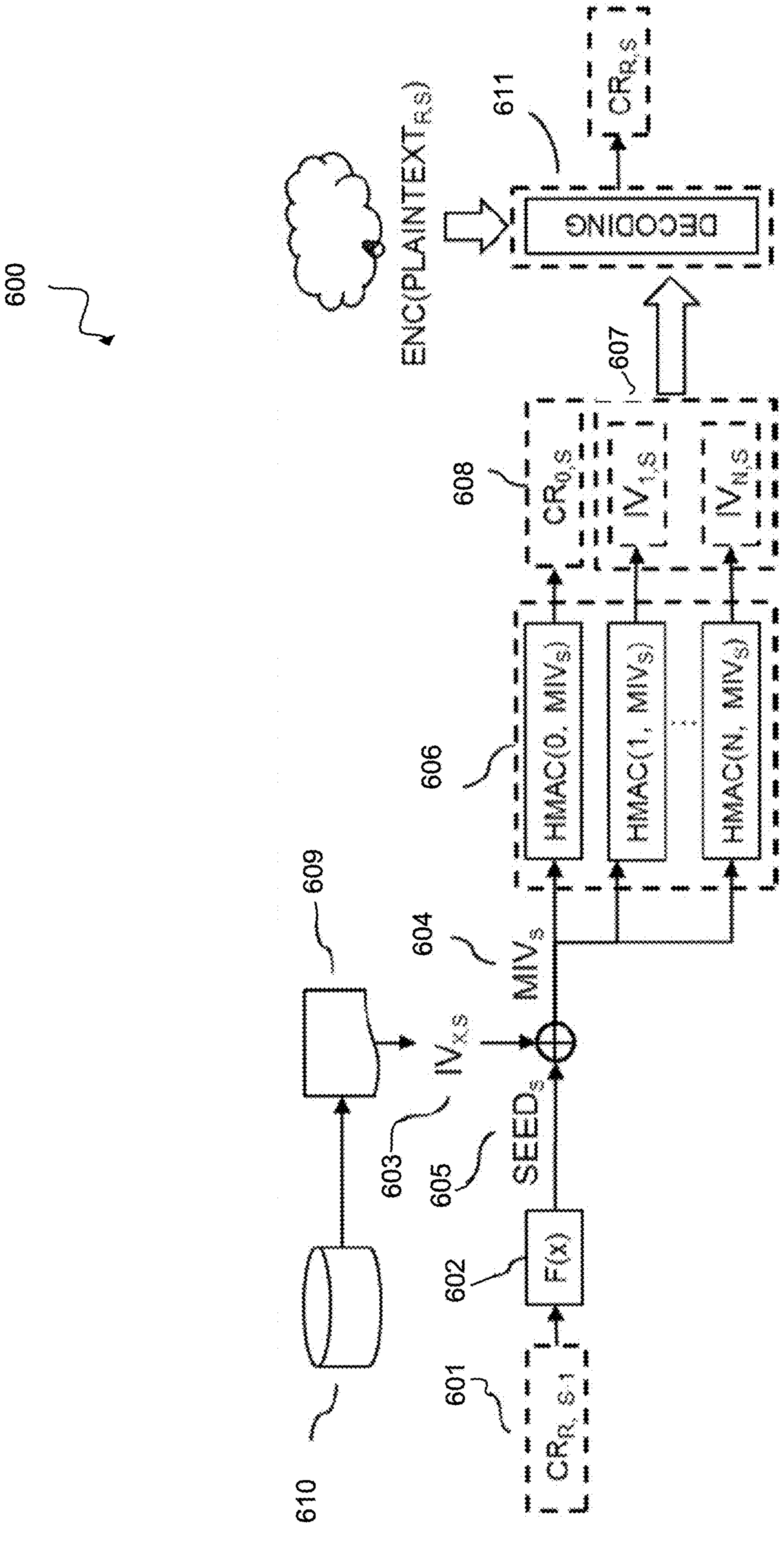
FIG. 6 illustrates an overview of the encryption of a data payload in a distributed storage environment in accordance with some examples of the disclosure.

Turning now to FIG. 6, the Segment Reference List 609 obtained from Authorized Reference Service 610 contains IVs for each segment, with random Representations as Continuation References. The IV 603 in each segment depends on which was the selected Representation in Continuation References for the previous segment. The creation of these IVs in the Authorized Reference Service will be discussed later herein. According to an aspect, the segments chosen by the Authorized Reference Service, 'ARS', for the playout are eventually decoded to validate the continuity.

FIG. 6 also introduces another aspect that includes a Continuation Reference that may also originate from the MIV of a previous segment. This kind of a Continuation Reference is referred to as a Rolling Continuation Reference.

In FIG. 6, representation enumeration '0' is reserved for said Rolling Continuation Reference 608, which does not relate to any bitstream encoding. Continuation Reference is computed from the previous MIV (by using HMAC, as illustrated in FIG. 6). It should be noted, that '0' is a notation by way of example.

In FIG. 6 as part of the Rolling Continuation Reference the HMAC output is XOR'ed with the next segment $IV_{S+1}$ to yield the next $MIV_{S+1}$.

As also presented in FIG. 6, an IV is computed most frequently from the Rolling Continuation Reference, and only sporadically from an actual bitstream Representation, which helps to save effort in Decoding 611 and the associated data transfer, processing power, and bandwidth required. The Rolling Continuation Reference facilitates computing $MIV_{S+1}$ from $MIV_S$, by simply circulating it through HMAC.

Initial Plaintexts (for example S=0, if the first segment is represented by S=1) may be all zeroes, or HASH values of a content id, for instance.

In an example, all Representations are selected at least once in the Segment Reference List 609 that the Authorized Reference Service computes case-by-case. While doing the computation, Authorized Reference Service may also provide respective IVs 603, which are discussed after a brief description of processing steps shown in FIG. 9.

Importing content and initially creating IVs will now be considered. In an aspect, for each segment S, $MIV_S$ 604 will be defined first by using a cryptographic nonce (i.e. arbitrary number used just once), as described in Equation 2 below. Because in the Segment Reference List a Continuity Reference for a segment S may be based on an arbitrary Representation R, a table of different IVs, notation $IV_{R,S}$ 603 is computed and stored in the Authorization Reference Service 610; for each R and S the following values are stored.

$$MIV_S = \text{cryptographic nonce} \quad \text{[Equation 2]}$$

$$IV_{R,S} = F(CR_{R,S-1})XORMIV_S \quad \text{[Equation 3]}$$

This is an example of how the IVs are initially created, eventually to be delivered to user, and are created in sequential order beginning from segment 1.

Returning to FIG. 6, since R is randomly selected for a playout for each segment S, and it is not dependent upon the Representation eventually used in the playout, a set of $IV_{X,S}$'s included in the Segment Reference List 609 may befixed in the beginning of the playout. This may also provide time for the decoding process to commence.

For simplicity and computational performance, the function F(x) 602 may select the first encryption block of Plaintext; therefore, in order to compute the Seed 605, only the beginning of Ciphertext of the previous segment from the stream used for Continuation Reference has to be decoded. Therefore, the computational overhead may be negligible.

The other overhead, downloading the beginning of said selected stream segment S, may be carried out at any time after receiving the Segment Reference List 609. Overhead may be further reduced by only downloading the first encryption block.

$MIV_S$ may be updated on frequent basis, as described above. In a case where a Continuation Reference relates to an encoded stream, the decoded segments remain the same, and, therefore, there is no need to adjust subsequent $MIV_s$. However, if the continuity originates from the Rolling Continuity Reference 608, subsequent $MIV_{S+1}$, and all $MIV_s$ after it would change without any countermeasures. Re-encoding one segment, however, would lead to re-encoding all segments after it. Therefore, in the present example, also $IV_{0,S+1}$ for Rolling Continuity Reference (i.e. R=0 in FIG. 6) is updated in the Authorized Reference Service 610 in order to keep $MIV_{0,S+1}$ 604 the same. In an illustrative process of FIG. 6, the update would be as follows:

$$MIV_S^{NEW} = \text{cryptographic nonce} \quad \text{[Equation 4]}$$

-continued $$IV_{0,S+1}^{NEW}=(IV_{0,S+1}^{OLD})XOR(F(CR_{0,S}^{NEW}))XOR(F(CR_{0,S}^{OLD}))\quad\text{[Equation 5]}$$

In a variation of FIG. 6, the simple XOR on the left may be replaced by another function that takes at least two variables, and/or the XOR (or another function, as discussed) may be applied after HMAC 606 or AES256 as discussed in connection with FIG. 3 and FIG. 4. Also, $IV_{0,S+1}$ may be re-computed from Equation 3. In these cases, the person skilled in the art can also re-design Equation 5 respectively.

In another example, the Segment Reference List is created for each playout occasion individually, which helps to enable fingerprinting of the content. Fingerprinting, in turn, helps to mitigate illegal content redistribution, e.g., by using HDMI splitters with HDCP bypass, or D/A screen recorders.

In a further example, all computing at the client end, as presented in FIG. 6 may processed in a Trusted Execution Environment ('TEE') of the client end device as described above, into which CEK and IVs are transferred using security practices familiar to a person skilled in the art.

Since the Authorized Reference Service 610 is the source for CEKs and IVs, having it compromised would potentially expose the whole collection of content in the Cache-Like Storage. Therefore, a further example may use IVs stored in the Authorized Reference Service to be encrypted by service-specific encryption key. In this embodiment, when a user subscribes a to particular streaming or over-the-top service and installs a corresponding app, or logs-in to the service, service-specific keys may be delivered to the TEE and used for decoding at least IVs related to an item of media content which is played back.

As discussed above and illustrated in FIG. 5, the Continuity Reference may be based on one or more of the encoded media streams. In a yet further example, a low-bitrate stream may be selected for this purpose. Besides low-bitrate video, the stream could also be an audio stream common to multiple video streams, a thumbnail slideshow stream, or a dedicated stream containing data only for the purpose of dependency, for example. An aspect of such a procedure is that the stream used for Continuity Reference will be encrypted using an IV, such as in the same way as the single bitrate stream described herein. A very-low bitrate video stream could also be used as an ancillary stream to reduce zapping time.

As described herein and illustrated in FIG. 5 and FIG. 6, a MIV is used to generate IVs for different representations 1 . . . N. As an additional example, HMAC (1, $MIV_S$) . . . HMAC (N, $MIV_S$) can be replaced by using the $MIV_S$ directly, i.e., $IV_{N,S}=MIV_S$.

The systems and methods described herein also help to address a situation in which encoder make, version, and parameters can be resolved. Assuming that a user, group of users, and/or a party or similar may access the original content, they may then be able to encode everything with bit-precision in the same way that has been done when encoding content to the Cache-Like Storage. It may then be possible to compute all IVs. Besides video production, video compression methods are lossy, and therefore reconstructing the original is very unlikely, and in some cases not possible.

However, to help avoid even this unlikely occurrence, the original version from which different bitrates are created may be kept secret: in this example, no encoding uses another Representation as a source.

In another example, not all bitstreams or Representations are encrypted. This might be a case of very-low bitstreams that could be used as an ultimate and most robust fallback in playout. In this case, since creating a Continuity Reference to an unencrypted stream may not substantially improve security, the Representations in this example are not selected to the Segment Reference List 609 that the Authorized Reference Service computes case-by-case.

In a yet alternative example, not all segments in all bitstreams are IV-protected, and some segments may even not be encrypted at all. Doing this may simplify computational complexity. However, it may be beneficial that IV-protected Segments would be selected at least once in the Segment Reference List 609 that the Authorized Reference Service computes case-by-case, since such a selection would disturb the viewing experience of end-users if the end-user in question is not capable of decrypting the stream used for the Continuity Reference of the segment.

Figure 8:
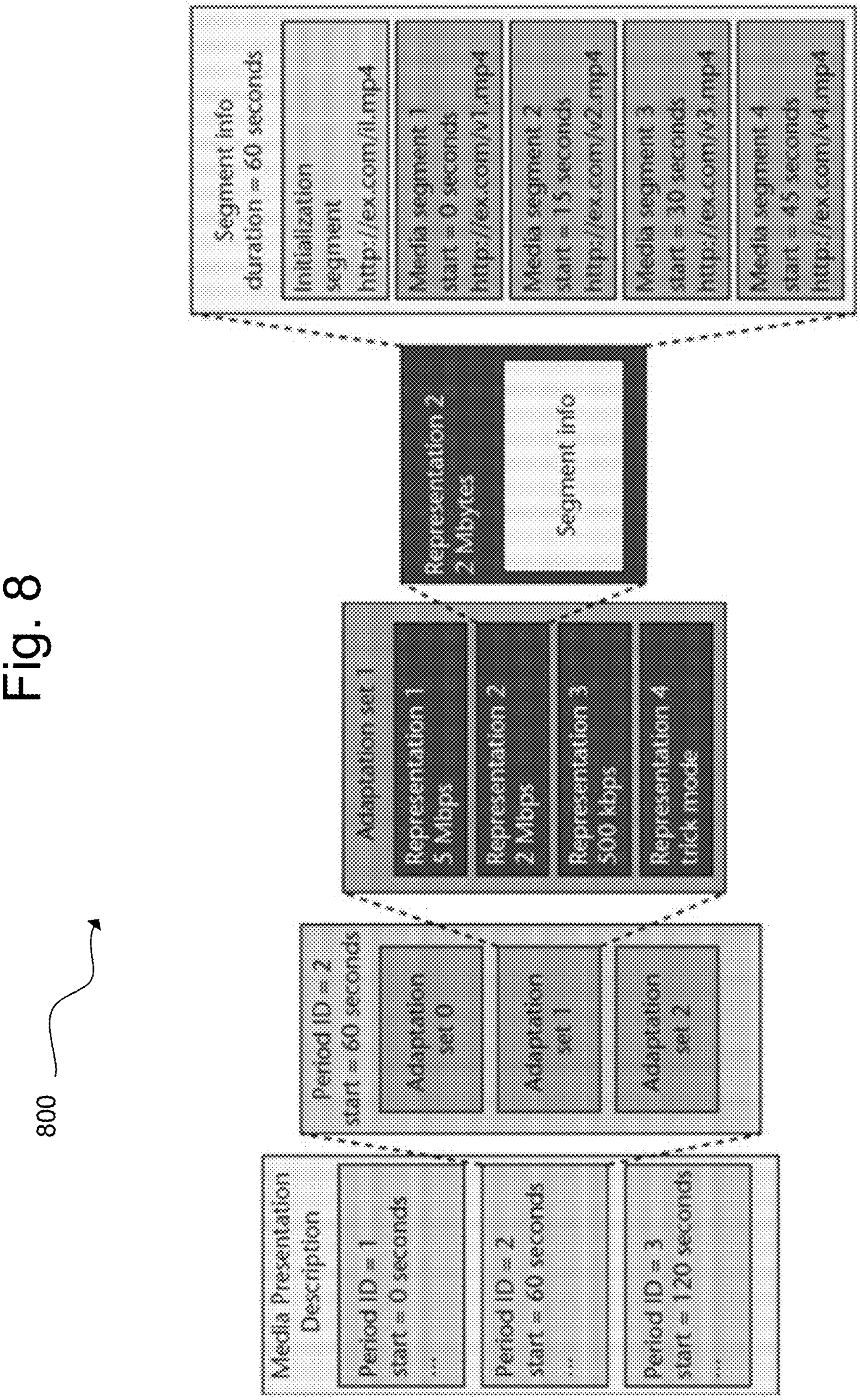
FIG. 8 illustrates an overview of the structure of the MPEG-DASH MPD file format in accordance with some examples of the disclosure.

FIG. 8 is a schematic diagram 800 which shows the structure of the MPEG-DASH MPD file format. MPEG-DASH is one of the most popular video-streaming protocols and is widely used to deliver media either via Video on Demand (VOD) or Live Streaming and to various end-user devices, including smartphones, tablets, SmartTVs, gaming consoles, and more. The Media Presentation Description (MPD) is a document that contains metadata required by a DASH Client to construct appropriate HTTP-URLs to access Segments and to provide the streaming service to the user. DASH MPD files are XML documents, and an example of such is the schematic diagram 1100 shown in FIG. 11. XML schemas like MPD can be quite complex, and it is the packager's responsibility to create a valid MPD.

Returning to FIG. 8, and the schematic 800 shown therein, a MPD contains a Media Presentation with a clear, consistent hierarchical organization. From top to bottom, the individual elements of the MPD hierarchy are the Media Presentation which contains a sequence of one or more Periods, and a Period contains one or more Adaptation Sets. An Adaptation Set contains one or more Representations. A Representation contains one or more Segments, and Segments carry the actual media data and associated metadata. Each element consists of a set of attributes. Individual attributes are either Mandatory, Conditionally Mandatory, Optional, or Optional with Default Values.

In some examples, the multimedia content being delivered is an adaptive bitrate stream compatible with the MPEG-DASH standard, or other implementations such as Apple HLS. In some embodiments, the first stream of multimedia content is encoded at a first maximum bitrate and/or the first resolution. For example, the request may be a request for the next segment of an adaptive bitrate stream, and therefore the first stream of multimedia content is at a first maximum bitrate (or resolution) based on the first network bandwidth. In some examples, the second stream of multimedia content is encoded at a second maximum bitrate and/or a second resolution. For example, the request may be a request for the second segment of an adaptive bitrate stream, and therefore the second stream of multimedia content is at a second maximum bitrate (or resolution) based on new current network bandwidth, different from the first network bandwidth. The second stream may be a higher bitrate than the first stream, or vice versa, depending on the network bandwidth at the current time of the request.

In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Figure 9:
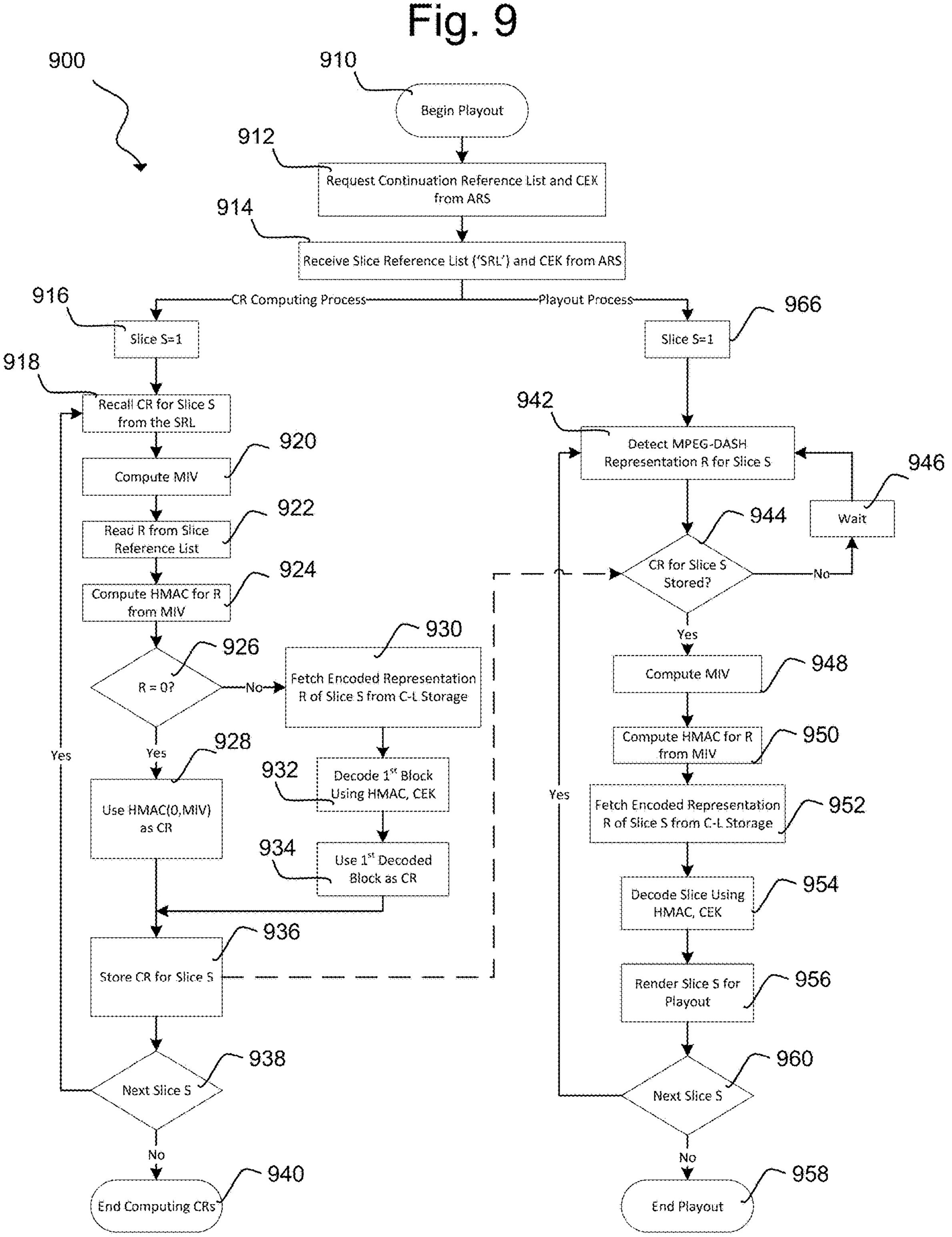
FIG. 9 illustrates a flowchart representing media playout in accordance with some examples of the disclosure.

FIG. 9 shows a flow diagram which sets out an exemplary procedure 900 for playout of a media stream in accordance with the systems and methods described herein. The procedure 900 may, in an example, take place using the systems demonstrated in FIG. 10 and/or FIG. 12 and/or FIG. 13.

Referring to FIG. 9, the steps shown therein will now be described. There are two examples set out, along with a description of the steps of FIG. 9. The term 'slice' and the term 'segment' may be used interchangeably here; that is to say a slice and a segment may refer to the same thing. As is described herein, the techniques described may be employed in slice-based and segment-based content distribution, and thus the techniques described to protect slices in a P2P environment may be used for segment-based streaming delivery, and the techniques described to protect segments in streaming delivery may be used to protect slices in a P2P environment.

In a first example, for each S, the SRL may contain only one alternative representation, 'R' (which most often may be zero). When the SRL is received at step 904, processing of the Continuation References, 'CRs' on the left hand side of FIG. 9 may begin immediately and as fast as possible. This means that the left-hand process should collect at least the first blocks of all non-zero segments in the SRL and decode them. In the case that the media item is a movie or of similar length to a movie, it can be expected that there may be something in excess of 500 segments, and possibly around 1000 segments therefor, and most of the instances of R in the SRL would be zeroes, for example around 95% of the segments. Therefore, when the media item is played out, around 25 to 50 beginnings of segments, that is to say that complete segments may not be required to be downloaded, instead enough to get the first block size, i.e. 16+ bytes thereof. It may be the case that in practice only one IP packet of the data payload of the segment would suffice and be fetched from the C-L Storage.

In another example, the SRL list may contain all possible IVs (which is shown as 301 in FIG. 3, so that whatever R was in S−1, MIV can always be computed from the segment already playing. The typical duration of the segment may be 15 seconds which may provide sufficient time to compute CR in the left-hand part of the process shown in FIG. 9. However, this may lead to a comprehensive disclosure of the IVs in the ARS for the particular media item, which may be less secure because it may cause all of the IVs to be publicly accessible.

Turning now to the initial Continuation Reference, CR. Where the initial CR is the initial plaintext, and where S=0 is the segment or segment reference for the initial value assuming that the first segment is represented by S=1, the initial CR may be all zeroes, or e.g. HASH values of a content id, to be decided by a person skilled in the art. It may therefore be the case that the CR for segment 0 (assuming the first would be 1) may be a fixed value (such as zeroes) or derived from e.g. the content id, or by any other suitable means.

At step 916, this may be the commencement of creating the CR list. At step 918, the Continuation Reference may be read for the segment S from the SRL. At step 920, now that we have known the previous R on the left-hand process as dictated by the SRL; the R is independent from the R in playout, both the CR from S−1 and the IV for S, in the SRL, are known and the MIV for S may be computed. Once the MIV is computed, and R for S is dictated in the SRL as per step 922 the HMAC may be computed 924. At step 926, the representation, R, may be checked. If the R was 0 which may be the most common situation, with the zeroth representation, R=0, being a payload-less representation and thus not containing any media item segment or slice, an HMAC operation of the MIV for the segment may be used to generate the next CR, and it may then be memorized for the playout process as per step 936.

If the R was referring to actual content, that is to say a representation which is not the zeroth representation and includes media content, at least the beginning of the segment may be fetched from the C-L Storage as per step 930, as discussed above, and decoded at step 932. This first block of the representation may be used as the next CR and memorized for the playout process as per step 936. At step 938, it may be checked for the next segment S. If it was the final segment, the process ends at step 940. If it was not the final segment S, then the process may repeat for the next segment S, returning to step 918.

In the playout, which may take place in real-time or only slightly in advance (depending on amount of memory and data transfer speeds), again, first S may be chosen as shown in 916 of FIG. 9. Independently of the SRL, the most suitable R is picked for decoding, as it happens in MPEG-DASH at step 942. Normally there should already be the CR (independent of R) from S−1 available step 944, and if the CR is not yet available the process may wait at step 946 and then try again. If it is the first segment, the Continuation Reference, CR, is already known; it may be predetermined and provided with the segment reference list. The continuation reference, CR, for the immediately previous segment, S−1 and the IV for segment S (in the SRL) are known. Therefore, MIV for S may be computed 948. At step 950, it may be that we know the R and MIV and thus the HMAC for the current representation R (always a real stream, and may not be zero on playout) may be computed.

At step 952 of FIG. 9, the encoded representation R for the segment S may be fetched as soon as we assume next R, as may be typical in MPEG-DASH, and when it comes to playout, decoded 954 and rendered 956 accordingly. On the right hand side of FIG. 9, there may be no need to memorize the CR; that is all done in the steps shown on the left-hand side; it may be said that the steps on the right-hand side only read what the left side has stored. At step 960, the end-of-segments may be checked, and then the media item is over, and playout is ended 958.

Figure 10:
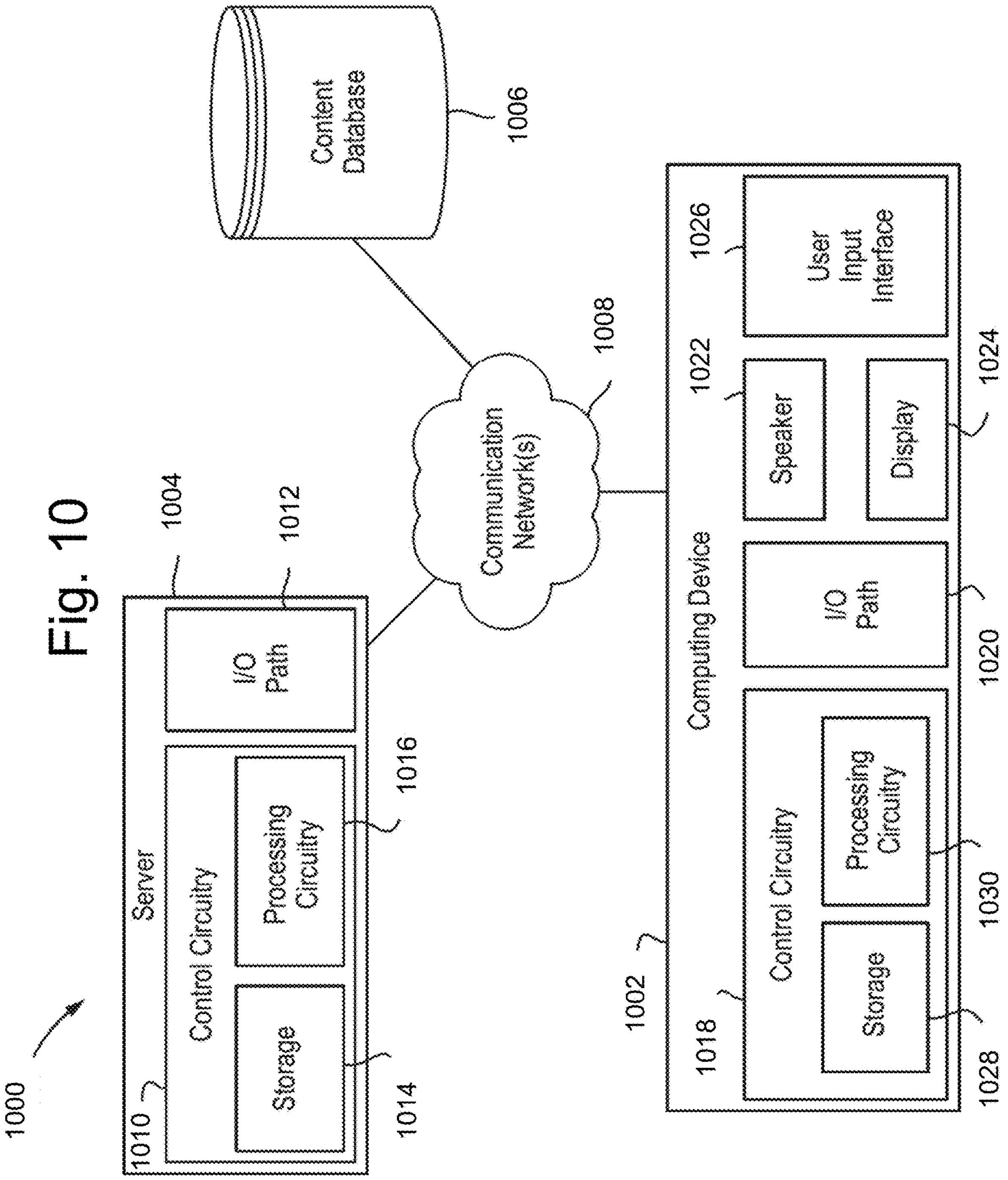
FIG. 10 illustrates a block diagram showing components of an exemplary system for providing data in a distributed storage environment, in accordance with some examples of the disclosure.

FIG. 10 is an illustrative block diagram showing system 1000 configured to display media content. Although FIG. 10 shows system 1000 as including a number and configuration of individual components, in some examples, any number of the components of system 1000 may be combined and/or integrated as one device, e.g., as user device 1230, 1335. System 1000 includes computing device 1002 which may include a Trusted Execution Environment, 'TEE', server 1004, and content database 1006, each of which is communicatively coupled to communication network 1008, which may be the Internet or any other suitable network or group of networks. In some examples, system 1000 excludes server 1004, and functionality that would otherwise be implemented by server 1004 is instead implemented by other components of system 1000, such as computing device 1002. In still other examples, server 1004 works in conjunction with computing device 1002 to implement certain functionality described herein in a distributed or cooperative manner.

Server 1004 includes control circuitry 1010 and input/output (hereinafter "I/O") path 1012, and control circuitry 1010 includes storage 1014 and processing circuitry 1016.

Computing device 1002, which may be a personal computer, a laptop computer, a tablet computer, a smartphone, a smart television, a smart speaker, or any other type of computing device, includes control circuitry 1018, I/O path 1020, speaker 1022, display 1024, and user input interface 1026, which in some examples provides a user selectable option for enabling and disabling the display of modified subtitles. Control circuitry 1018 includes storage 1028 and processing circuitry 1030. Control circuitry 1010 and/or 1018 may be based on any suitable processing circuitry such as processing circuitry 1016 and/or 1030. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 1014, storage 1028, and/or storages of other components of system 1000 (e.g., storages of content database 1006, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1014, storage 1028, and/or storages of other components of system 1000 may be used to store various types of content, metadata, and or other types of data. Non-volatile memory may also be used (e.g., to launch a boot-up routine and other instructions). Cloud-based storage may be used to supplement storages 1014, 1028 or instead of storages 1014, 1028.

In some examples, control circuitry 1010 and/or 1018 executes instructions for an application stored in memory (e.g., storage 1014 and/or 1028). Specifically, control circuitry 1014 and/or 1028 may be instructed by the application to perform the functions discussed herein. In some implementations, any action performed by control circuitry 1014 and/or 1028 may be based on instructions received from the application. For example, the application may be implemented as software or a set of executable instructions that may be stored in storage 1014 and/or 1028 and executed by control circuitry 1014 and/or 1028. In some examples, the application may be a client/server application where only a client application resides on computing device 1002, and a server application resides on server 1004.

The application may be implemented using any suitable architecture. For example, it may be a stand-alone application wholly implemented on computing device 1002. In such an approach, instructions for the application are stored locally (e.g., in storage 1028), and data for use by the application is downloaded on a periodic basis (e.g., from an out-of-band feed, from an Internet resource, or using another suitable approach). Control circuitry 1018 may retrieve instructions for the application from storage 1028 and process the instructions to perform the functionality described herein. Based on the processed instructions, control circuitry 1018 may determine what action to perform when input is received from user input interface 1026.

In client/server-based examples, control circuitry 1018 may include communication circuitry suitable for communicating with an application server (e.g., server 1004) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1008). In another example of a client/server based application, control circuitry 1018 runs a web browser that interprets web pages provided by a remote server (e.g., server 1004). For example, the remote server may store the instructions for the application in a storage device. The remote server may process the stored instructions using circuitry (e.g., control circuitry 1010) and/or generate displays. Computing device 1002 may receive the displays generated by the remote server and may display the content of the displays locally via display 1024. This way, the processing of the instructions is performed remotely (e.g., by server 1004) while the resulting displays, such as the display windows described elsewhere herein, are provided locally on computing device 1002. Computing device 1002 may receive inputs from the user via input interface 1026 and transmit those inputs to the remote server for processing and generating the corresponding displays.

A user may send instructions, e.g., to view an interactive media content item and/or select one or more programming options of the interactive media content item, to control circuitry 1010 and/or 1018 using user input interface 1026. User input interface 1026 may be any suitable user interface, such as a remote control, trackball, keypad, keyboard, touchscreen, touchpad, stylus input, joystick, voice recognition interface, gaming controller, or other user input interfaces. User input interface 1026 may be integrated with or combined with display 1024, which may be a monitor, a television, a liquid crystal display (LCD), an electronic ink display, or any other equipment suitable for displaying visual images.

Server 1004 and computing device 1002 may transmit and receive content and data via I/O path 1012 and 1020, respectively. For instance, I/O path 512 and/or I/O path 1020 may include a communication port(s) configured to transmit and/or receive (for instance to and/or from content database 1006), via communication network 1008, content item identifiers, content metadata, natural language queries, and/or other data. Control circuitry 1010, 1018 may be used to send and receive commands, requests, and other suitable data using I/O paths 1012, 1020.

FIG. 11 illustrates example pseudo-code 1100 which demonstrates the structure of the MPEG-DASH MPD file format, including the DASH MPD ContentProtection element. Such pseudo-code 1100 may obtained by a request sent to a media server.

Figure 12:
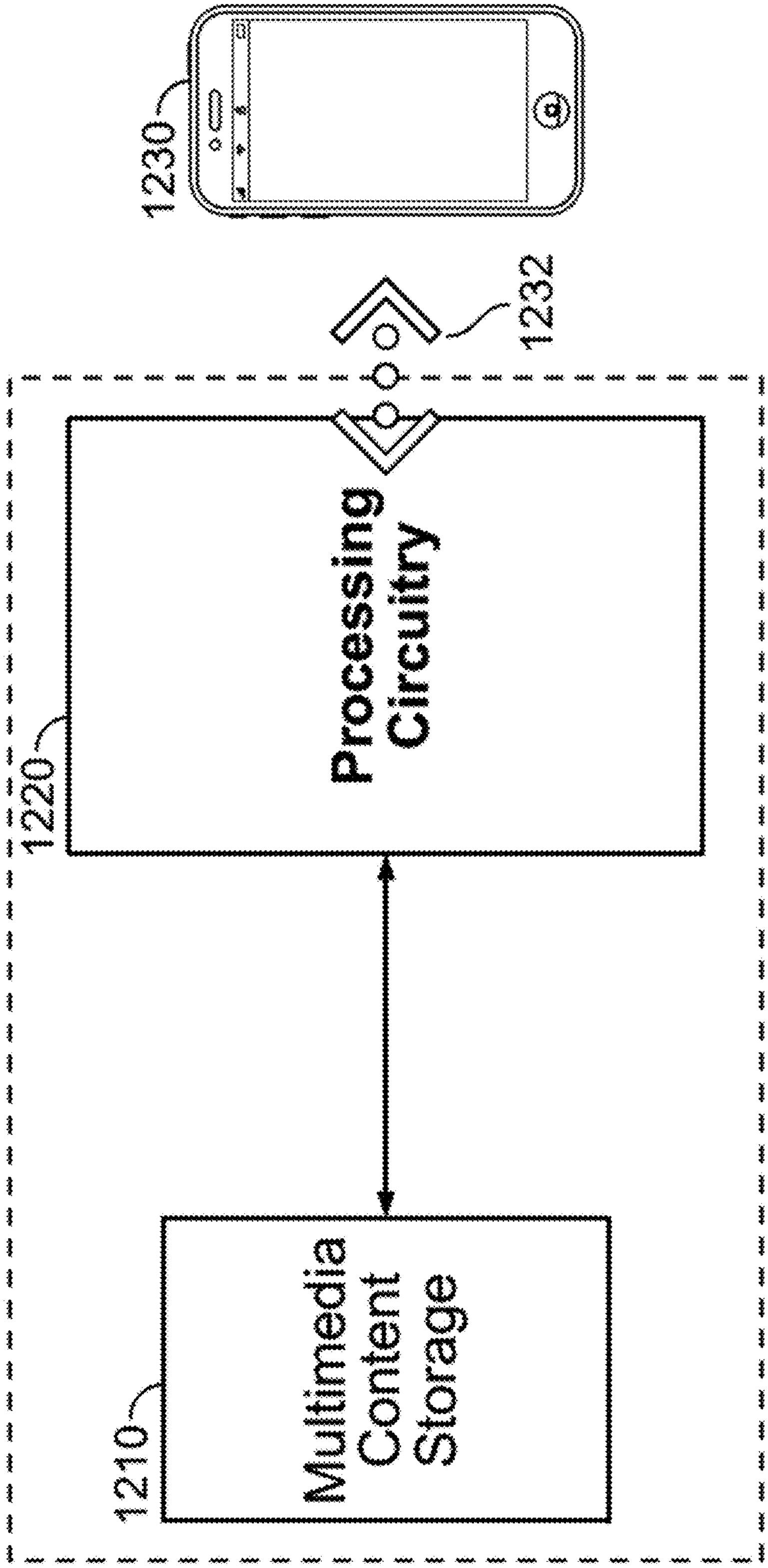
FIG. 12 illustrates an exemplary media server, in accordance with some examples of the disclosure.

FIG. 12 illustrates an exemplary media server, in accordance with some embodiments of the disclosure. FIG. 12 depicts an exemplary media server 1200 comprising a multimedia content storage 1210, processing circuitry 1220, which is shown to be connected to a network device 1230 via communication link 1232. In some examples and as shown in FIG. 12, the multimedia content storage 1210 is coupled to the processing circuitry 1220. The processing circuitry 1220 is configured to receive, from a network device 1230, an indication of available bandwidth at a multimedia content player; determine an expected performance threshold for the network device 1230 to download a media content item, based on the indication of available bandwidth; generate a manifest, the manifest comprising a plurality of URLs wherein each URL comprises an indication of the expected performance threshold; and transmit the manifest to the network device 1230.

The processing circuitry 1220 may comprise a plurality of processing elements, as is described in more detail with reference to FIG. 15, such as a processor or number of processors. Media server 1200 may further comprise an encoder (not shown). In some examples, the encoder is located within the processing circuitry 1220. In other examples, the encoder is located externally to the processing circuitry 1220. The processing circuitry 1220 may therefore be further configured to encode multimedia content or the multimedia content item to be transmitted to the network device 1230. The encoder may be further configured to encode the multimedia content at a plurality of bitrates, based on the available bandwidth at the network device 1230.

The media server 1200 may further comprise network circuitry (not shown). In some examples, the network circuitry is located within the processing circuitry 1220. In other examples, the network circuitry is located externally to the processing circuitry 1220. The processing circuitry 1220 may therefore be further configured to communicate with the network device 1230 via communication link 1232. The means of communication between the network device 1230 and the processing circuitry 1220 is described in more detail with reference to FIG. 10.

Figure 13:
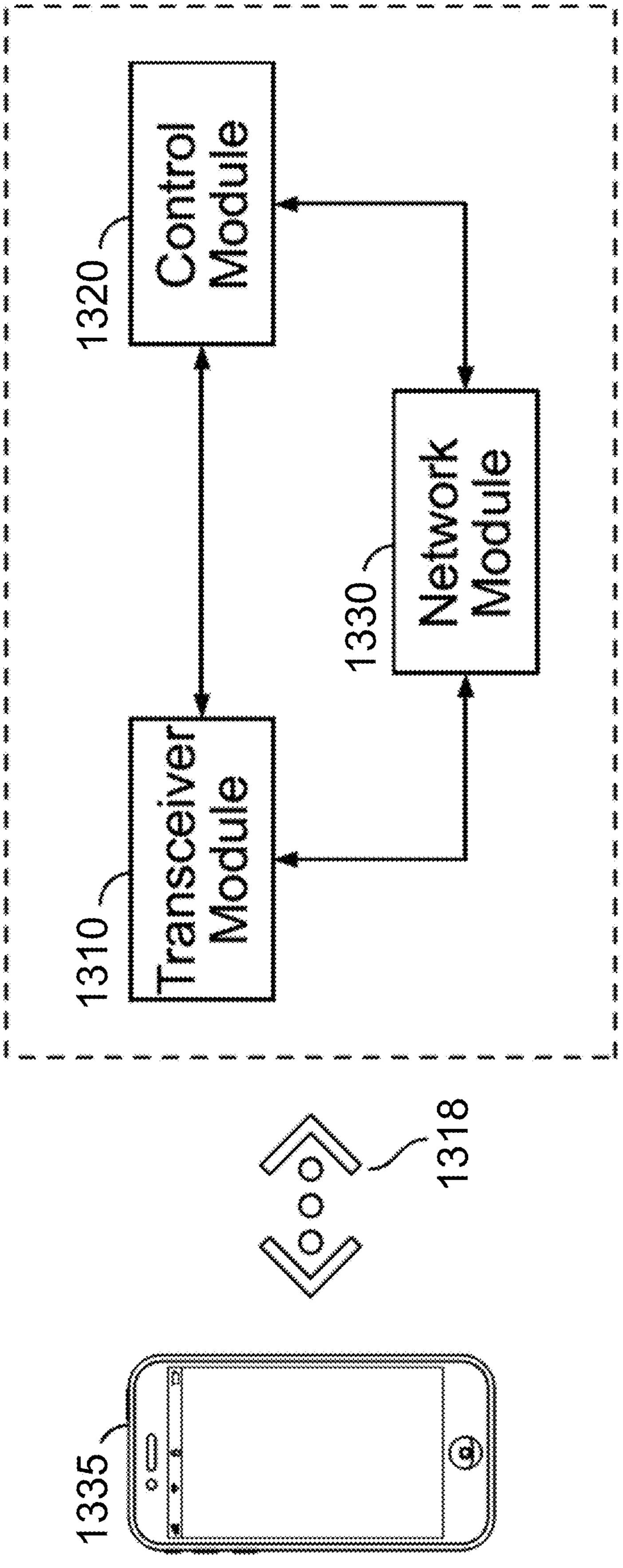
FIG. 13 illustrates an exemplary media transmission device, in accordance with some examples of the disclosure.

FIG. 13 illustrates an media transmission device, in accordance with some embodiments of the disclosure. The media transmission system 1300 comprises a transceiver module 1310, a control module 1320, and a network module 1330. The media transmission system may communicate with an additional user device 1335, such as a home game way, smartphone, or other smart device. The transceiver module 1310 is configured to request, to a media server, multimedia content delivery. The multimedia content or multimedia content item may be stored on a multimedia content storage 1210, as described with reference to FIG. 12.

In some examples, the transceiver module communicates with a second user device 1335 via communication link 1318. The communication link 1318 between the transceiver module 1310 and the second user device 1335 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the control module 1320 is coupled to the transceiver module 1310 and the network module 1330.

In some examples, the communication link 1318 is between the media transmission device 1300 and a home gateway device (such as user device 1230 of FIG. 12), which is in turn in communication with the second user device 1335. In some examples, the multimedia content storage 1210 and processing circuitry 1220 may transmit a portion of the pseudo-code 1100 to the second user device 1335. These examples are considered to be non-limiting, and other combinations of the features herein being spread over two or more devices are considered within the scope of this invention. For example, each of the transceiver modules, the network module, and the control module may be separate internet of things (IoT) devices.

It is to be noted that the recitation of 'first' in the present application is not to be construed as the first slice or segment in an absolute list or chain of slices or segments, but merely as a convenient device for clear identification of slices or segments being discussed. In particular, in connection with discussions of slices in a distributed storage environment, the first slice in a list of slices may be entirely unencrypted and presented in plain text, with all subsequent slices in the list being encrypted with the systems and methods described herein.

In an example, the beginning portion of a movie or TV episode, or any other media item, may be unencrypted or encrypted without the segment-based or slice-based protection. It is to be understood that any portion may be provided without the segment-based or slice-based protection, and may be used as a teaser. In such an example, the first slice or segment S is not numbered 1 but something greater. A person skilled in the art and familiar with this the techniques described herein may define a CR for S−1; it may be based e.g. on playout R of S−1, be a fixed value, be computed from content id etc.

In the following, the first slice may be any slice in a list of slices, and may simply be the first slice in a list of slices which are to be encrypted.

Figure 14:
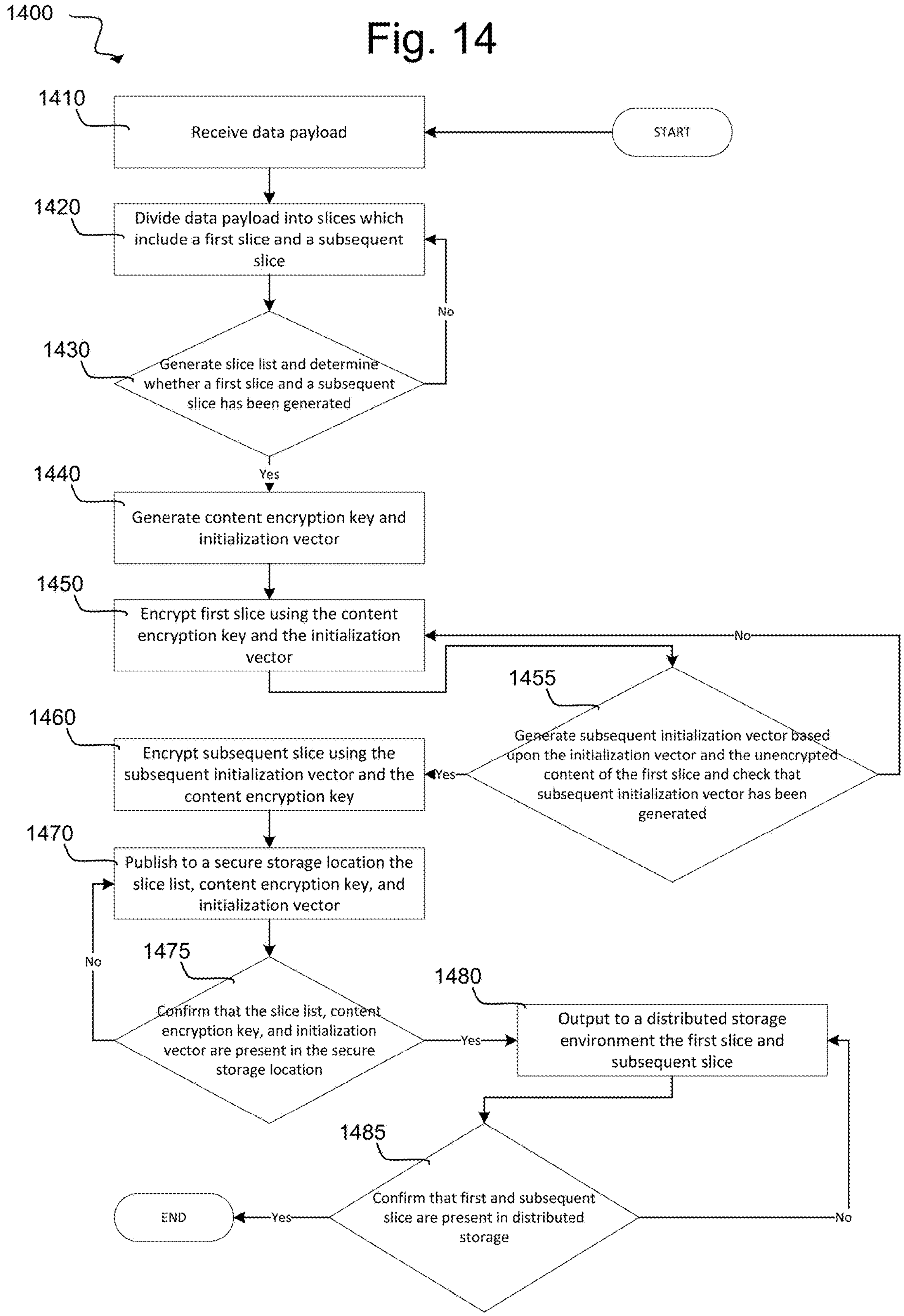
FIG. 14 illustrates a flowchart representing a process for encrypting and publishing a data payload in a distributed storage environment in accordance with some examples of the disclosure.

FIG. 14 is a flowchart representing an illustrative process 1400 for encrypting and publishing a data payload in a distributed storage environment in accordance with some aspects of the disclosure.

At step 1410, a data payload may be received. This data payload may be a media content item, and may be a video file, an audio file, a multimedia file, or similar. It may be a movie or film, and may be encoded with H.264, H.265, or similar.

At step 1420, the data payload is divided into slices, with the slices including at least a first slice and a subsequent slice. As described above and with reference to FIG. 1 to FIG. 4, these slices may be sized in accordance with known protocols.

At step 1430, a slice list may be generated which includes information about the slices into which the data payload has been divided. The information may be hashed data, metadata, or an absolute location in which the slices may be stored. The information may be data which is well understood in connection with the distribution of data in line with the Bittorrent protocol. A check may be carried out to ensure that the data payload has been divided into a first and subsequent slice, and if not, the process may return to step 1420 above.

At step 1440, a content encryption key and a raw initialization vector may be generated. This raw initialization vector may be the 'original' initialization vector, that is to say the first initialization vector from which the subsequent initialization vectors may be computed. It may be referred to as at raw initialization vector or a first initialization vector. The content encryption key, as described above, may be an AES256 key, or any suitable type of key, as discussed in connection with FIG. 2, FIG. 3, and FIG. 4 above, may be used.

At step 1450, the first slice may be encrypted using the content encryption key described above, using the raw initialization vector as described herein.

At step 1455, a subsequent initialization vector may be generated, based upon the raw initialization vector and the unencrypted content of the first slice. This may be carried out based upon the techniques described herein, and may include an XOR of the content of the unencrypted content of the first slice as described earlier. This step may also include a check to establish whether the subsequent initialization vector has been generated successfully.

At step 1460, the subsequent slice may be encrypted using the content encryption key described above, using the subsequent initialization vector as described herein.

At step 1470, the slice list, content encryption key, and the raw initialization vector may be published to a secure location. Access to this secure location may be restricted.

At step 1475, a check may be carried out to ensure that the slice list, content encryption key, and the raw initialization vector are present in the secure storage location. This check may be a checksum, or any suitable type of check, automated or otherwise.

At step 1480, the first and subsequent encrypted slices may be output to a distributed storage environment. This may be in line with known Bittorrent protocols.

At step 1485, a check may be carried out to ensure that the first and subsequent encrypted slices are present in the distributed storage environment. This check may be a checksum, or any suitable type of check, automated or otherwise.

The actions or descriptions of FIG. 14 may be used with any other example of this disclosure. In addition, the actions and descriptions described in relation to FIG. 14 may be done in any suitable alternative orders or in parallel to further the purposes of this disclosure.

FIG. 15 is a flowchart representing an illustrative process 1500 for receiving and decrypting a data payload in a distributed storage environment in accordance with some aspects of the disclosure.

At step 1510, a slice list, content encryption key, and raw initialization vector may be retrieved from a secure storage location. This secure storage location may limit access thereto. The secure storage location may be a trusted location.

At step 1515, a check may be carried out to determine whether the slice list, content encryption key, and raw initialization vector have been successfully retrieved from the secure storage location. This check may be a checksum, or any suitable type of check, automated or otherwise.

At step 1520, a determination may be made as to the encrypted slices to be retrieved from a distributed storage environment. This may be in line with understood Bittorrent protocols.

At step 1530, the first and subsequent slice may be retrieved from a distributed storage environment, as per the determination at step 1520.

At step 1535, a confirmation that the first and subsequent slice have been retrieved correctly. This may include a hashing operation, such as MD5, to confirm the content of the slices, and may be any suitable type of check, automated or otherwise.

At step 1540, the first slice is decrypted using the content encryption key and the raw initialization vector. This decryption may be carried out in the trusted execution environment of a device as described herein.

At step 1545, a subsequent initialization vector is generated based upon the raw initialization vector and the unencrypted content of the first slice. This may include an XOR of the unencrypted content of the first slice. A check may also be carried out to determine whether the subsequent initialization vector has been generated.

At step 1550, the subsequent slice is decrypted using the content encryption key and the subsequent initialization vector. This decryption may be carried out in the trusted execution environment of a device as described herein, as with the first encrypted slice.

At step 1560, the first and subsequent decrypted slices are combined into a data payload. This data payload may be a media item, and may be encoded in a format described herein or any suitable format.

The actions or descriptions of FIG. 15 may be used with any other example of this disclosure. In addition, the actions and descriptions described in relation to FIG. 15 may be done in any suitable alternative orders or in parallel to further the purposes of this disclosure.

Figure 16:
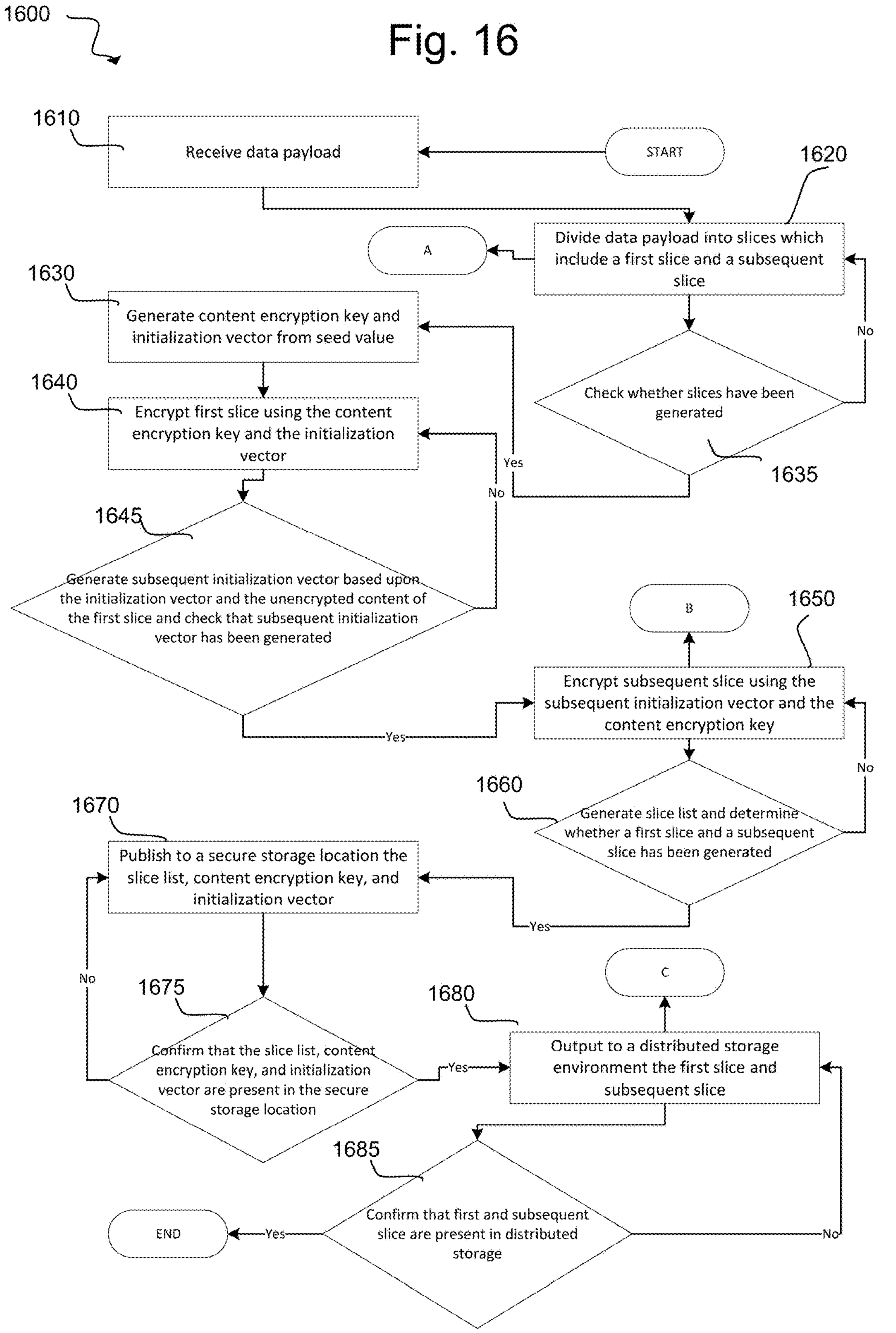
FIG. 16 illustrates a flowchart representing a process for encrypting and publishing a data payload in a distributed storage environment in accordance with some examples of the disclosure.

FIG. 16 is a flowchart representing an illustrative process 1600 for encrypting and publishing a data payload in a distributed storage environment in accordance with some aspects of the disclosure. It is to be understood that the steps outlined in FIG. 16 may be incorporated, where technically possible, with the steps outlined in process 1400 shown in FIG. 14.

At step 1610, similar to step 1410 above, a data payload may be received. This data payload may be a media content item, and may be a video file, an audio file, a multimedia file, or similar. It may be a movie or film, and may be encoded with H.264, H.265, or similar.

At step 1620, similar to step 1420 above, the data payload is divided into slices, with the slices including at least a first slice and a subsequent slice. As described above and with reference to FIG. 1 to FIG. 4, these slices may be sized in accordance with known protocols. In some examples, the process may then continue to step 'A' described later, which may be used to divide the data payload into further slices.

At step 1630, a check may be carried out to ensure that the data payload has been divided into a first and subsequent slice, and if not, the process may return to step 1620 above.

At step 1630, similar to step 1440 above, a content encryption key and initialization vector may be generated. The content encryption key, as described above, may be an AES256 key, or any suitable type of key, as discussed in connection with FIG. 2, FIG. 3, and FIG. 4 above, may be used.

At step 1640, similar to step 1450 above, the first slice may be encrypted using the content encryption key described above, using the raw initialization vector as described herein.

At step 1645, similar to step 1455 above, a subsequent initialization vector may be generated, based upon the raw initialization vector and the unencrypted content of the first slice. This may be carried out based upon the techniques described herein, and may include an XOR of the content of the unencrypted content of the first slice as described earlier. This step may also include a check to establish whether the subsequent initialization vector has been generated successfully.

At step 1650, similar to step 1460 above, the subsequent slice may be encrypted using the content encryption key described above, using the subsequent initialization vector as described herein. In some examples, the process may then proceed to step 'B' described later, which may be used to generate the subsequent initialization vector for the subsequent slice.

At step 1660, similar to step 1430 above, a slice list may be generated which includes information about the slices into which the data payload has been divided. The information may be hashed data, metadata, or an absolute location in which the slices may be stored. The information may be data which is well understood in connection with the distribution of data in line with the Bittorrent protocol. A check may be carried out to ensure that the data payload has been divided into a first and subsequent slice, and if not, the process may return to step 1650 above.

At step 1670, similar to step 1470 above, the slice list, content encryption key, and the raw initialization vector may be published to a secure location. Access to this secure location may be restricted.

At step 1675, similar to step 1475 above, a check may be carried out to ensure that the slice list, content encryption key, and the raw initialization vector are present in the secure storage location. This check may be a checksum, or any suitable type of check, automated or otherwise.

At step 1680, similar to step 1480 above, the first and subsequent encrypted slices may be output to a distributed storage environment. This may be in line with known Bittorrent protocols. In some examples, the process may then advance to step 'C' described later, which may be used to issue a replacement first or raw initialization vector when required.

At step 1685, similar to step 1485 above, a check may be carried out to ensure that the first and subsequent encrypted slices are present in the distributed storage environment. This check may be a checksum, or any suitable type of check, automated or otherwise.

The actions or descriptions of FIG. 16 may be used with any other example of this disclosure. In addition, the actions and descriptions described in relation to FIG. 16 may be done in any suitable alternative orders or in parallel to further the purposes of this disclosure.

Figure 17:
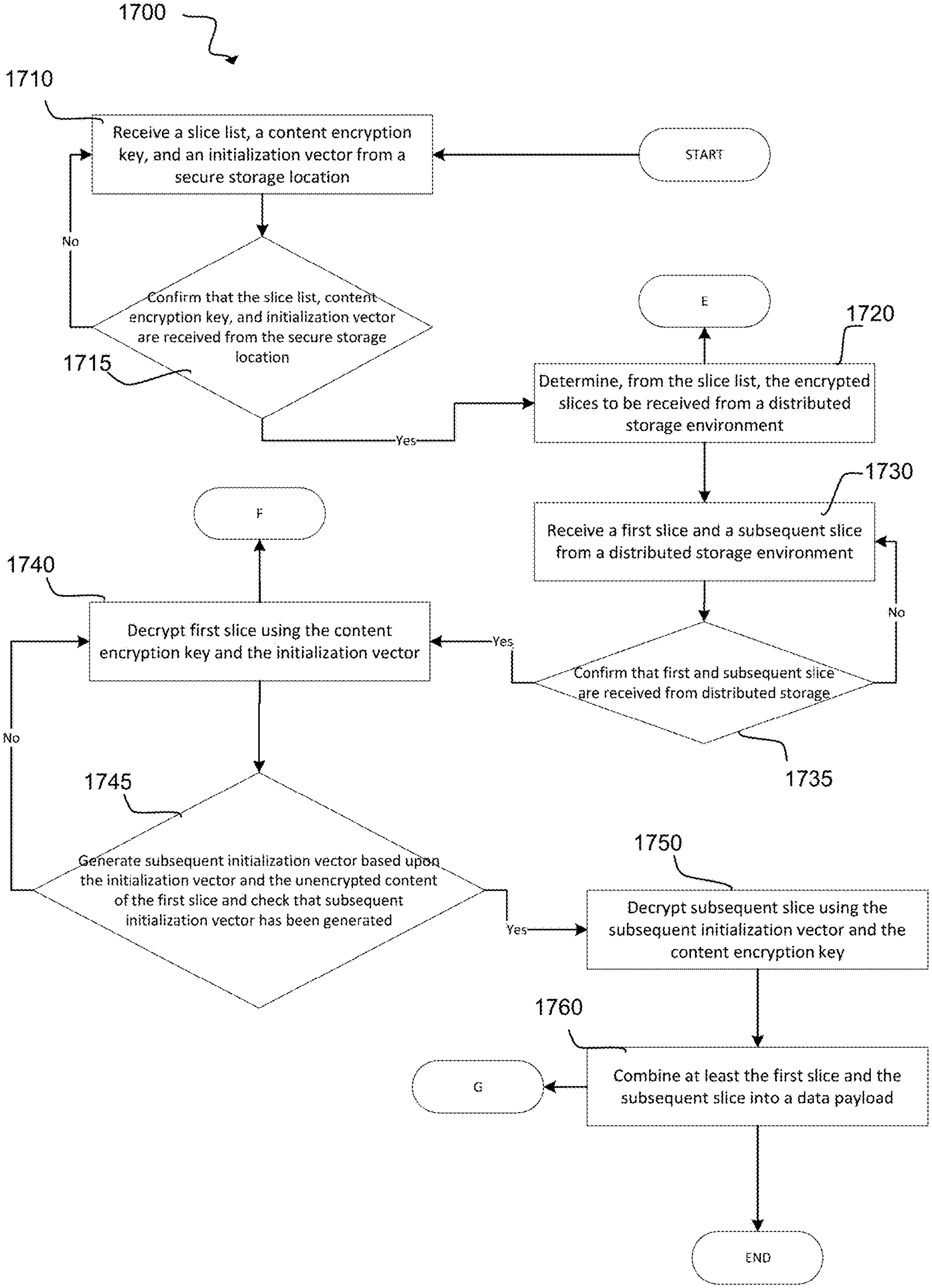
FIG. 17 illustrates a flowchart representing a process for receiving and decrypting a data payload in a distributed storage environment in accordance with some examples of the disclosure.

FIG. 17 is a flowchart representing an illustrative process 1700 for receiving and decrypting a data payload in a distributed storage environment in accordance with some aspects of the disclosure. It is to be understood that the steps outlined in FIG. 17 may be incorporated, where technically possible, with the steps outlined in process 1500 shown in FIG. 15.

At step 1710, similar to step 1510 above, a slice list, content encryption key, and raw initialization vector may be retrieved from a secure storage location. This secure storage location may limit access thereto, and this is described later. The secure storage location may be a trusted location.

At step 1715, similar to step 1515 above, a check may be carried out to determine whether the slice list, content encryption key, and raw initialization vector have been successfully retrieved from the secure storage location. This check may be a checksum, or any suitable type of check, automated or otherwise.

At step 1720, similar to step 1520 above, a determination may be made as to the encrypted slices to be retrieved from a distributed storage environment. This may be in line with understood Bittorrent protocols. In some examples, the process may then proceed to step 'E' described later, which may be used to secure the access to the slice list, content encryption key, and initialization vector.

At step 1730, similar to step 1530 above, the first and subsequent slice may be retrieved from a distributed storage environment, as per the determination at step 1720.

At step 1735, similar to step 1535 described above, a confirmation that the first and subsequent slice have been retrieved correctly. This may include a hashing operation, such as MD5, to confirm the content of the slices, and may be any suitable type of check, automated or otherwise.

At step 1740, similar to step 1540 described above, the first slice is decrypted using the content encryption key and the raw initialization vector. This decryption may be carried out in the trusted execution environment of a device as described herein. In some cases, and where required, the process may proceed to step 'F' to pass the decryption steps to a trusted execution environment, TEE.

At step 1745, similar to step 1545 described above, a subsequent initialization vector is generated based upon the raw initialization vector and the unencrypted content of the first slice. This may include an XOR of the unencrypted content of the first slice. A check may also be carried out to determine whether the subsequent initialization vector has been generated.

At step 1750, similar to step 1550 above, the subsequent slice is decrypted using the content encryption key and the subsequent initialization vector. This decryption may be carried out in the trusted execution environment of a device as described herein, as with the first encrypted slice.

At step 1760, similar to step 1560 above, the first and subsequent decrypted slices are combined into a data payload. This data payload may be a media item, and may be encoded in a format described herein or any suitable format. In some cases, if a replacement initialization vector and a replacement slice is to be downloaded as part of the data payload, the process may then advance to step 'G' described later, and may proceed to receive the replacement initialization vector and slice list, and subsequently obtain the replacement slice. The process may then return to step 1760 to assemble the data payload.

The actions or descriptions of FIG. 17 may be used with any other example of this disclosure. In addition, the actions and descriptions described in relation to FIG. 17 may be done in any suitable alternative orders or in parallel to further the purposes of this disclosure.

Figure 18A:
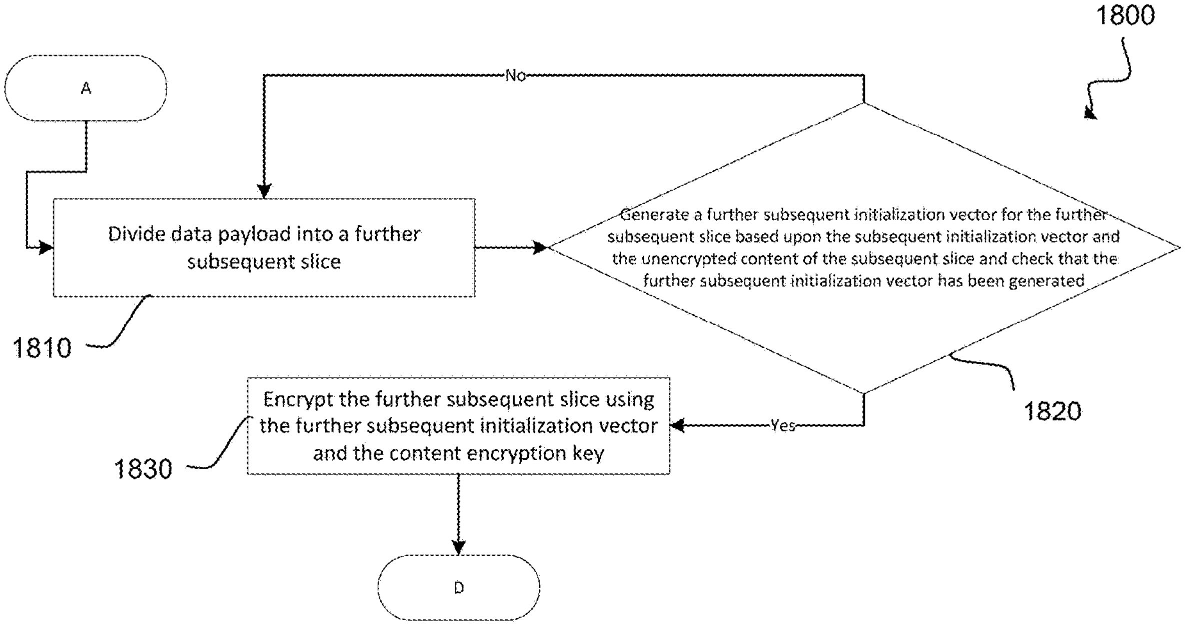
FIG. 18A illustrates a flowchart representing a further process for encrypting a data payload in a distributed storage environment in accordance with some examples of the disclosure.

FIG. 18A is a flowchart representing a process 1800 for encrypting and publishing a data payload in a distributed storage environment in accordance with some examples of the disclosure. Process 1800 starts at step 'A' which may correspond to that shown in FIG. 16.

At step 1810, the data payload may be divided into a further subsequent slice in addition to the first and subsequent slices, and this may be carried out as described herein.

At step 1820, a further subsequent initialization vector may be generated, based upon the subsequent initialization vector and the unencrypted content of the subsequent slice, that is to say the slice in the 'chain' immediately before this slice. This may be carried out based upon the techniques described herein, and may include an XOR of the content of the unencrypted content of the first slice as described earlier. This step may also include a check to establish whether the further subsequent initialization vector has been generated successfully.

At step 1830, the subsequent slice may be encrypted using the content encryption key described above, using the subsequent initialization vector as described herein. The process may then proceed to step 'D' described later.

The actions or descriptions of FIG. 18A may be used with any other example of this disclosure. In addition, the actions and descriptions described in relation to FIG. 18A may be done in any suitable alternative orders or in parallel to further the purposes of this disclosure.

Figure 18B:
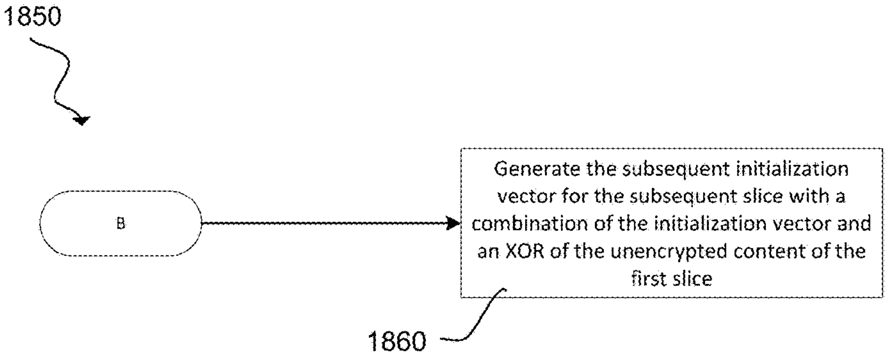
FIG. 18B illustrates a flowchart representing a further process for encrypting a data payload in a distributed storage environment in accordance with some examples of the disclosure.

FIG. 18B is a flowchart representing a process 1850 for encrypting and publishing a data payload in a distributed storage environment in accordance with some examples of the disclosure. Process 1800 starts at step 'B' which may correspond to that shown in FIG. 16.

At step 1860, the subsequent initialization vector generated at steps 1455 and 1645 described above may be generated with a combination of the initialization vector and an XOR of the unencrypted content of the first slice. The process may then return, in the case of process 1400, to step 1460, and in the case of process 1600, to step 1650. Once the subsequent initialization vector has been generated, the process may continue to step 1650 and then proceed to step 1660 as described above in connection with FIG. 16.

The actions or descriptions of FIG. 18B may be used with any other example of this disclosure. In addition, the actions and descriptions described in relation to FIG. 18B may be done in any suitable alternative orders or in parallel to further the purposes of this disclosure.

Figure 19:
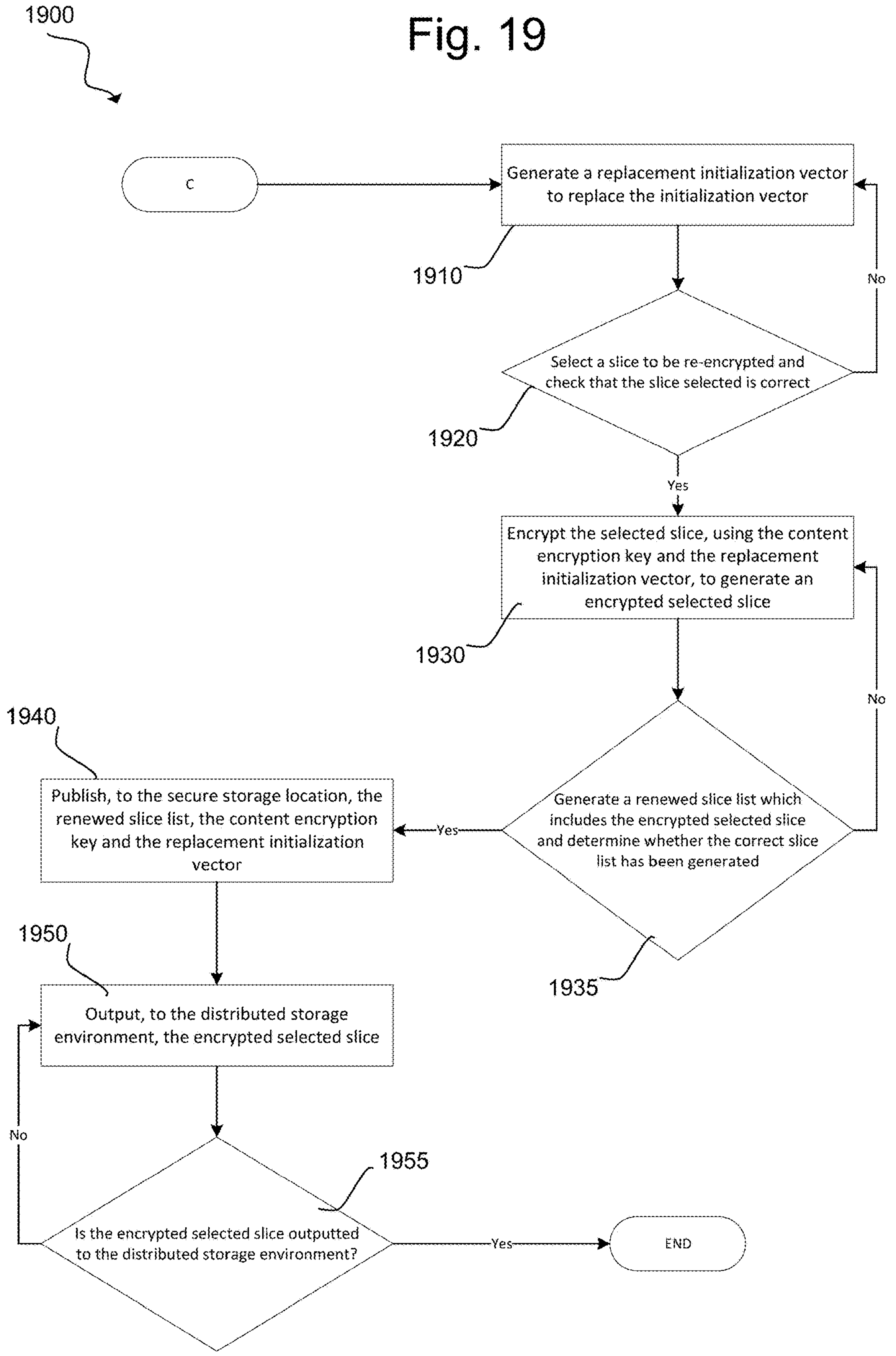
FIG. 19 illustrates a flowchart representing a further process for encrypting and publishing a data payload in a distributed storage environment in accordance with some examples of the disclosure.

FIG. 19 is a flowchart representing a process 1900 for encrypting and publishing a data payload in a distributed storage environment in accordance with some examples of the disclosure. Process 1900 starts at step 'C' which may correspond to that shown in FIG. 16.

At step 1910, a replacement raw initialization vector may be generated to replace the raw initialization vector presently in circulation. This may be carried out by any suitable method.

At step 1920, a determination may be made as to the slice to be re-encrypted. A check may be carried out to ensure that the correct slice has been selected, and if not, the process may return to step 1910.

At step 1930, in a similar way to steps 1460 and 1650 above, the selected slice may be encrypted using the content encryption key described above to generate an encrypted selected slice, using the replacement raw initialization vector as described herein.

At step 1935, similar to steps 1430 and 1660 above, a renewed slice list may be generated which includes information about the encrypted selected slices into which the data payload has been divided, including the encrypted selected slice which has been re-encrypted. The information may be hashed data, metadata, or an absolute location in which the slices may be stored. The information may be data which is well understood in connection with the distribution of data in line with the Bittorrent protocol. A check may be carried out to ensure that the data payload has been divided into a first and subsequent slice, and if not, the process may return to step 1930 above.

At step 1940, similar to steps 1470 and 1670 above, the renewed slice list, content encryption key, and the replacement raw initialization vector may be published to a secure location. Access to this secure location may be restricted.

At step 1950, similar to steps 1480 and 1680 above, the encrypted selected slice may be output to the distributed storage environment. This may be in line with known Bittorrent protocols.

At step 1955, similar to steps 1485 and 1685 above, a check may be carried out to ensure that selected encrypted slice has been outputted to the distributed storage environment. This check may be a checksum, or any suitable type of check, automated or otherwise.

The actions or descriptions of FIG. 19 may be used with any other example of this disclosure. In addition, the actions and descriptions described in relation to FIG. 19 may be done in any suitable alternative orders or in parallel to further the purposes of this disclosure.

Figure 20:
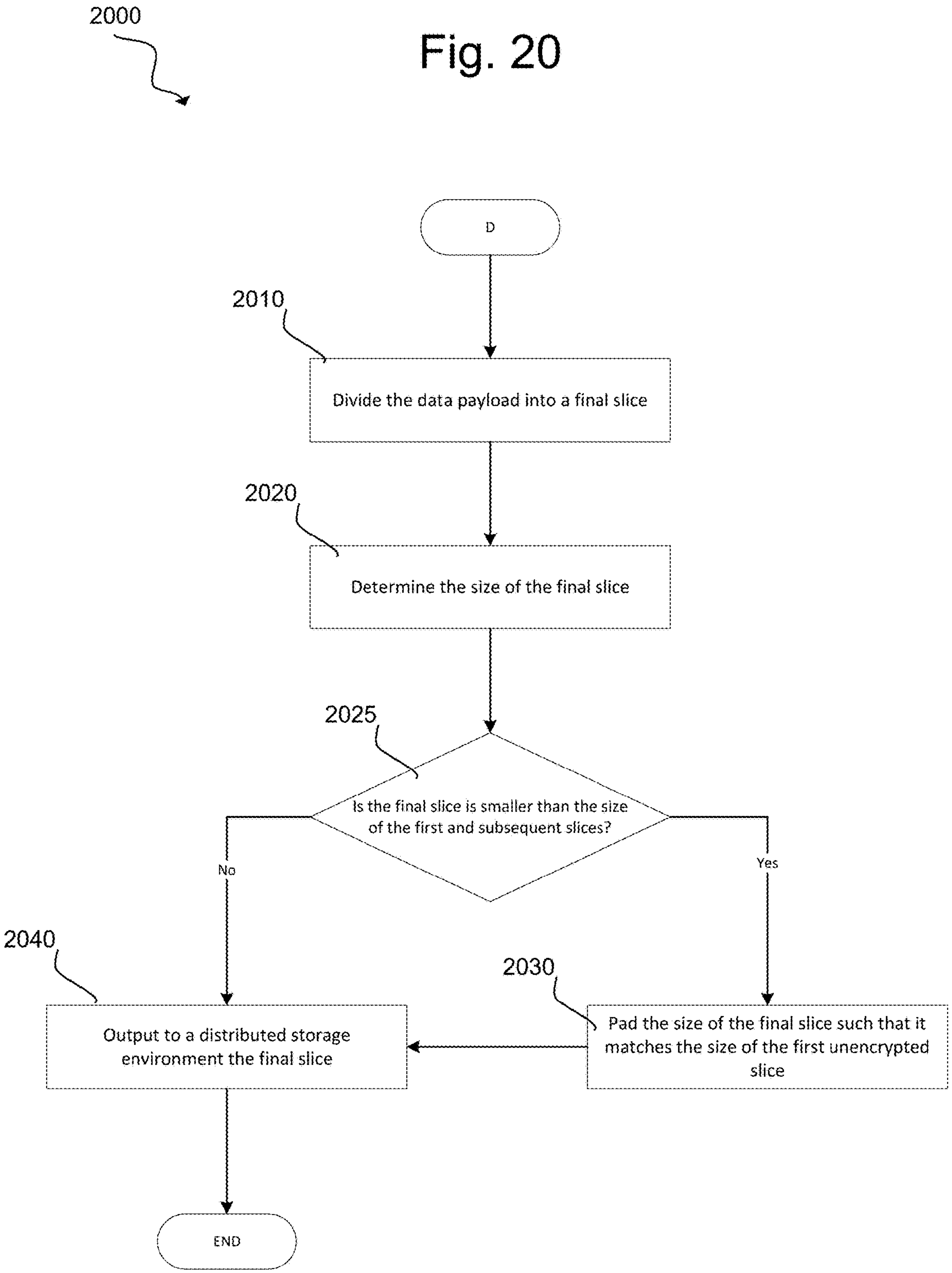
FIG. 20 illustrates a flowchart representing a further process for encrypting and publishing a data payload in a distributed storage environment in accordance with some examples of the disclosure.

FIG. 20 is a flowchart representing a process 2000 for encrypting and publishing a data payload in a distributed storage environment in accordance with some examples of the disclosure. Process 2000 starts at step 'D' which may correspond to that shown in FIG. 16.

At step 2010, the payload may be divided into its final slice, which is the end slice into which it may be divided.

At step 2020, the size of the final slice may be determined.

At step 2025, a determination may be made as to whether the final slice is smaller than the first and subsequent slices; if so the process proceeds to step 2030, and if not, the process proceeds to step 2040.

At step 2030, ciphertext stealing may be employed to pad the size of the final slice to be the same size as the first unencrypted slice. The process may then proceed to step 2040.

At step 2040, similar to steps 1480, 1680, and 1950 above, the final slice may be output to the distributed storage environment. This may be in line with known Bittorrent protocols.

The actions or descriptions of FIG. 20 may be used with any other example of this disclosure. In addition, the actions and descriptions described in relation to FIG. 20 may be done in any suitable alternative orders or in parallel to further the purposes of this disclosure.

Figure 21A:
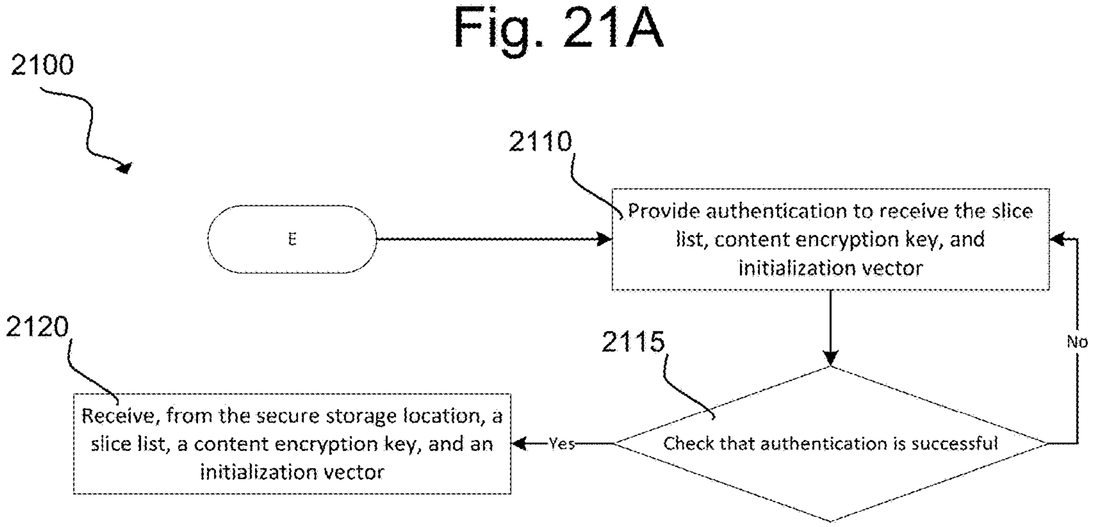
FIG. 21A illustrates a flowchart representing a further process for receiving and decrypting a data payload in a distributed storage environment in accordance with some examples of the disclosure.

FIG. 21A is a flowchart representing a process 2100 for receiving and decrypting a data payload in a distributed storage environment in accordance with some aspects of the disclosure. Process 2100 starts at step 'E' which may correspond to that shown in FIG. 17.

At step 2110, authentication may be provided to receive the slice list, content encryption key, and raw initialization vector. Such authentication may be a username and password, security token, address filtering, geolocation of IP, or any suitable means.

At step 2115, a check that authentication is carried out. In the event of unsuccessful authentication, the process returns to step 2110. In the event of successful authentication, the process advances to step 2120.

At step 2120, similar to steps 1510 and 1710 above, the slice list, content encryption key, and raw initialization vector may be retrieved from a secure storage location once successfully authenticated. The process may then return to step 1515 or step 1715.

The actions or descriptions of FIG. 21A may be used with any other example of this disclosure. In addition, the actions and descriptions described in relation to FIG. 21A may be done in any suitable alternative orders or in parallel to further the purposes of this disclosure.

Figure 21B:
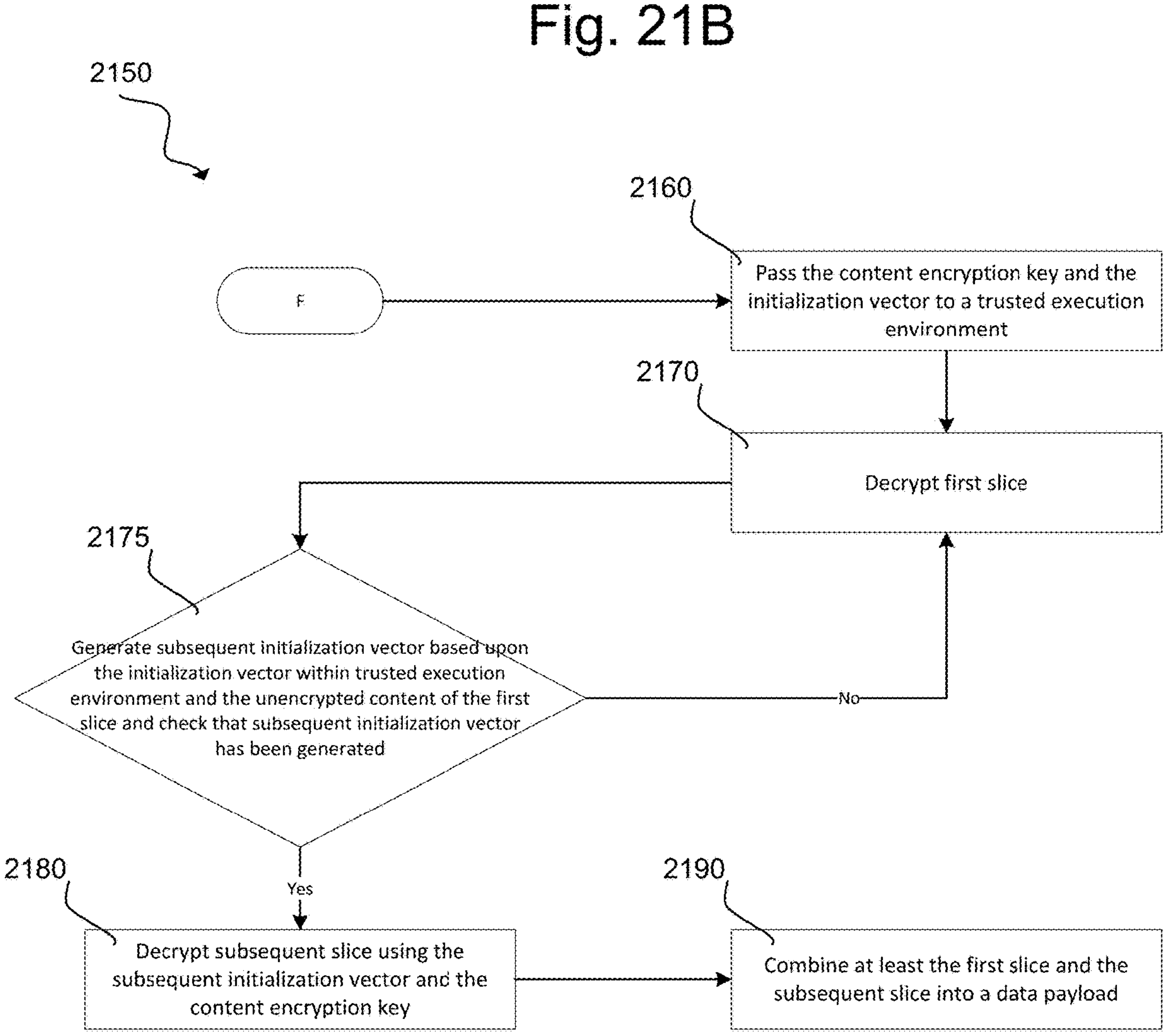
FIG. 21B illustrates a flowchart representing a further process for receiving and decrypting a data payload in a distributed storage environment in accordance with some examples of the disclosure.

FIG. 21B is a flowchart representing a process 2150 for receiving and decrypting a data payload in a distributed storage environment in accordance with some aspects of the disclosure. Process 2150 starts at step 'F' which may correspond to that shown in FIG. 17.

At step 2160, the content encryption key and raw initialization vector may be passed to a trusted execution environment. Such a trusted execution environment, TEE, may be such as that described herein, or any other suitable environment.

At step 2170, similar to steps 1540 and 1740 described above, the first slice may be decrypted using the content encryption key and raw initialization value in the trusted execution environment.

At step 2175, similar to steps 1545 and 1745 described above, a subsequent initialization vector is generated in the trusted execution environment, based upon the raw initialization vector and the unencrypted content of the first slice. This may include an XOR of the unencrypted content of the first slice. A check may also be carried out to determine whether the subsequent initialization vector has been generated.

At step 2180, similar to steps 1550 and 1750 above, the subsequent slice is decrypted using the content encryption key and the subsequent initialization in the trusted execution environment of a device as described herein, as with the first encrypted slice.

At step 2190, similar to steps 1560 and 1760 above, the first and subsequent decrypted slices are combined into a data payload. This data payload may be a media item, and may be encoded in a format described herein or any suitable format.

The actions or descriptions of FIG. 21B may be used with any other example of this disclosure. In addition, the actions and descriptions described in relation to FIG. 21B may be done in any suitable alternative orders or in parallel to further the purposes of this disclosure.

Figure 22:
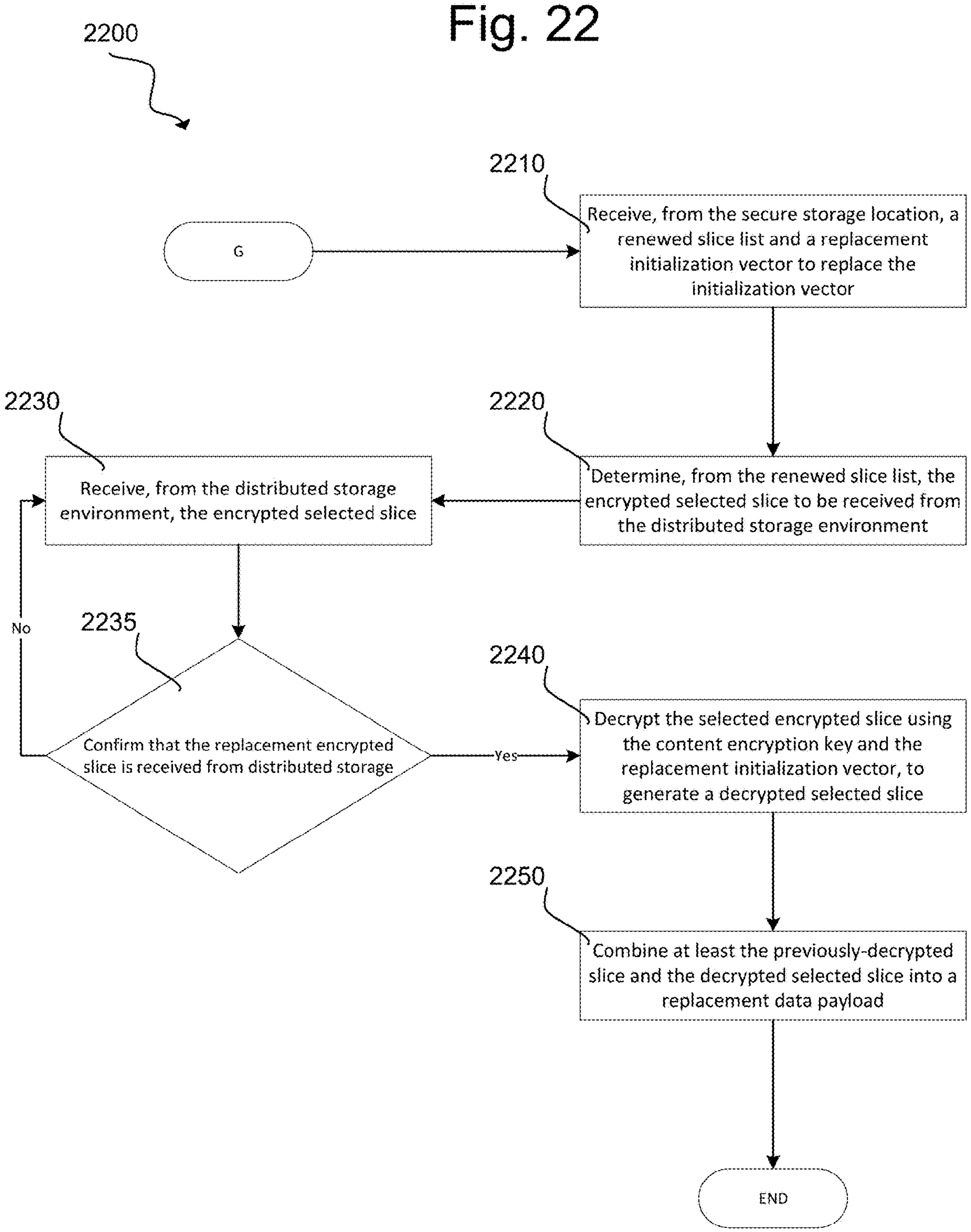
FIG. 22 illustrates a flowchart representing a further process for receiving and decrypting a data payload in a distributed storage environment in accordance with some examples of the disclosure.

FIG. 22 is a flowchart representing a process 2200 for receiving and decrypting a data payload in a distributed storage environment in accordance with some aspects of the disclosure. Process 2200 starts at step 'G' which may correspond to that shown in FIG. 17.

At step 2210, a renewed slice list and a replacement raw initialization vector may be retrieved from a secure storage location. This secure storage location may limit access thereto. The secure storage location may be a trusted location.

At step 2220, a determination may be made as to the replacement encrypted slice to be retrieved from the distributed storage environment. This may be in line with understood Bittorrent protocols.

At step 2230, the replacement encrypted slice is retrieved from the distributed storage environment, as per the determination at step 2220 above.

At step 2235, a confirmation that the replacement encrypted slice has been retrieved correctly. This may include a hashing operation, such as MD5, to confirm the content of the slices, and may be any suitable type of check, automated or otherwise.

At step 2240, the replacement encrypted slice is decrypted using the content encryption key and the replacement raw initialization vector to form a replacement decrypted slice. This decryption may be carried out in the trusted execution environment of a device as described herein.

At step 2250, the replacement decrypted slice is combined with the previously-decrypted slices into a data payload. This data payload may be a media item, and may be encoded in a format described herein or any suitable format.

The actions or descriptions of FIG. 22 may be used with any other example of this disclosure. In addition, the actions and descriptions described in relation to FIG. 22 may be done in any suitable alternative orders or in parallel to further the purposes of this disclosure.

Figure 23:
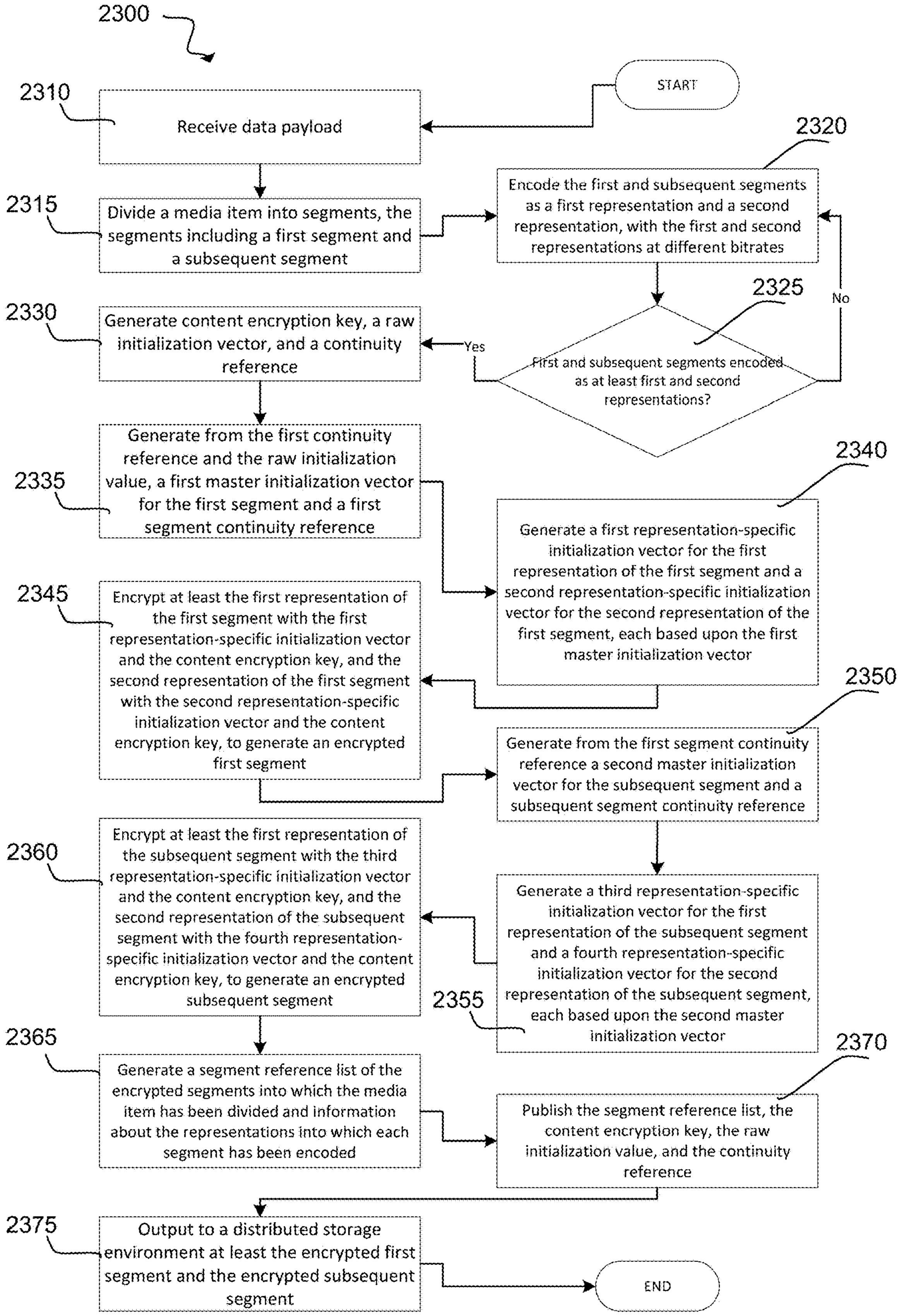
FIG. 23 illustrates a flowchart representing a process for encrypting and providing data in a streaming environment in accordance with some examples of the disclosure.

FIG. 23 is a flowchart representing an illustrative process 2300 for encrypting and publishing a data payload in a distributed storage environment in accordance with some aspects of the disclosure.

At step 2310, a data payload may be received. This may be a video file which is encoded in a format appropriate for streaming or online distribution. The payload may be a media item in general, and may be encoded in any suitable format. Once the payload is received, the process may advance to step 2315.

At step 2315, the data payload may be divided into segments appropriate for streaming, and this may be in accordance with the MPEG-DASH standard. The segments may include at least a first segment and a subsequent segment. Once the payload has been divided into segments, the method may advance to step 2320.

At step 2320, the first and subsequent segments may be encoded in at least a first representation and a second representation in line with understood techniques; these representations may be at differing bitrates and qualities as is understood with MPEG-DASH streaming. In an example, the first representation may be at a lower bitrate than the second representation.

At step 2325, a check may be carried out to ensure that the representations have been encoded successfully, and if so, the process may advance to step 2330.

At step 2330, a content encryption key may be generated to encrypt the data payload, along with a raw initialization vector and a continuity reference. The raw initialization vector may be generated as described herein, as may the continuity reference. As described earlier, the continuity reference may be zeros, a hash of a value, derived from an identifier of the data payload, or derived in any suitable way.

At step 2335, a first master initialization vector may be generated from the first continuity reference and the raw initialization value. This may be carried out using a HMAC key or by any suitable operation. This first master initialization value may be used as the master IV for the first segment. The first segment continuity reference may also be generated at this step as described herein.

At step 2340, as described herein, a first representation IV and a second representation IV may be generated from the master IV for the first segment, using techniques described herein.

At step 2345, the first representation of the first segment may be encrypted with the first representation-specific IV and the second representation of the second segment may be encrypted using the second representation-specific IV. This gives rise to an encrypted first segment. This may then be used at step 2350.

At step 2350, a second master initialization vector for the subsequent segment and a subsequent segment continuity reference may be generated from the first segment continuity reference.

At step 2355, a third representation-specific initialization vector for the first representation of the subsequent segment and a fourth representation-specific initialization vector for the second representation of the subsequent segment may be generated, each based upon the second master initialization vector, using techniques described herein.

At step 2360, the first representation of the subsequent segment may be encrypted with the third representation-specific initialization vector and the content encryption key, and the second representation of the subsequent segment may be encrypted with the fourth representation-specific initialization vector and the content encryption key, to generate an encrypted subsequent segment.

At step 2365, a segment reference list of the encrypted segments into which the media item has been divided and information about the representations into which each segment has been encoded may be generated using techniques described herein.

At step 2370, similar to that which is described above, the segment reference list, the content encryption key, the raw initialization value, and the continuity reference may be published, to a secure storage location.

At step 2375, the encrypted first segment and the encrypted subsequent segment may be outputted to a distributed storage environment, as described herein.

The actions or descriptions of FIG. 23 may be used with any other example of this disclosure. In addition, the actions and descriptions described in relation to FIG. 23 may be done in any suitable alternative orders or in parallel to further the purposes of this disclosure.

Figure 24:
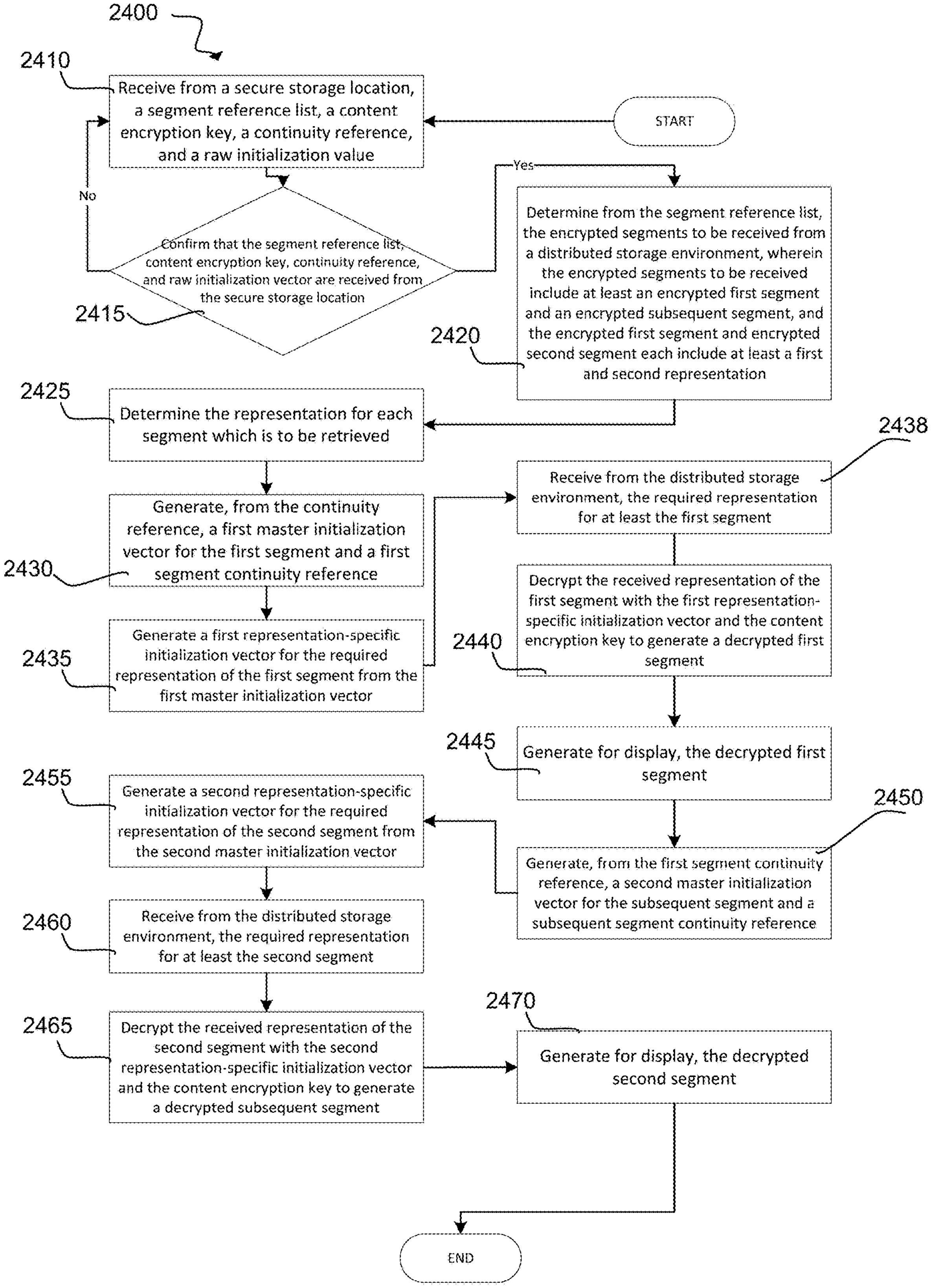
FIG. 24 illustrates a flowchart representing a process for receiving and decrypting data in a streaming environment in accordance with some examples of the disclosure.

FIG. 24 is a flowchart representing an illustrative process 2400 for receiving and decrypting a data payload in a distributed storage environment in accordance with some aspects of the disclosure.

At step 2410, a segment reference list, a content encryption key, a continuity reference, and a raw initialization value may be received from a secure storage location using techniques described herein. Once received, the process may advance to step 2415.

At step 2415, a check may be carried out to ensure that the segment reference list, content encryption key, continuity reference, and raw initialization value may be received successfully, and if so, the process may advance to step 2420.

At step 2420, it may be determined from the segment reference list the encrypted segments to be received from a distributed storage environment, and the encrypted segments to be received may include at least an encrypted first segment and an encrypted subsequent segment, and the encrypted first segment and encrypted second segment each include at least a first and second representation.

At step 2425, a determination may be made as to the representation for each segment which is to be received. This may be dependent upon available bandwidth, and may be determined using techniques understood, for example, in connection with the MPEG-DASH standard.

At step 2430, a first master initialization vector for the first segment and a first segment continuity reference may be generated from the continuity reference received earlier.

At step 2435, a first representation-specific initialization vector may be generated for the required representation of the first segment from the first master initialization vector using techniques described herein.

At step 2438, the required representation for at least the first segment may be received from the distributed storage environment, as described herein.

At step 2440, received representation of the first segment may be decrypted using the first representation-specific initialization vector and the content encryption key to generate a decrypted first segment.

At step 2445, the decrypted first segment may be generated for display.

At step 2450, a second master initialization vector for the subsequent segment and a subsequent segment continuity reference may be generated from the first segment continuity reference.

At step 2455, a second representation-specific initialization vector may be generated for the required representation of the second segment from the second master initialization vector, using the techniques described herein.

At step 2460, the required representation for at least the second segment may be received from the distributed storage environment.

At step 2465, the received representation of the second segment may be decrypted with the second representation-specific initialization vector and the content encryption key to generate a decrypted subsequent segment.

At step 2470, the decrypted second segment may be generated for display.

Figure 25:
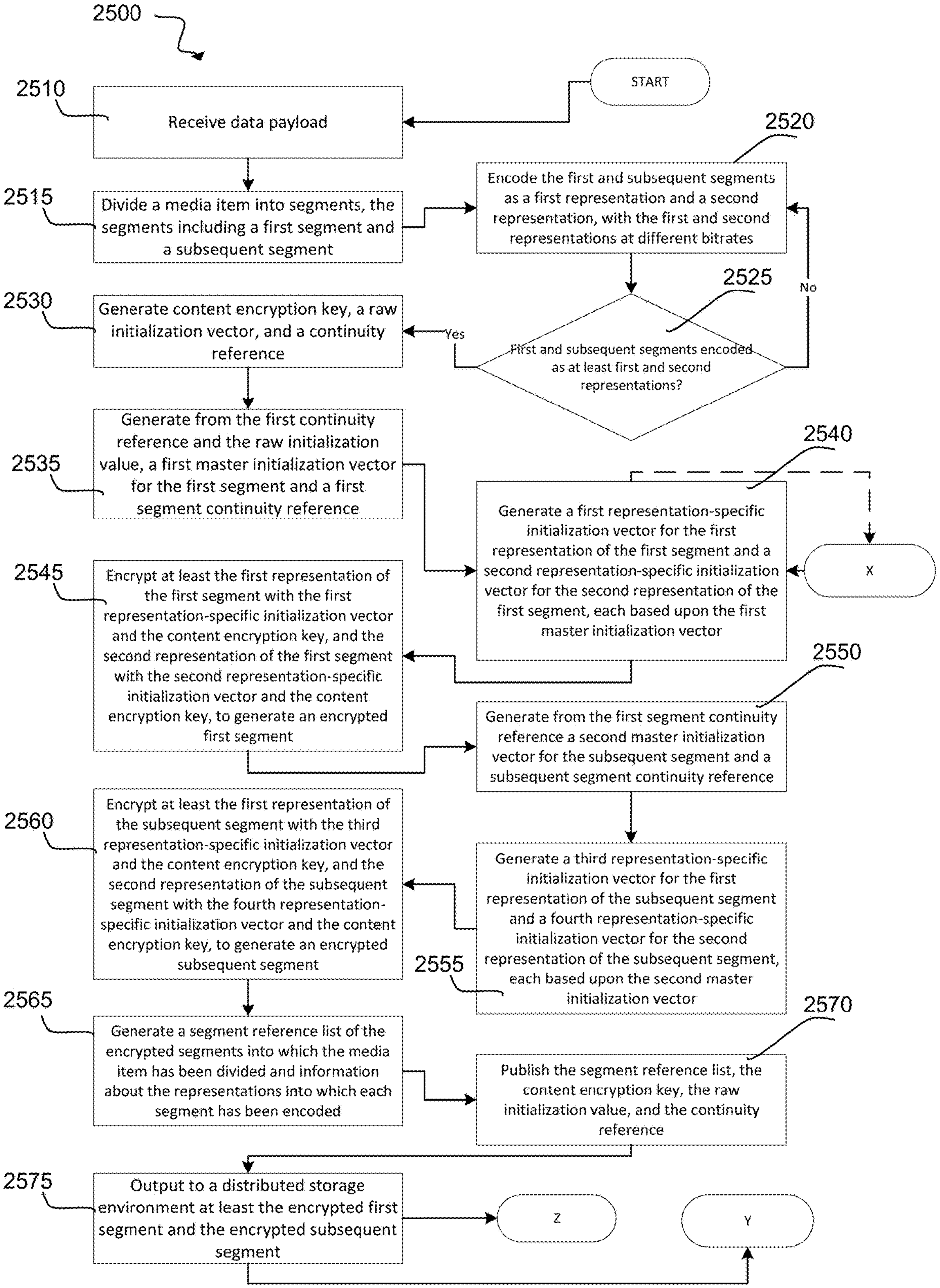
FIG. 25 illustrates a flowchart representing a process for encrypting and providing data in a streaming environment in accordance with some examples of the disclosure.

The actions or descriptions of FIG. 24 may be used with any other example of this disclosure. In addition, the actions and descriptions described in relation to FIG. 24 may be done in any suitable alternative orders or in parallel to further the purposes of this disclosure. FIG. 25 is a flowchart representing an illustrative process 2500 for and publishing a data payload in a distributed storage environment in accordance with some aspects of the disclosure. The steps in FIG. 25 correspond with those set out in FIG. 23.

At step 2510, similar to step 2310, a data payload may be received. This may be a video file which is encoded in a format appropriate for streaming or online distribution. The payload may be a media item in general, and may be encoded in any suitable format. Once the payload is received, the process may advance to step 2515.

At step 2515, similar to step 2315, the data payload may be divided into segments appropriate for streaming, and this may be in accordance with the MPEG-DASH standard. The segments may include at least a first segment and a subsequent segment. Once the payload has been divided into segments, the method may advance to step 2520.

At step 2520, similar to step 2320, the first and subsequent segments may be encoded in at least a first representation and a second representation in line with understood techniques; these representations may be at differing bitrates and qualities as is understood with MPEG-DASH streaming. In an example, the first representation may be at a lower bitrate than the second representation.

At step 2525, similar to step 2325, a check may be carried out to ensure that the representations have been encoded successfully, and if so, the process may advance to step 2530.

At step 2530, similar to step 2330, a content encryption key may be generated to encrypt the data payload, along with a raw initialization vector and a continuity reference. The raw initialization vector may be generated as described herein, as may the continuity reference. As described earlier, the continuity reference may be zeros, a hash of a value, derived from an identifier of the data payload, or derived in any suitable way.

At step 2535, similar to step 2335, a first master initialization vector may be generated from the first continuity reference and the raw initialization value. This may be carried out using a HMAC key or by any suitable operation. This first master initialization value may be used as the master IV for the first segment. The first segment continuity reference may also be generated at this step as described herein.

At step 2540, similar to step 2340, as described herein, a first representation IV and a second representation IV may be generated from the master IV for the first segment, using techniques described herein. The process may pass through step 'X' and return to step 2540. Step 'X' will be described later.

At step 2545, similar to step 2345, the first representation of the first segment may be encrypted with the first representation-specific IV and the second representation of the second segment may be encrypted using the second representation-specific IV. This gives rise to an encrypted first segment. This may then be used at step 2550.

At step 2350, a second master initialization vector for the subsequent segment and a subsequent segment continuity reference may be generated from the first segment continuity reference.

At step 2555, similar to step 2355, a third representation-specific initialization vector for the first representation of the subsequent segment and a fourth representation-specific initialization vector for the second representation of the subsequent segment may be generated, each based upon the second master initialization vector, using techniques described herein.

At step 2560, similar to step 2360, the first representation of the subsequent segment may be encrypted with the third representation-specific initialization vector and the content encryption key, and the second representation of the subsequent segment may be encrypted with the fourth representation-specific initialization vector and the content encryption key, to generate an encrypted subsequent segment.

At step 2565, similar to step 2365, a segment reference list of the encrypted segments into which the media item has been divided and information about the representations into which each segment has been encoded may be generated using techniques described herein.

At step 2570, similar to step 2370, and similar to that which is described above, the segment reference list, the content encryption key, the raw initialization value, and the continuity reference may be published, to a secure storage location.

At step 2575, similar to step 2375, the encrypted first segment and the encrypted subsequent segment may be outputted to a distributed storage environment, as described herein. The process may proceed to step 'Y' and/or step 'Z' at this point. Steps 'Y' and 'Z' are described later.

The actions or descriptions of FIG. 25 may be used with any other example of this disclosure. In addition, the actions and descriptions described in relation to FIG. 25 may be done in any suitable alternative orders or in parallel to further the purposes of this disclosure.

Figure 26A:
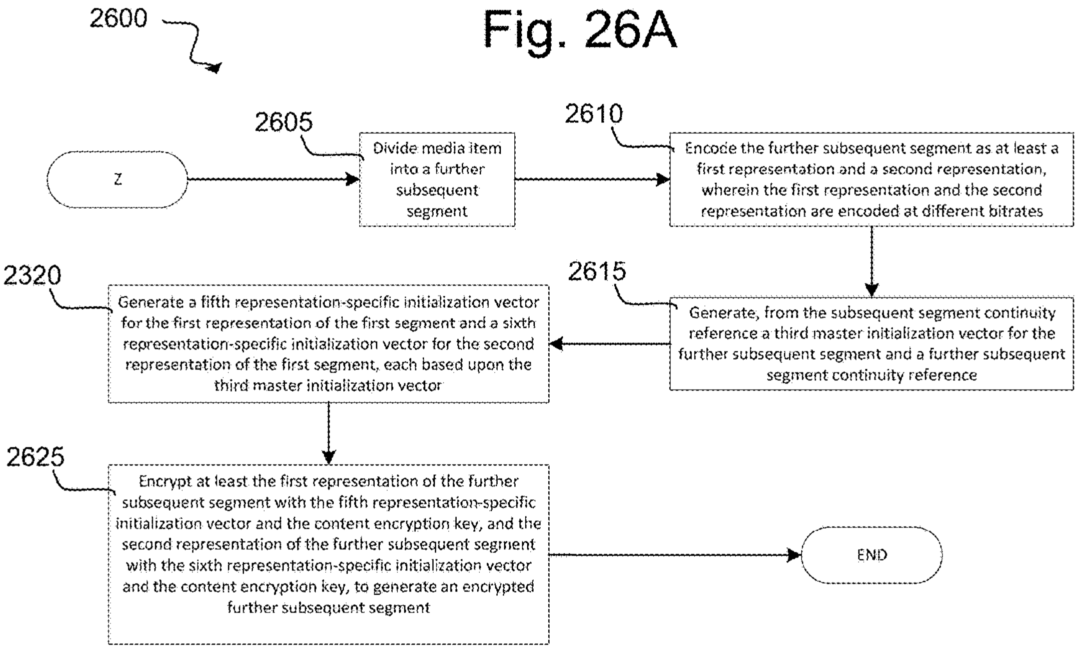
FIG. 26A illustrates a flowchart representing a further process for encrypting and providing data in a streaming environment in accordance with some examples of the disclosure.

FIG. 26A is a flowchart representing a process 2600 for encrypting and publishing a data payload in a distributed storage environment in accordance with some examples of the disclosure. Process 2600 starts at step 'Z' which may correspond to that shown in FIG. 25.

At step 2605, the media item or data payload may be divided into a further subsequent segment, using techniques described herein and similar to that described above.

At step 2610, the further subsequent segments are encoded as at least a first representation and a second representation, wherein the first representation and the second representation are encoded at different bitrates, similar to that described earlier.

At step 2615, a third master initialization vector for the further subsequent segment and a further subsequent segment continuity reference may be generated from the subsequent segment continuity reference similar to that described above.

At step 2620, a fifth representation-specific initialization vector may be generated for the first representation of the first segment and a sixth representation-specific initialization vector may be generated for the second representation of the first segment, each based upon the third master initialization vector as described earlier.

At step 2625, the first representation of the further subsequent segment may be encrypted with the fifth representation-specific initialization vector and the content encryption key, and the second representation of the further subsequent segment may be encrypted with the sixth representation-specific initialization vector and the content encryption key, to generate an encrypted further subsequent segment.

The actions or descriptions of FIG. 26A may be used with any other example of this disclosure. In addition, the actions and descriptions described in relation to FIG. 26A may be done in any suitable alternative orders or in parallel to further the purposes of this disclosure.

Figure 26B:
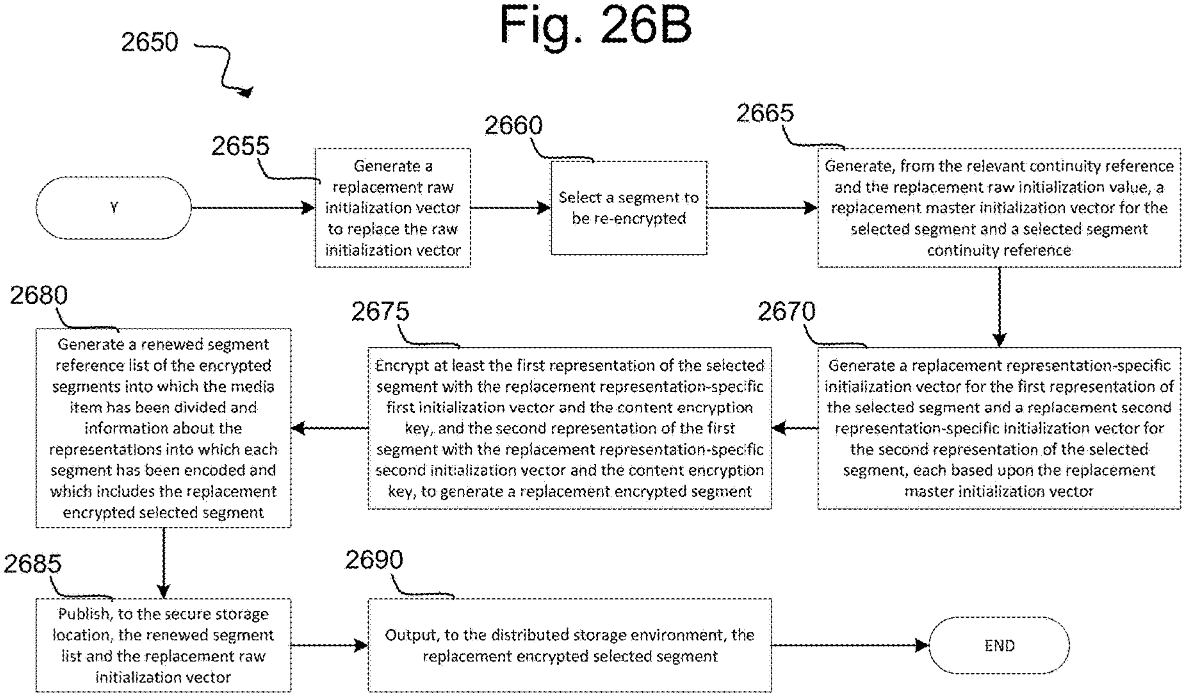
FIG. 26B illustrates a flowchart representing a further process for encrypting and providing data in a streaming environment in accordance with some examples of the disclosure.

FIG. 26B is a flowchart representing a process 2650 for encrypting and publishing a data payload in a distributed storage environment in accordance with some examples of the disclosure. Process 2650 starts at step 'Y' which may correspond to that shown in FIG. 25.

At step 2655, a replacement raw initialization vector may be generated to replace the raw initialization vector, using the techniques described herein.

At step 2660, a segment to be re-encrypted may be selected. This may be selected at random, or by a predetermined selection.

At step 2665, a replacement master initialization vector for the selected segment and a selected segment continuity reference may be generated from the relevant continuity reference and the replacement raw initialization value.

At step 2670, a replacement representation-specific initialization vector may be generated for the first representation of the selected segment and a replacement second representation-specific initialization vector may be generated for the second representation of the selected segment, each based upon the replacement master initialization vector.

At step 2675, at least the first representation of the selected segment may be encrypted with the replacement representation-specific first initialization vector and the content encryption key, and the second representation of the first segment may be encrypted with the replacement representation-specific second initialization vector and the content encryption key, to generate a replacement encrypted segment.

At step 2680, a renewed segment reference list of the encrypted segments into which the media item has been divided and information about the representations into which each segment has been encoded may be generated, and the segment reference list may also include the replacement encrypted selected segment.

At step 2685, the renewed segment list and the replacement raw initialization vector may be published to the secure storage location.

At step 2690, the replacement encrypted selected segment may be outputted to the distributed storage environment.

The actions or descriptions of FIG. 26B may be used with any other example of this disclosure. In addition, the actions and descriptions described in relation to FIG. 26B may be done in any suitable alternative orders or in parallel to further the purposes of this disclosure.

The actions or descriptions of FIG. 26B may be used with any other example of this disclosure. In addition, the actions and descriptions described in relation to FIG. 26B may be done in any suitable alternative orders or in parallel to further the purposes of this disclosure.

Figure 27:
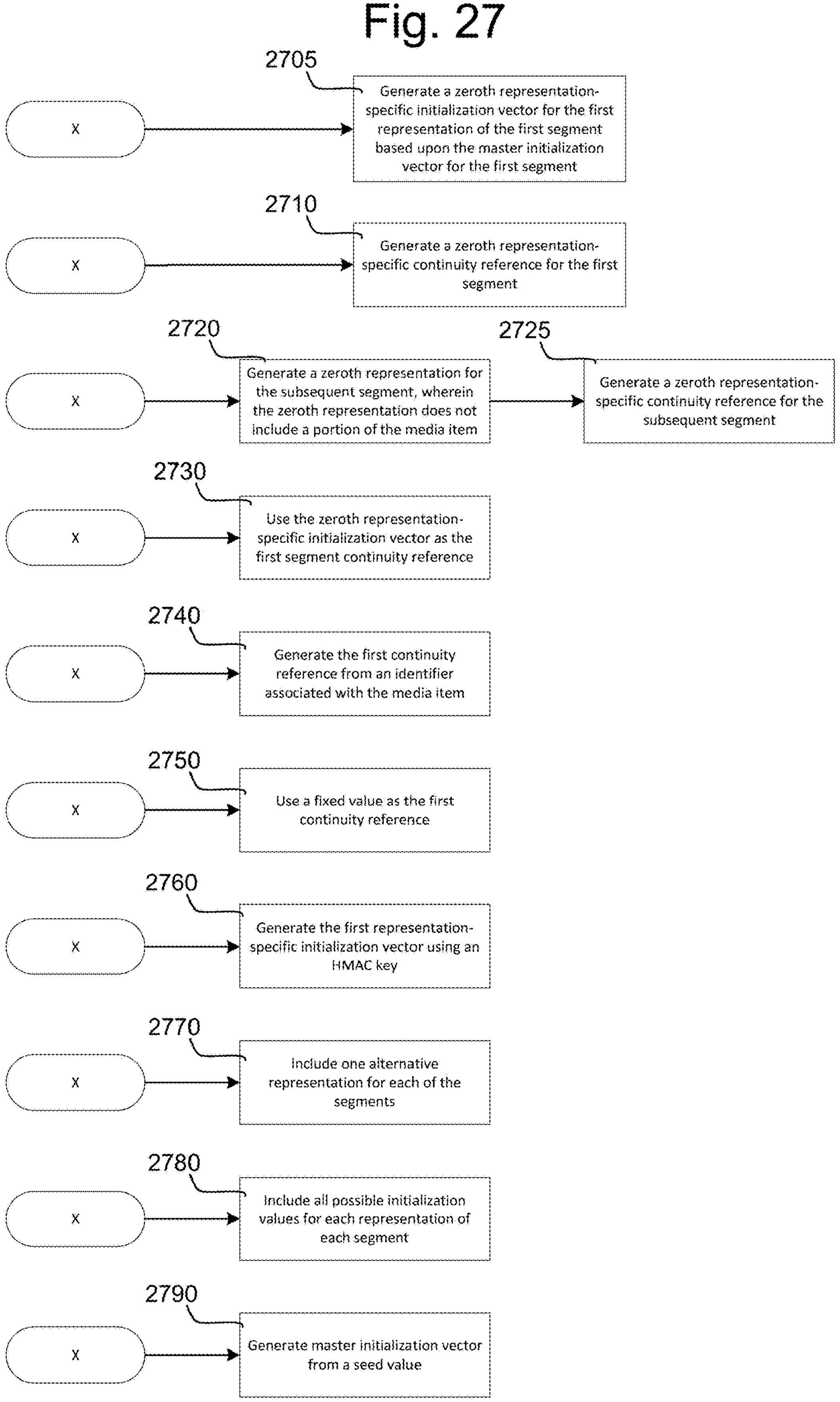
FIG. 27 illustrates a flowchart representing aspects of a further process for encrypting and providing data in a streaming environment in accordance with some examples of the disclosure.

FIG. 27 illustrates features or processes which may be carried out at step 'X' shown in FIG. 25.

At step 2705, a zeroth representation-specific initialization vector may be generated for the first representation of the first segment based upon the master initialization vector for the first segment.

At step 2710, a zeroth representation-specific continuity reference for the first segment may be generated.

At step 2720, a zeroth representation for the subsequent segment is generated, and the zeroth representation may not include a portion of the media item or data payload. The zeroth representation may be used as the continuation reference, as described earlier herein. This representation may be used to decode the next segment. At step 2725, the zeroth representation-specific continuation reference or continuity reference may be generated from the zeroth representation.

At step 2730, the zeroth representation-specific initialization vector may be used as the first segment continuity reference.

At step 2740, the first continuity reference may be generated using an identifier associated with the media item or payload, such as the filename or the unique file identifier.

At step 2750, a fixed value may be used as the first continuity reference. As described above, this may be zeros, or may be a predetermined number or string.

At step 2760, the first representation-specific initialization vector is generated using an HMAC key or HMAC decryption process.

At step 2770, an alternative representation is prepared for each of the segments of the data payload or media item.

At step 2780, all possible initialization values are included for each representation of each segment in the segment reference list.

At step 2790, the master initialization vector is generated from a seed value. This seed value may be used in combination with a pseudo-random number generator.

The actions or descriptions of FIG. 27 may be used with any other example of this disclosure. In addition, the actions and descriptions described in relation to FIG. 27 may be done in any suitable alternative orders or in parallel to further the purposes of this disclosure.

Figure 28:
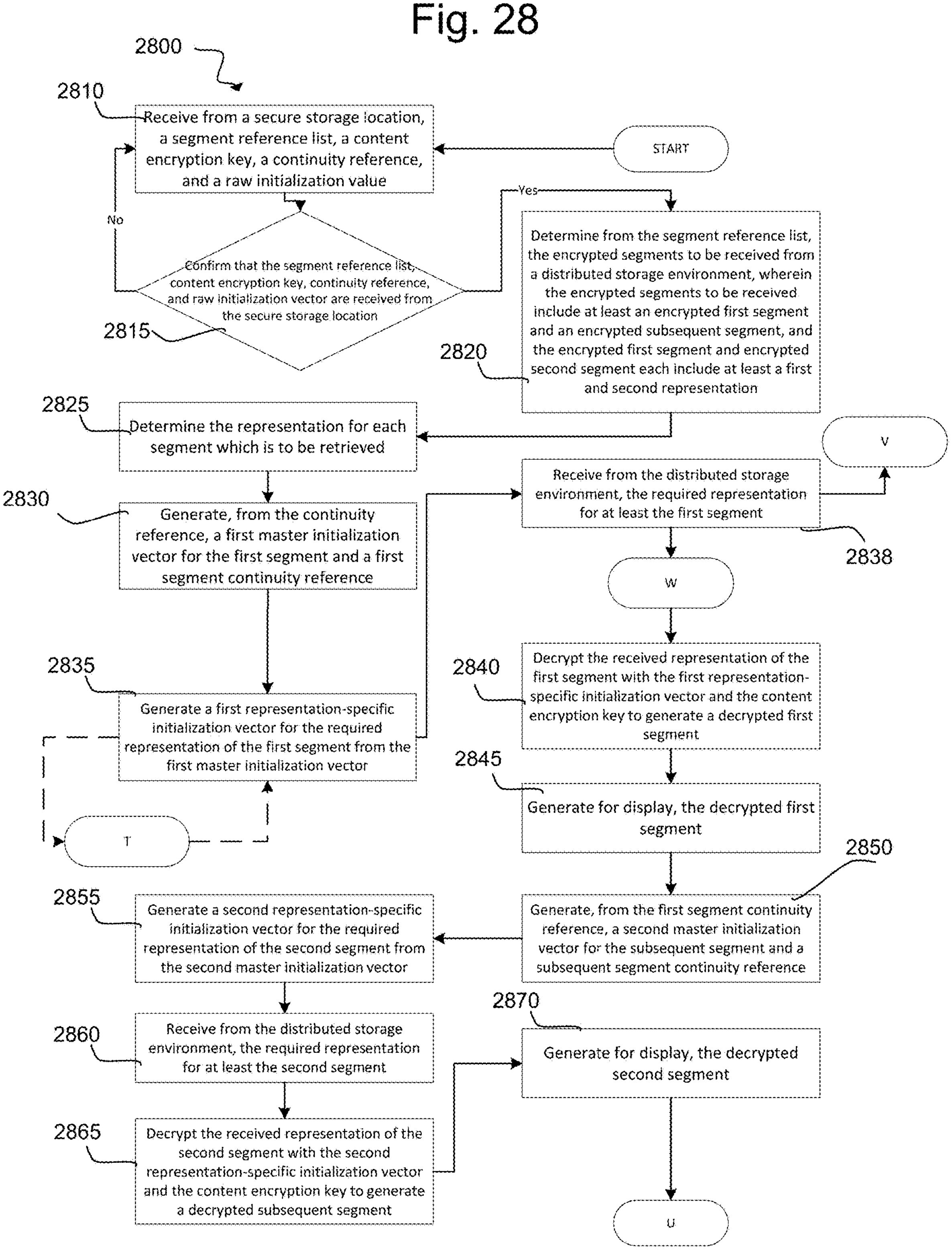
FIG. 28 illustrates a flowchart representing a process for receiving and decrypting data in a streaming environment in accordance with some examples of the disclosure.

FIG. 28 is a flowchart representing an illustrative process 2800 for receiving and decrypting a data payload in a distributed storage environment in accordance with some aspects of the disclosure.

At step 2810, similar to 2410, a segment reference list, a content encryption key, a continuity reference, and a raw initialization value may be received from a secure storage location using techniques described herein. Once received, the process may advance to step 2815.

At step 2815, similar to 2810 a check may be carried out to ensure that the segment reference list, content encryption key, continuity reference, and raw initialization value may be received successfully, and if so, the process may advance to step 2820.

At step 2820, similar to 2420, it may be determined from the segment reference list the encrypted segments to be received from a distributed storage environment, and the encrypted segments to be received may include at least an encrypted first segment and an encrypted subsequent segment, and the encrypted first segment and encrypted second segment each include at least a first and second representation.

At step 2825, similar to 2425, a determination may be made as to the representation for each segment which is to be received. This may be dependent upon available bandwidth, and may be determined using techniques understood, for example, in connection with the MPEG-DASH standard.

At step 2830, similar to 2430, a first master initialization vector for the first segment and a first segment continuity reference may be generated from the continuity reference received earlier.

At step 2835, similar to 2435, a first representation-specific initialization vector may be generated for the required representation of the first segment from the first master initialization vector using techniques described herein. The process may then pass through step 'T' which is described below, and may then return to step 2835.

At step 2838, like step 2438, the required representation for at least the first segment may be received from the distributed storage environment, as described herein. The process may then proceed to step 'V' which is described below. The process, after step 'V', may return to step 2838. The process may then pass through step 'W', which is described below. The process may then proceed from step 'W' to step 2840.

At step 2840, similar to step 2440, received representation of the first segment may be decrypted using the first representation-specific initialization vector and the content encryption key to generate a decrypted first segment.

At step 2845, like step 2445, the decrypted first segment may be generated for display.

At step 2850, similar to step 2450, a second master initialization vector for the subsequent segment and a subsequent segment continuity reference may be generated from the first segment continuity reference.

At step 2855, similar to step 2455, a second representation-specific initialization vector may be generated for the required representation of the second segment from the second master initialization vector, using the techniques described herein.

At step 2860, similar to step 2460, the required representation for at least the second segment may be received from the distributed storage environment.

At step 2865, similar to step 2465, the received representation of the second segment may be decrypted with the second representation-specific initialization vector and the content encryption key to generate a decrypted subsequent segment.

At step 2870, like step 2470, the decrypted second segment may be generated for display.

The actions or descriptions of FIG. 28 may be used with any other example of this disclosure. In addition, the actions and descriptions described in relation to FIG. 28 may be done in any suitable alternative orders or in parallel to further the purposes of this disclosure.

Figure 29A:
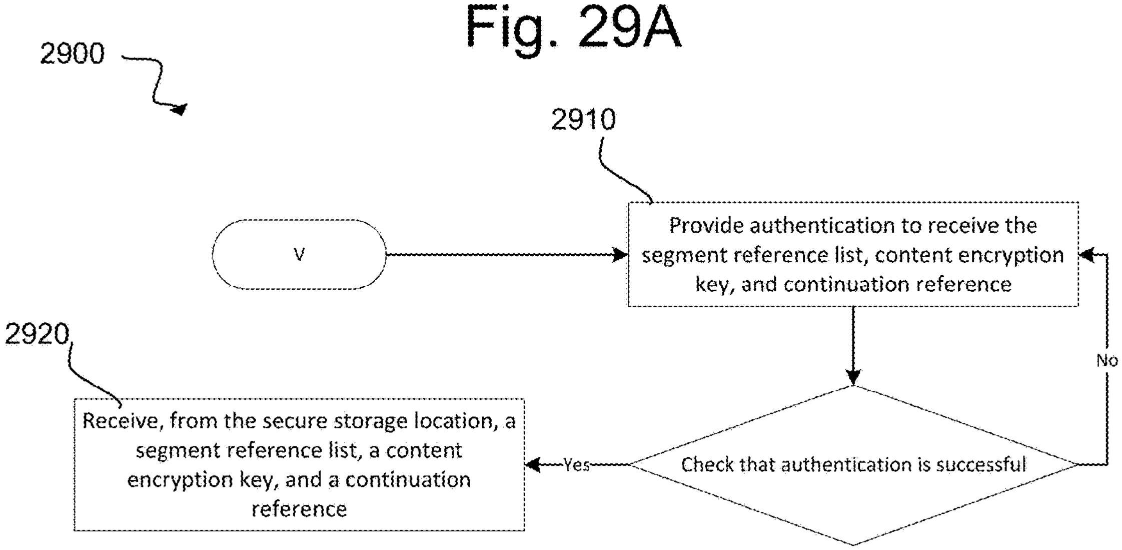
FIG. 29A illustrates a flowchart representing a process for receiving and decrypting data in a streaming environment in accordance with some examples of the disclosure.

FIG. 29A is a flowchart representing a process 2900 for receiving and decrypting a data payload in a distributed storage environment in accordance with some examples of the disclosure. Process 2900 starts at step 'V' which may correspond to that shown in FIG. 28.

At step 2910, authentication may be provided to receive the slice list, content encryption key, and raw initialization vector. Such authentication may be a username and password, security token, address filtering, geolocation of IP, or any suitable means.

At step 2915, a check that authentication is carried out. In the event of unsuccessful authentication, the process returns to step 2910. In the event of successful authentication, the process advances to step 2920.

At step 2920, the segment reference list, a content encryption key, and a continuation reference may be retrieved from a secure storage location once successfully authenticated. The process may then return to step 2838.

The actions or descriptions of FIG. 29A may be used with any other example of this disclosure. In addition, the actions and descriptions described in relation to FIG. 29A may be done in any suitable alternative orders or in parallel to further the purposes of this disclosure.

Figure 29B:
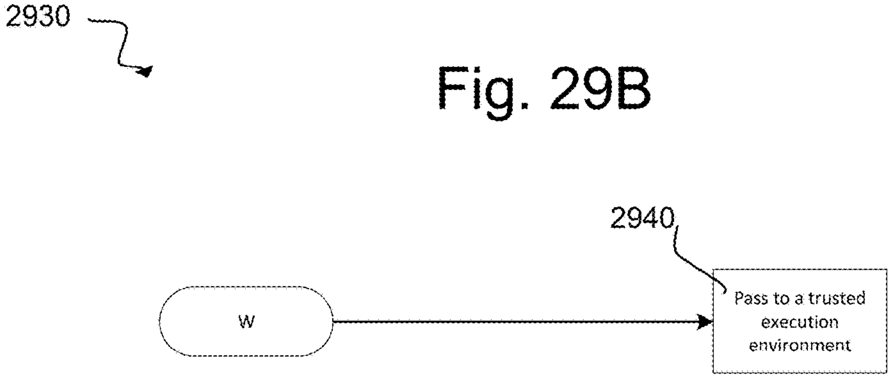
FIG. 29B illustrates a flowchart representing a process for receiving and decrypting data in a streaming environment in accordance with some examples of the disclosure.

FIG. 29B is a flowchart representing a process 2930 for receiving and decrypting a data payload in a distributed storage environment in accordance with some examples of the disclosure. Process 2930 starts at step 'W' which may correspond to that shown in FIG. 28.

At step 2940, the process may pass the segment reference list, a content encryption key, a continuity reference, and a raw initialization value to a trusted execution environment, and then may proceed to decrypt the received representation of the first segment with the first representation-specific initialization vector and the content encryption key to generate a decrypted first segment, step 2840.

The actions or descriptions of FIG. 29B may be used with any other example of this disclosure. In addition, the actions and descriptions described in relation to FIG. 29B may be done in any suitable alternative orders or in parallel to further the purposes of this disclosure.

Figure 29C:
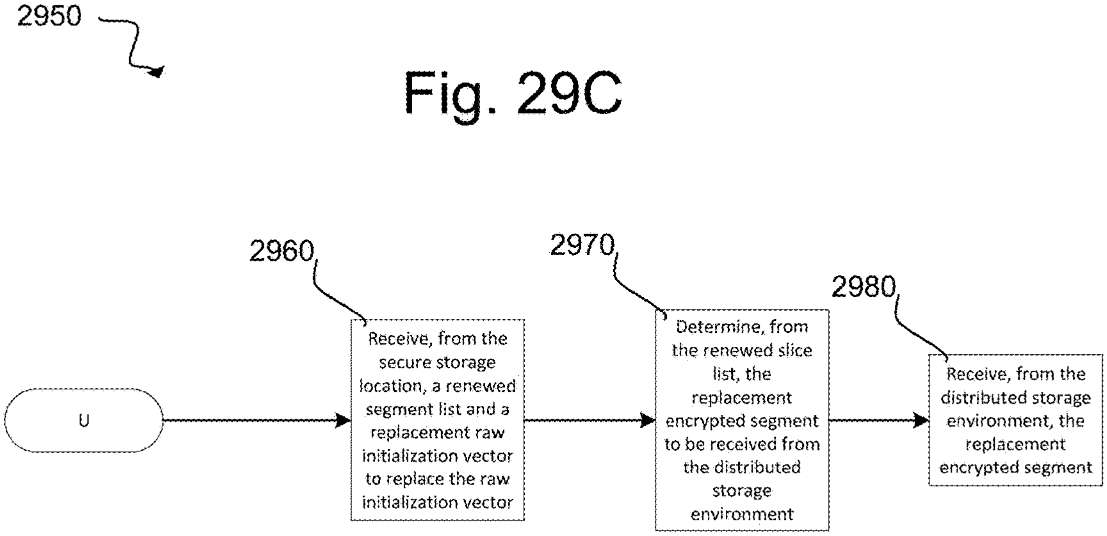
FIG. 29C illustrates a flowchart representing a process for receiving and decrypting data in a streaming environment in accordance with some examples of the disclosure.

FIG. 29C is a flowchart representing a process 2950 for receiving and decrypting a data payload in a distributed storage environment in accordance with some examples of the disclosure. Process 2950 starts at step 'U' which may correspond to that shown in FIG. 28.

At step 2960, a renewed segment list and a replacement raw initialization vector to replace the raw initialization vector from the secure storage location as described earlier herein.

At step 2970, it may be determined from the renewed slice list which replacement encrypted segment to be received from the distributed storage environment.

At step 2980, the replacement encrypted segment may be received from the distributed storage environment. The process may then return to an earlier step in dependence upon the segment which is renewed.

The actions or descriptions of FIG. 29C may be used with any other example of this disclosure. In addition, the actions and descriptions described in relation to FIG. 29C may be done in any suitable alternative orders or in parallel to further the purposes of this disclosure.

Figure 30:
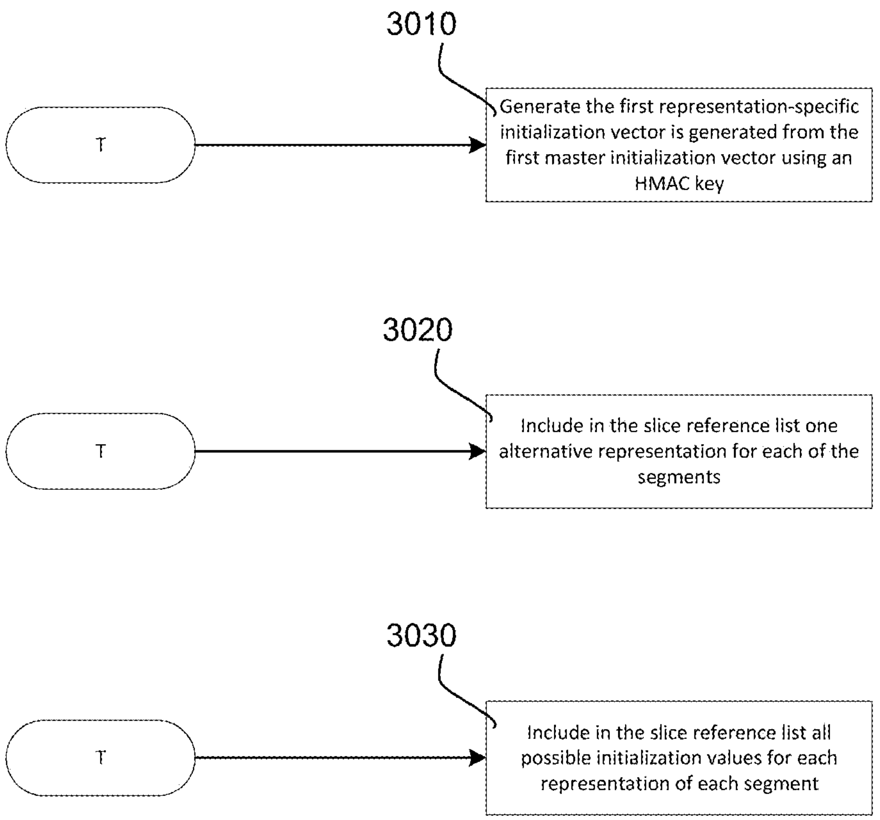
FIG. 30 illustrates a flowchart representing aspects of a further process for receiving and decrypting data in a streaming environment in accordance with some examples of the disclosure.

FIG. 30 illustrates features or processes which may be carried out at step 'X' shown in FIG. 28.

At step 3010, the first representation-specific initialization vector may be generated from the first master initialization value using an HMAC key or an HMAC process.

At step 3020, one alternative representation may be included in the slice reference list for each of the segments.

At step 3030, all possible initialization values for each representation of each segment are included in the slice reference list.

The actions or descriptions of FIG. 30 may be used with any other example of this disclosure. In addition, the actions and descriptions described in relation to FIG. 30 may be done in any suitable alternative orders or in parallel to further the purposes of this disclosure.

Figure 31:
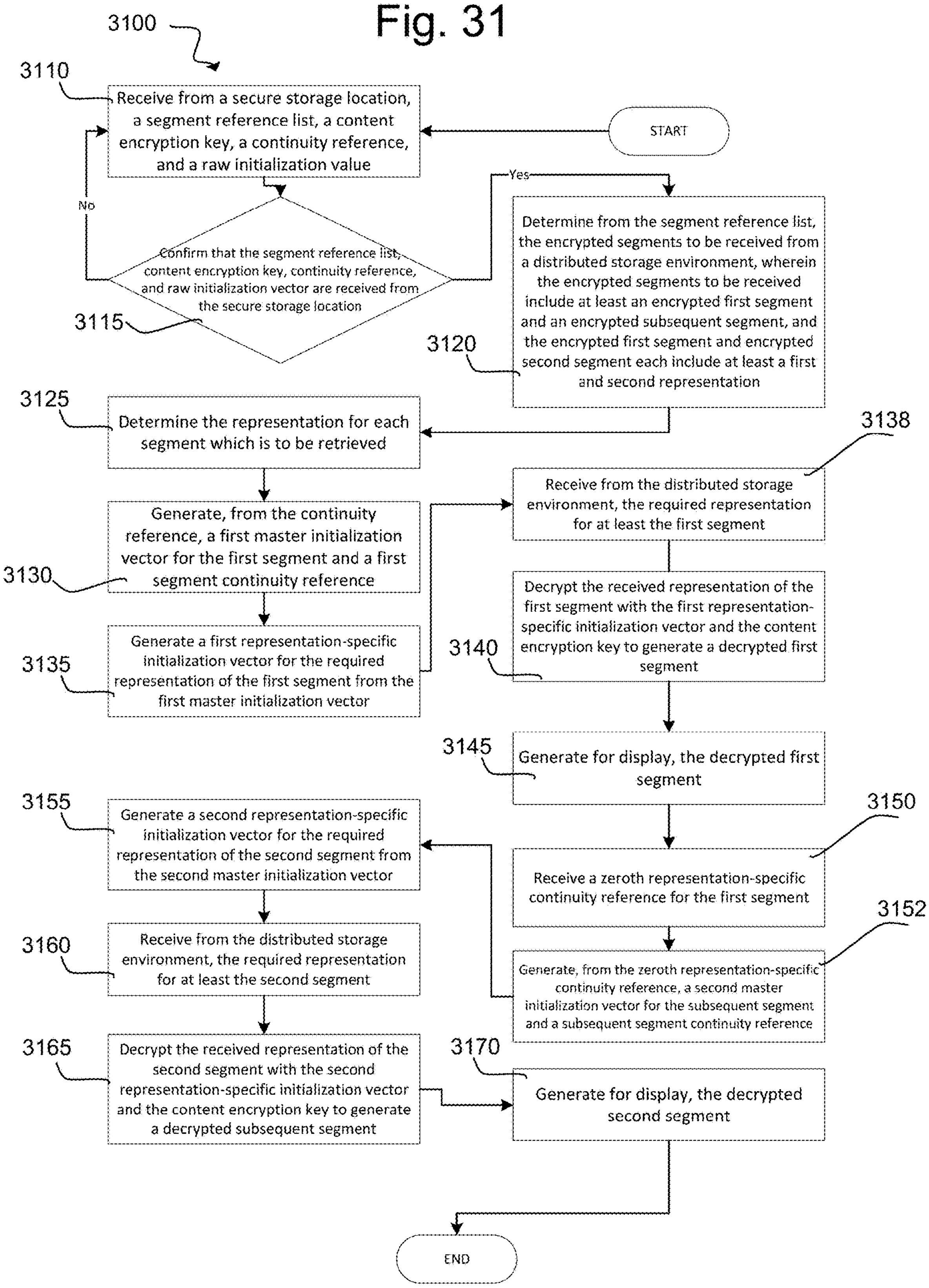
FIG. 31 illustrates a flowchart representing a process for receiving and decrypting data in a streaming environment in accordance with some examples of the disclosure.

FIG. 31 is a flowchart representing an illustrative process 3100 for receiving and decrypting a data payload in a distributed storage environment in accordance with some aspects of the disclosure. This process may be similar to that shown in FIG. 24.

At step 3110, similar to step 2410, a segment reference list, a content encryption key, a continuity reference, and a raw initialization value may be received from a secure storage location using techniques described herein. Once received, the process may advance to step 2415.

At step 3115, as with step 2415, a check may be carried out to ensure that the segment reference list, content encryption key, continuity reference, and raw initialization value may be received successfully, and if so, the process may advance to step 2420.

At step 3120, like at step 2420, it may be determined from the segment reference list the encrypted segments to be received from a distributed storage environment, and the encrypted segments to be received may include at least an encrypted first segment and an encrypted subsequent segment, and the encrypted first segment and encrypted second segment each include at least a first and second representation.

At step 3125, similar to step 2425, a determination may be made as to the representation for each segment which is to be received. This may be dependent upon available bandwidth, and may be determined using techniques understood, for example, in connection with the MPEG-DASH standard.

At step 3130, like step 2430, a first master initialization vector for the first segment and a first segment continuity reference may be generated from the continuity reference received earlier.

At step 3135, similar to step 2435, a first representation-specific initialization vector may be generated for the required representation of the first segment from the first master initialization vector using techniques described herein.

At step 3138, like step 2438, the required representation for at least the first segment may be received from the distributed storage environment, as described herein.

At step 3140, like with 2440, received representation of the first segment may be decrypted using the first representation-specific initialization vector and the content encryption key to generate a decrypted first segment.

At step 3145, similar to step 2445, the decrypted first segment may be generated for display.

At step 3150, different from step 2450, a zeroth representation-specific continuity reference for the first segment may be received.

At step 3152, a second master initialization vector for the subsequent sector and the a subsequent segment continuity reference may be generated from the zeroth segment continuity reference.

At step 3155, similar to step 2455, a second representation-specific initialization vector may be generated for the required representation of the second segment from the second master initialization vector, using the techniques described herein.

At step 3160, similar to step 2460, the required representation for at least the second segment may be received from the distributed storage environment.

At step 3165, similar to step 2465, the received representation of the second segment may be decrypted with the second representation-specific initialization vector and the content encryption key to generate a decrypted subsequent segment.

At step 3170, similar to step 2470, the decrypted second segment may be generated for display.

The actions or descriptions of FIG. 31 may be used with any other example of this disclosure. In addition, the actions and descriptions described in relation to FIG. 28 may be done in any suitable alternative orders or in parallel to further the purposes of this disclosure.

The methods and processes herein may be carried out using control circuitry, and as such, each of the steps of the method claims may be considered as using control circuitry to be carried out or implemented.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for encrypting data in a distributed storage environment, the method comprising:

dividing a media item into segments, the segments including a first segment and a subsequent segment;

encoding the at least first and subsequent segments as at least a first representation and a second representation, wherein the first representation and the second representation are encoded at different bitrates;

generating a content encryption key, a raw initialization value, and a first continuity reference;

generating from the first continuity reference and the raw initialization value, a first master initialization vector for the first segment and a first segment continuity reference;

generating a first representation-specific initialization vector for the first representation of the first segment, and a second representation-specific initialization vector for the second representation of the first segment, each based upon the first master initialization vector;

encrypting the first representation of the first segment with the first representation-specific initialization vector and the content encryption key, and the second representation of the first segment with the second representation-specific initialization vector and the content encryption key, to generate an encrypted first segment;

generating from the first segment continuity reference a second master initialization vector for the subsequent segment and a subsequent segment continuity reference;

generating a third representation-specific initialization vector for the first representation of the subsequent segment and a fourth representation-specific initialization vector for the second representation of the subsequent segment, each based upon the second master initialization vector;

encrypting at least the first representation of the subsequent segment with the third representation-specific initialization vector and the content encryption key, and the second representation of the subsequent segment with the fourth representation-specific initialization vector and the content encryption key, to generate an encrypted subsequent segment;

generating a segment reference list of the encrypted segments into which the media item has been divided and information about the representations into which each segment has been encoded;

publishing, to a secure storage location, the segment reference list, the content encryption key, the raw initialization value, and the continuity reference; and outputting, to the distributed storage environment at least the encrypted first segment and the encrypted subsequent segment.

2. The method of claim 1, further including the steps of:

generating a zeroth representation for the subsequent segment, wherein the zeroth representation does not include a portion of the media item; and generating, a zeroth representation-specific continuity reference for the subsequent segment.

3. The method of claim 1, wherein a zeroth representation-specific initialization vector is used as the first segment continuity reference.

4. The method of claim 1, wherein the step of dividing the media item further includes the step of dividing the media item into a further subsequent segment, and wherein the method further includes the steps of:

encoding the further subsequent segments as at least the first representation and the second representation, wherein the first representation and the second representation are encoded at different bitrates;

generating from the subsequent segment continuity reference a third master initialization vector for the further subsequent segment and a further subsequent segment continuity reference;

generating a fifth representation-specific initialization vector for the first representation of the first segment and a sixth representation-specific initialization vector for the second representation of the first segment, each based upon the third master initialization vector;

encrypting at least the first representation of the further subsequent segment with the fifth representation-specific initialization vector and the content encryption key, and the second representation of the further subsequent segment with the sixth representation-specific initialization vector and the content encryption key, to generate an encrypted further subsequent segment.

5. The method of claim 1, wherein the method further includes:

generating a replacement raw initialization vector to replace the raw initialization vector;

selecting a segment to be re-encrypted;

generating, from the relevant continuity reference and the replacement raw initialization value, a replacement master initialization vector for the selected segment and a selected segment continuity reference;

generating a replacement representation-specific initialization vector for the first representation of the selected segment and a replacement second representation-specific initialization vector for the second representation of the selected segment, each based upon the replacement master initialization vector;

encrypting at least the first representation of the selected segment with the replacement representation-specific first initialization vector and the content encryption key, and the second representation of the first segment with the replacement representation-specific second initialization vector and the content encryption key, to generate a replacement encrypted segment;

generating a renewed segment reference list of the encrypted segments into which the media item has been divided and information about the representations into which each segment has been encoded and which includes the replacement encrypted selected segment;

publishing, to the secure storage location, the renewed segment list and the replacement raw initialization vector; and outputting, to the distributed storage environment, the replacement encrypted selected segment.

6. A method of decrypting data in a distributed storage environment, the method including the steps of:

receiving, from a secure storage location, a segment reference list, a content encryption key, a continuity reference, and a raw initialization value;

determining, from the segment reference list, the encrypted segments to be received from the distributed storage environment, wherein the encrypted segments to be received include at least an encrypted first segment and an encrypted subsequent segment, and the encrypted first segment and encrypted second segment each include at least a first and second representation;

determining the representation for each segment which is to be retrieved;

generating, using control circuitry, from the continuity reference, a first master initialization vector for the first segment and a first segment continuity reference;

generating a first representation-specific initialization vector for the required representation of the first segment from the first master initialization vector;

receiving, from the distributed storage environment, the required representation for at least the first segment;

decrypting the received representation of the first segment with the first representation-specific initialization vector and the content encryption key to generate a decrypted first segment;

generating, for display, the decrypted first segment;

generating from the first segment continuity reference, a second master initialization vector for the subsequent segment and a subsequent segment continuity reference;

generating a second representation-specific initialization vector for the required representation of the second segment from the second master initialization vector;

receiving, from the distributed storage environment, the required representation for at least the second segment;

decrypting the received representation of the second segment with the second representation-specific initialization vector and the content encryption key to generate a decrypted subsequent segment; and generating, for display, the decrypted second segment.

7. The method of claim 6, wherein the steps of:

generating, from the continuity reference, the first master initialization vector for the first segment and the first segment continuity reference;

generating the first representation-specific initialization vector for the required representation of the first segment from the first master initialization vector;

decrypting the received representation of the first segment with the first representation-specific initialization vector and the content encryption key to generate the decrypted first segment;

generating from the first segment continuity reference, the second master initialization vector for the subsequent segment and the subsequent segment continuity reference;

generating the second representation-specific initialization vector for the required representation of the second segment from the second master initialization vector; and decrypting the received representation of the second segment with the second representation-specific initialization vector and the content encryption key to generate a decrypted subsequent segment, are carried out in a trusted execution environment.

8. The method of claim 6, wherein the method further includes:

receiving, from the secure storage location, a renewed segment list and a replacement raw initialization vector to replace the raw initialization vector;

determining from the renewed segment list, the replacement encrypted segment to be received from the distributed storage environment;

receiving, from the distributed storage environment, the replacement encrypted segment.

9. The method of claim 6, further comprising a slice reference list that includes one alternative representation for each of the segments.

10. The method of claim 9, wherein the slice reference list further includes all possible initialization values for each representation of each segment.

11. A system for encrypting data in a distributed storage environment, the system including control circuitry configured to:

divide a media item into segments, the segments including a first segment and a subsequent segment;

encode the at least first and subsequent segments as at least a first representation and a second representation, wherein the first representation and the second representation are encoded at different bitrates;

generate a content encryption key, a raw initialization value, and a first continuity reference;

generate from the first continuity reference and the raw initialization value, a first master initialization vector for the first segment and a first segment continuity reference;

generate a first representation-specific initialization vector for the first representation of the first segment, and a second representation-specific initialization vector for the second representation of the first segment, each based upon the first master initialization vector;

encrypt the first representation of the first segment with the first representation-specific initialization vector and the content encryption key, and the second representation of the first segment with the second representation-specific initialization vector and the content encryption key, to generate an encrypted first segment;

generate from the first segment continuity reference a second master initialization vector for the subsequent segment and a subsequent segment continuity reference;

generate a third representation-specific initialization vector for the first representation of the subsequent segment and a fourth representation-specific initialization vector for the second representation of the subsequent segment, each based upon the second master initialization vector;

encrypt at least the first representation of the subsequent segment with the third representation-specific initialization vector and the content encryption key, and the second representation of the subsequent segment with the fourth representation-specific initialization vector and the content encryption key, to generate an encrypted subsequent segment;

generate a segment reference list of the encrypted segments into which the media item has been divided and information about the representations into which each segment has been encoded;

publish, to a secure storage location, the segment reference list, the content encryption key, the raw initialization value, and the continuity reference; and output, to the distributed storage environment at least the encrypted first segment and the encrypted subsequent segment.

12. The system of claim 11, wherein the control circuitry is further configured to generate a zeroth representation for the subsequent segment, wherein the zeroth representation does not include a portion of the media item, and generate a zeroth representation-specific continuity reference for the subsequent segment.

13. The system of claim 11, wherein a zeroth representation-specific initialization vector is used as the first segment continuity reference.

14. The system of claim 11, wherein the control circuitry is configured to divide the media item by dividing the media item into a further subsequent segment, and wherein the control circuitry is further configured to:

encode the further subsequent segments as at least the first representation and the second representation, wherein the first representation and the second representation are encoded at different bitrates;

generate from the subsequent segment continuity reference a third master initialization vector for the further subsequent segment and a further subsequent segment continuity reference;

generate a fifth representation-specific initialization vector for the first representation of the first segment and a sixth representation-specific initialization vector for the second representation of the first segment, each based upon the third master initialization vector;

encrypt at least the first representation of the further subsequent segment with the fifth representation-specific initialization vector and the content encryption key, and the second representation of the further subsequent segment with the sixth representation-specific initialization vector and the content encryption key, to generate an encrypted further subsequent segment.

15. The system of claim 11, wherein the control circuitry is further configured to:

generate a replacement raw initialization vector to replace the raw initialization vector;

select a segment to be re-encrypted;

generate, from the relevant continuity reference and the replacement raw initialization value, a replacement master initialization vector for the selected segment and a selected segment continuity reference;

generate a replacement representation-specific initialization vector for the first representation of the selected segment and a replacement second representation-specific initialization vector for the second representation of the selected segment, each based upon the replacement master initialization vector;

encrypt at least the first representation of the selected segment with the replacement representation-specific first initialization vector and the content encryption key, and the second representation of the first segment with the replacement representation-specific second initialization vector and the content encryption key, to generate a replacement encrypted segment;

generate a renewed segment reference list of the encrypted segments into which the media item has been divided and information about the representations into which each segment has been encoded and which includes the replacement encrypted selected segment;

publish, to the secure storage location, the renewed segment list and the replacement raw initialization vector; and output, to the distributed storage environment, the replacement encrypted selected segment.

16. A system for decrypting data in a distributed storage environment, the system including control circuitry configured to:

receive, from a secure storage location, a segment reference list, a content encryption key, a continuity reference, and a raw initialization value;

determine, from the segment reference list, the encrypted segments to be received from the distributed storage environment, wherein the encrypted segments to be received include at least an encrypted first segment and an encrypted subsequent segment, and the encrypted first segment and encrypted second segment each include at least a first and second representation;

determine the representation for each segment which is to be retrieved;

generate, using the control circuitry, from the continuity reference, a first master initialization vector for the first segment and a first segment continuity reference;

generate a first representation-specific initialization vector for the required representation of the first segment from the first master initialization vector;

receive, from the distributed storage environment, the required representation for at least the first segment;

decrypt the received representation of the first segment with the first representation-specific initialization vector and the content encryption key to generate a decrypted first segment;

generate, for display, the decrypted first segment;

generate from the first segment continuity reference, a second master initialization vector for the subsequent segment and a subsequent segment continuity reference;

generate a second representation-specific initialization vector for the required representation of the second segment from the second master initialization vector;

receive, from the distributed storage environment, the required representation for at least the second segment;

decrypt the received representation of the second segment with the second representation-specific initialization vector and the content encryption key to generate a decrypted subsequent segment; and generate, for display, the decrypted second segment.

17. The system of claim 16, wherein the control circuitry is further configured to:

generate, from the continuity reference, the first master initialization vector for the first segment and the first segment continuity reference;

generate the first representation-specific initialization vector for the required representation of the first segment from the first master initialization vector;

decrypt the received representation of the first segment with the first representation-specific initialization vector and the content encryption key to generate the decrypted first segment;

generate from the first segment continuity reference, the second master initialization vector for the subsequent segment and the subsequent segment continuity reference;

generate the second representation-specific initialization vector for the required representation of the second segment from the second master initialization vector; and decrypt the received representation of the second segment with the second representation-specific initialization vector and the content encryption key to generate a decrypted subsequent segment.

18. The system of claim 16, wherein the control circuitry is further configured to:

receive, from the secure storage location, a renewed segment list and a replacement raw initialization vector to replace the raw initialization vector;

determine from the renewed segment list, the replacement encrypted segment to be received from the distributed storage environment;

receive, from the distributed storage environment, the replacement encrypted segment.

19. The system of claim 16, further comprising a slice reference list that includes one alternative representation for each of the segments.

20. The system of claim 19, wherein the slice reference list further includes all possible initialization values for each representation of each segment.

* * * * *